(12) United States Patent
Rebick

(10) Patent No.: US 12,103,343 B1
(45) Date of Patent: Oct. 1, 2024

(54) HITCH MOUNT ASSEMBLY

(71) Applicant: Michael S Rebick, Little Rock, AR (US)

(72) Inventor: Michael S Rebick, Little Rock, AR (US)

( * ) Notice: Subject to any disclaimer, the term of this patent is extended or adjusted under 35 U.S.C. 154(b) by 703 days.

(21) Appl. No.: 17/241,992

(22) Filed: Apr. 27, 2021

Related U.S. Application Data

(63) Continuation-in-part of application No. 16/597,127, filed on Oct. 9, 2019, now Pat. No. 11,007,832, and a continuation-in-part of application No. 29/708,107, filed on Oct. 3, 2019, now Pat. No. Des. 881,078.

(60) Provisional application No. 63/045,046, filed on Jun. 27, 2020.

(51) Int. Cl.
    *B60D 1/58* (2006.01)

(52) U.S. Cl.
    CPC .................................. *B60D 1/58* (2013.01)

(58) Field of Classification Search
    CPC .... B60D 1/58; B60D 1/52; B60D 1/44; B60R 3/007
    See application file for complete search history.

(56) References Cited

U.S. PATENT DOCUMENTS

| | | | |
|---|---|---|---|
| 5,458,305 A | 10/1995 | Woodward | |
| 6,474,522 B1 | 11/2002 | Johnson | |
| 6,502,845 B1 * | 1/2003 | Van Vleet | B60D 1/44 280/491.1 |
| 6,682,086 B1 * | 1/2004 | Erickson | B60R 3/02 280/166 |
| 6,769,704 B2 | 8/2004 | Cipolla | |
| 7,114,736 B2 | 10/2006 | Stodala et al. | |
| 7,185,904 B1 | 3/2007 | Jones et al. | |
| 7,338,064 B1 | 3/2008 | Williams | |
| 7,661,693 B1 * | 2/2010 | Lipski | B60R 9/06 280/166 |
| 7,784,813 B2 * | 8/2010 | Columbia | B60D 1/07 280/495 |
| 7,909,350 B1 * | 3/2011 | Landry | B60D 1/155 280/491.1 |

(Continued)

OTHER PUBLICATIONS

RV.net Open Roads Forum; https://www.rv.net/forum/index.cfm/fuseaction/thread/tid/27708080.cfm ;last visited May 30, 2019.

(Continued)

*Primary Examiner* — Kevin Hurley
*Assistant Examiner* — Michael R Stabley
(74) *Attorney, Agent, or Firm* — Rashauna Norment

(57) ABSTRACT

A hitch mount assembly supports, transports, and stores one or more of a plurality of attachment members and accessories about a mounting surface or frame of a vehicle, a trailer, or a watercraft trailer without using an existing hitch receiver. In one embodiment, the hitch mount assembly comprises a swing step mount kit, with the swing step mount kit having a swing assembly, at least one step, and at least one hand pole, and with the configuration of the at least one step and the at least one hand pole of the swing step mount kit being selectively adjustable. The components of the hitch mount assembly may be configured into a variety of ways to form one or more hitch mount kits that supports, transports, and/or stores accessories.

14 Claims, 53 Drawing Sheets

(56) References Cited

U.S. PATENT DOCUMENTS

| | | | |
|---|---|---|---|
| 7,967,311 B2 * | 6/2011 | Phillips | B60R 3/007 280/166 |
| 8,322,739 B1 | 12/2012 | Fair et al. | |
| 8,474,852 B1 * | 7/2013 | Granados | B60D 1/36 280/479.2 |
| 8,727,364 B2 | 5/2014 | Masanek et al. | |
| 8,915,514 B2 * | 12/2014 | Columbia | B60D 1/07 280/506 |
| 8,960,512 B2 * | 2/2015 | Maenle | A01B 23/02 224/558 |
| 9,266,476 B2 * | 2/2016 | Mendoza | B60D 1/52 |
| 9,707,811 B2 * | 7/2017 | Columbia | B60D 1/52 |
| 9,783,016 B2 * | 10/2017 | Forhan | B60R 11/06 |
| 9,840,201 B2 * | 12/2017 | Knodle | B60R 3/007 |
| 10,099,524 B1 * | 10/2018 | Landry | B60D 1/07 |
| 10,603,967 B2 * | 3/2020 | Shaffer | B60D 1/46 |
| 2006/0214391 A1 | 9/2006 | Columbia | |
| 2007/0252360 A1 | 11/2007 | Wooten | |
| 2008/0011698 A1 | 1/2008 | Simon | |
| 2008/0168929 A1 | 7/2008 | Thompson | |
| 2009/0079157 A1 * | 3/2009 | Fratzke | B60R 3/02 280/166 |
| 2016/0288726 A1 | 10/2016 | Endrasik | |
| 2021/0261060 A1 * | 8/2021 | Schwarz | B60D 1/52 |

OTHER PUBLICATIONS

Amazon.com Quick Products QPRBAB Deluxe RV Bumper Receiver; https://www.amazon.com/Quick-Products-QPRBAB-Adapter-Mounting/dp/B013U6NGGK%3FSubscriptionId%3DAKIAI2QLKINDTX3PNBTQ%26tag%E2%80%A6 ; last visited May 30, 2019.

* cited by examiner

HITCH MOUNT ASSEMBLY

CROSS-REFERENCE TO RELATED APPLICATIONS

This application is a continuation-in-part of co-pending U.S. Utility patent application Ser. No. 16/597,127, filed Oct. 9, 2019; a continuation-in-part of U.S. Design patent application No. 29/708,107, filed Oct. 3, 2019, now U.S. Design Pat. No. D881,078, issued Apr. 14, 2020; and U.S. Provisional Patent Application No. 63/045,046, filed Jun. 27, 2020; and claims the benefit and priority of said applications, which are incorporated herein by reference.

FEDERALLY SPONSORED RESEARCH AND DEVELOPMENT

Not applicable.

BACKGROUND OF THE INVENTION

1. Field of the Invention

The present invention generally relates to a hitch mount assembly comprising a swing step mount kit having a swing assembly, a step, and a hand pole, without using an existing hitch receiver for a frame of a trailer, vehicle, watercraft trailer, or other mountable structure.

2 Description of Arguably Related Art Including Information Disclosed for 37 CFR 1.97 and 1.98

Boat trailers, utility trailers, enclosed trailers, and many other types of trailers do not come outfitted with a way to carry multiple hitch mounted accessories and attachments. Furthermore, most vehicles and trailers do not come equipped with more than one hitch receiver. Currently, there are several hitch mounted attachment members available that can couple to the existing receiver hitch. When a vehicle's receiver hitch is occupied by a trailer hitch, the trailer hitch must be removed before other attachment members or accessories can be coupled to the vehicle's receiver hitch. Also, multiple attachment members and accessories cannot be coupled to the receiver hitch due to the structure of the existing receiver hitch. Currently, there is no effective trailer mounted receiver available to allow the mounting of the hitch mounted accessories to the trailer for storage and transport purposes.

A problem with conventional hitch mount assemblies that have a mounting tube affixed to a single mounting plate and the mounting plate secured to the frame of the trailer or vehicle with U-bolt fasteners is that using U-bolt fasteners allow excessive wobbling of the assembly. Another problem is that the location and number of bores for receiving a fastener limits the user to a particular frame size, and that the structure of these mounting plates prevent use a hitch pin through the top of a mounting tube. Another problem with conventional hitch mount assemblies is that the mounting (receiver) tube has only one open end. Thus, these types of mounting tubes cannot support an attachment member or accessory being coupled at either end of the mounting tubes. Yet another problem with the configuration of conventional attachment members is that many conventional attachment members lack the versatility of having an attachable step that is rotatable or swingable about a pivot point up to 180 degrees, or lack the structural accommodations of adding one or more attachment members to the step.

The frame of the vehicle, watercraft trailer, mountable structure, or trailer refers to any beams, frames, bumpers, or structural locations capable of supporting a hitch mount assembly. Bumpers include, but is not limited to, vehicle bumpers, RV bumpers, cargo trailer bumpers, truck bumpers. Many of these hitch mount assemblies are constructed from solid steel.

U.S. Pat. No. 6,474,522 issued to Johnson discloses a receiver bracket (mounting tube) for mounting to a square or rectangular bumper of a recreational or similar vehicle. The receiver bracket is designed to accept various racks or other accessories of limited weight, with a maximum of about 200 pounds. The receiver bracket is symmetrical, allowing mounting of a square mounting tube either below or above the supporting bumper in a horizontal orientation. Alternatively, the receiver bracket can be mounted to the bumper with the square tubing in a vertical orientation. U.S. Pat. No. 8,322,739 issued to Fair et al. discloses a boat trailer steps that includes a first and second support arm in pivotal relation to one another which provide steps that assist a user in entering or exiting a boat when trailered or in the process of being trailered. The support arms are arranged at an angle relative to the trailer tongue. When not in use, the second support arm pivots downward for compact stowage. When deployed, the support arms are aligned with one another. A grab handle may be provided to assist the user in climbing or descending the steps.

None of these patent references disclose a hitch mount assembly comprising a swing assembly, at least one step member, and one of a plurality of attachment members. None of these patent references teach, disclose, or suggest the claimed kits or assembly of components and configurations for use with the apparatus.

A need exists for a hitch mount assembly comprising a swing step attachment member for selectively adjusting the position of at least one step about pivot point up to 180 degrees.

SUMMARY OF THE INVENTION

Due to the described disadvantages inherent in the known types of hitch mount assemblies, the present invention provides a new and improved methods for attaching one more accessories and attachment members to trailers, vehicles, and recreational vehicles without using the mounting structures hitch receiver. It is understood that the present invention is not limited in its application to the details of construction and to the arrangement of the components described in the following illustrated drawing or in the detailed description.

This invention provides a simple, easy, and cost-effective way to use a hitch mount assembly having a mounting bracket having two mounting plates with a plurality of fasteners, and a base tube having opposing open ends with each opposing end for coupling to one of a plurality of attachment members; and a plurality of hitch pins. The plurality of attachment members includes swing step attachment members, extenders, risers, steps, tire carriers, and jack mounts. Any combination and/or duplication of the attachment members may be used with the invention to form a customized kit for supporting, transporting, or storing at least two accessories about the frame.

The hitch mount assembly is quickly mountable to a frame. The base tube accommodates the quick coupling and removal of up to two accessories or attachment members at a time, with one accessory or one attachment member coupled at each end of the base tube. The user may position the mounting bracket at different places on the frame, with the base tube being oriented in the user's desired direction. The types of accessories that can be supported, transported, and/or stored with this hitch mount assembly on a frame include, but is not limited to, steps, bike racks, cargo carriers, spare tires, hand poles, and other hitch-mounted accessories.

The hitch mount assembly essentially utilizes a plurality of mounting tubes that may be coupled to each other, to an accessory, or to one or more of the plurality of attachment members. The mounting tubes may be any selective combination of the components including, but not limited to, the base tube (receiver mounting tube), one or more of a plurality of types of extenders, custom risers, and other mounting tubes that are affixed to other attachment members such as a step(s) or a hand pole(s) (handrail). The mounting tubes and mounting plates will accommodate swift mounting or removal of multiple hitch mounted accessories and attachment members using this customized hitch mount assembly. The mounting tubes of the hitch mount assembly are sized to cooperate with universal hitch mounts, custom designed brackets, and universal brackets. Using two base tubes allows for up to four independent couplings of the plurality of attachment members to the at least one base tube and a second base tube. The mounting bracket may be easily removed to reposition or move the mounting bracket to another mounting structure as needed. Multiple mounting brackets may be installed at a variety of locations on the frame or flooring, for example, rear mounting for stabilizer jacks and/or side mounting for jacks to lift a trailer for changing a tire.

The hitch mount assembly can be configured in different ways including, but not limited to, a watercraft trailer mount kit, a saddle step kit, a boat stair kit, or a swing step mount kit. A saddle step kit includes a mounting bracket and one step. An example of the saddle step kit is shown in FIGS. 10-25, with the saddle step kit forming part of a boat stair kit. A boat stair kit allows installation of a customized arrangement of attachment members on a boat frame for easy access and exit of a trailered boat. In the embodiment shown in FIGS. 10-25, the boat step kit includes a mounting bracket, a saddle step kit, two steps, a hand pole, a riser, a long L-extender, and a short L-extender, and a plurality of hitch pins. Here, the other two steps each has an elongated mounting tube. In this embodiment, the steps are installed at staggering heights and orientations by utilizing the riser, the long L-extender, and the short L-extender. The mounting bracket may be removably mounted to the boat frame at any available location with the mounting plates, then fastening the carriage bolts through the appropriate bores of the two mounting plates. Each open end of the base tube is utilized in the boat stair kit. A proximal (first) open end of the base tube supports one of the L-extenders and a step. A distal (second) open end of the base tube supports another L-extender, a riser, a step, and a hand pole. The plurality of attachment members remains balanced about the base tube of the mounting bracket.

In another embodiment shown in FIGS. 42-62, the hitch mount assembly comprises a swing step mount kit ("swing step"). The swing step may be used either in combination with other attachment members or alone. The swing step generally includes a swing assembly having an upper swivel plate, a lower swivel plate, an extender, and a swing arm; and at least one step member. The extender is removably coupled with the mounting bracket or other hitch mount for securing the swing assembly to a frame. An opposite portion of the swing assembly is removably coupled with the step member. The position of the step member may be selectively adjustable in relation to the swing assembly. This embodiment may further include at least one hand pole. This embodiment may be provided as a swing step mount kit, or as part of the boat stair kit.

It is an object of the present invention to provide a hitch mount assembly comprising (a) a mounting bracket having a base mounting tube with opposing open ends; and two mounting brackets for installing at any location on a frame of a vehicle, a trailer, a watercraft trailer, or other mounting structure; and (b) a plurality of attachment members, wherein one or more of a plurality of attachment members can be coupled to one or both open ends of the base tube in a selective configuration, with one or more of the attachment members being further coupled to another attachment member or an accessory to form a kit.

It is a further object of the present invention to provide a hitch mount assembly that comprises a swing step attachment member for selectively adjusting the position of a step about pivot point up to 180 degrees. These and other aspects, objects, embodiments, and advantages of the invention will become apparent from the accompanying drawing and the following detailed description of the preferred embodiments of the invention.

BRIEF DESCRIPTION OF THE SEVERAL VIEWS OF THE DRAWING

The invention may be more readily described by reference to the accompanying drawing figures and the following description of the drawing figures. The reference numbers apply to each embodiment of the invention. In the drawing.

Figure 9:
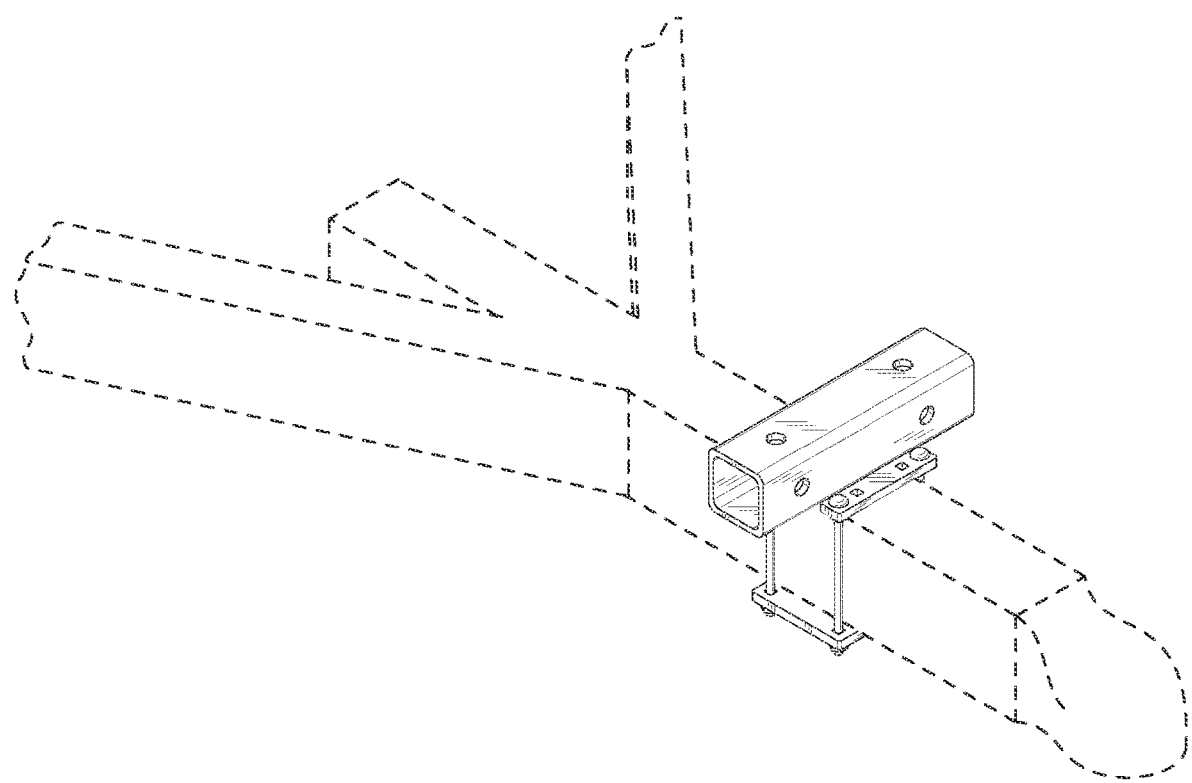
FIG. 9 is another perspective view of FIG. 1 thereof, showing the mounting bracket in use.
Figure 10:
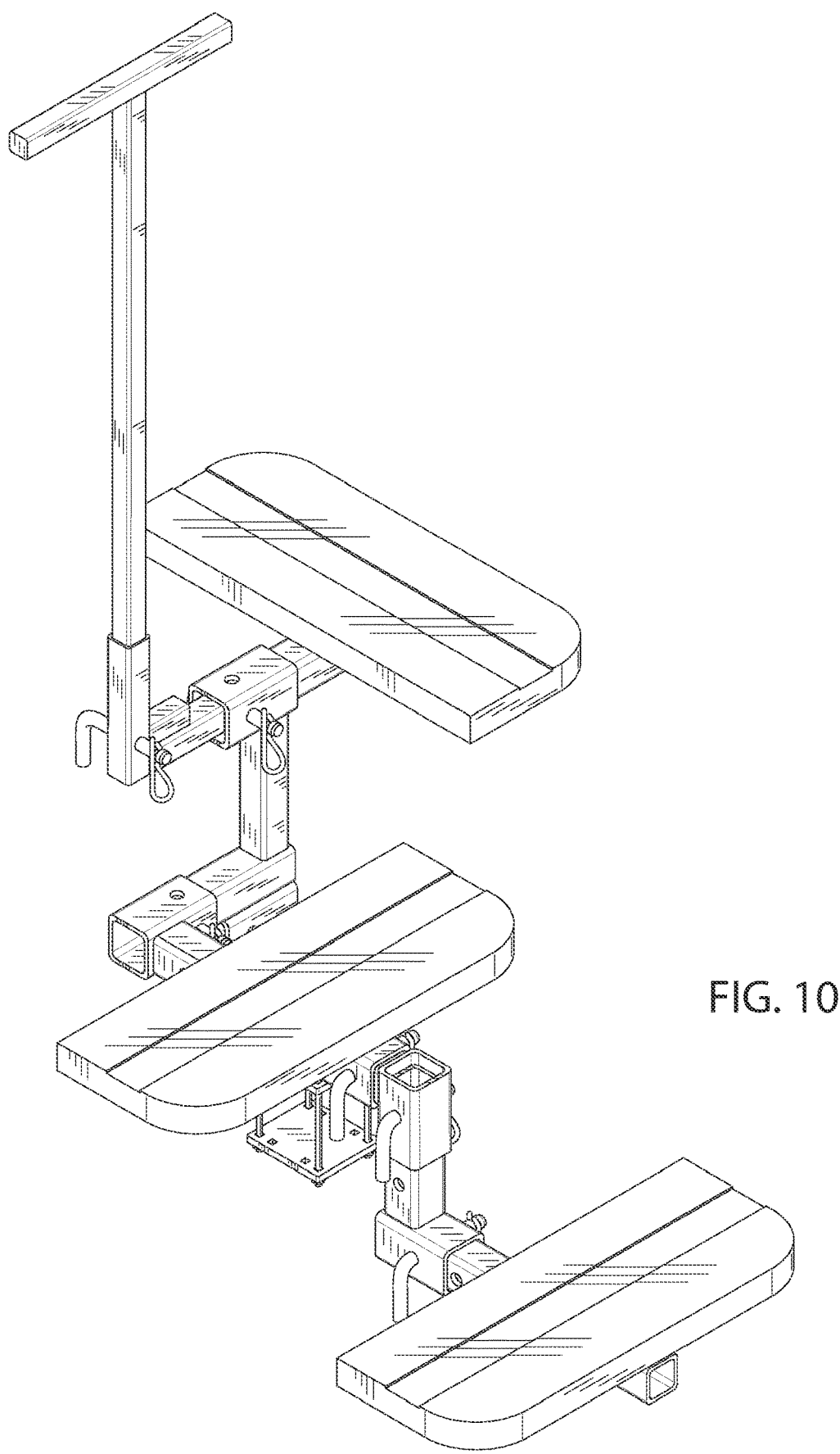
FIG. 10 is a perspective view of an embodiment of the hitch mount assembly showing a selected configuration of an assembled stair kit.
Figure 54:
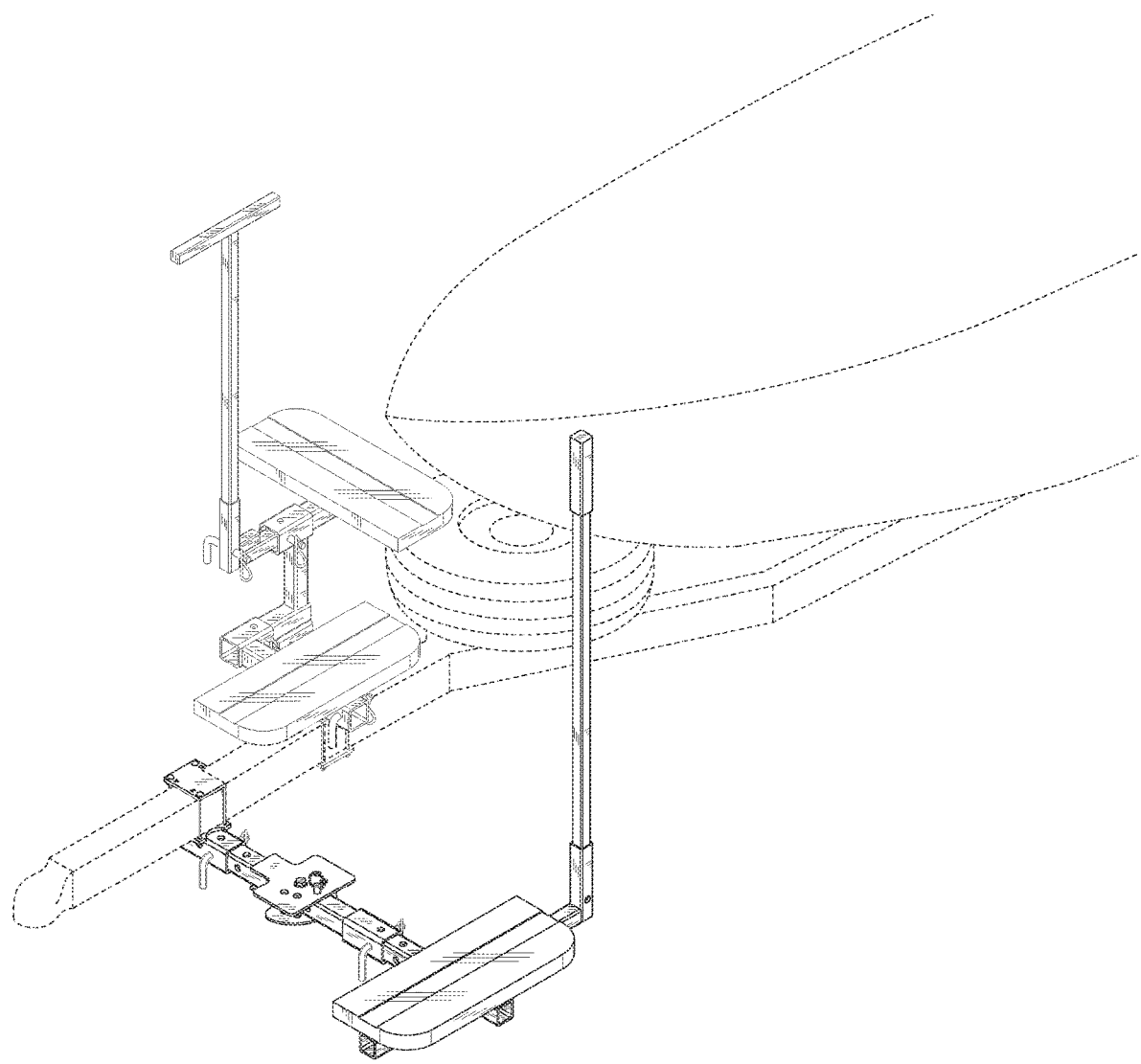
FIG. 54 is another perspective view of FIG. 53, showing the invention in use.

The broken lines shown in FIGS. 9 and 54 represent unclaimed subject matter and form no part of the claimed invention.

DETAILED DESCRIPTION OF THE INVENTION

The present invention, preferred embodiments of the invention, and the accompanying drawing figures as described herein should not be construed as limited to the illustrated drawing. Rather the illustrated embodiment(s) are detailed to provide a thorough disclosure suitable to convey the scope of the invention to those skilled in the art. For the sake of simplicity, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

Referring more particularly to the drawing by characters of reference, FIGS. 1-41 depict the hitch mount assembly 1, with the components shown assembled and disassembled. The hitch mount assembly 1 generally comprises (includes or has) at least one mounting bracket 2, a selective arrangement of a plurality of attachment members, and at least one hitch pin. The mounting bracket 2 has at least base mounting tube ("base tube") 3, two mounting plates 5, 6, and a plurality of fasteners 8. The components of the hitch mount assembly are easy and quick to assemble without the need to use many tools to secure either the mounting bracket to the frame, or one or more of the plurality of attachment members to the mounting bracket or to other attachment member. The plurality of attachment members allows the user to couple or attach one or more bike racks, spare tires, cargo carriers, watercraft trailer equipment, and other accessories (each, an "accessory," and collectively, "accessories"), while keeping the frame's existing hitch receiver available for other uses, for example, towing.

The hitch mount assembly may be installed onto or otherwise coupled to different types of mounting structures, bumpers, or frames, including but not limited to, the frames of trailers, watercraft trailer, and vehicles (collectively, "frame"). The frame may be any structure having a beam or other support member that can be sandwiched by the two mounting plates of the mounting bracket. The hitch mount assembly may be installed onto the frame in a selective variety of configurations without using any existing hitch receiver on the frame. Accordingly, the hitch mount assembly allows for easy transport and storage on a frame.

Not only is the hitch mount assembly a cost-effective option for effectively transporting and storing multiple attachment members and/or accessories, but it is also a time saver. The present invention provides an innovative method of using a mounting bracket that can be quickly attached to any part of any frame without interfering with an existing trailer tongue. Due to the structure of the various components of the hitch mount assembly, a user can easily and readily use one or more mounting brackets with a selective collection of attachment members to configure the assembly for maximum results. Multiple mounting brackets may be positioned onto different locations on the frame to allow the different embodiments described herein. For example, a first mounting bracket with a selective arrangement of attachment members may be used on one side of a trailer frame or watercraft trailer frame to support a bike rack; a second mounting bracket with a selective arrangement of attachment members may be used at a different location on the frame with a riser coupled to the base tube, and with one or more steps for easy access to the trailer or watercraft trailer; and a third mounting bracket with a selective arrangement of attachment members may be used at yet another location on the frame to support a cargo carrier.

The hitch mount assembly utilizes a variety of mounting tubes that form the plurality of attachment members, each of which has a designated structural feature. The various structural features defined in the mounting tubes include, but are not limited to, holes for receiving a hitch pin, and open ends for coupling to a corresponding mounting tube or accessory. Each of the mounting tubes may vary in length, size, and configuration. Depending on the selective configuration of the plurality of attachment members, the hitch mount assembly can support up to approximately 2500 pounds of weight. Each of the various mounting tubes used in the hitch mount assembly has a 3/16-inch-thick wall. Using a thinner wall for the various mounting tubes would not be strong enough for the intended purpose of this hitch mount assembly.

Each mounting bracket 2 of the hitch mount assembly 1 has at least one base tube 3, two mounting plates 5, 6, and a plurality of fasteners 8. The mounting bracket 2 removably attaches or mounts to nearly any frame to support the plurality of attachments or accessories that are coupled to one or both ends of the base tube 3. For example, the mounting bracket may be installed on the front of a trailer frame at the bottle neck area, or along any frame section in which the two mounting plates can be sandwiched.

The base tube 3 of the mounting bracket 2 may be made of steel or high strength aluminum; however, steel is preferred. The base tube 3 is used as the anchor or base support for the hitch mount assembly 1. The base tube is removably mountable to the frame via one of the mounting plates either horizontally (parallel or perpendicular) or vertically to the frame. By using one or more attachment members, the user may further change the orientation of the hitch mount assembly regardless of the frame orientation.

The base tube 3 is essentially an elongated mounting tube having opposing open ends, two lateral sides, a top, and a bottom forming the mounting tube; a plurality of holes 4; and a seamless hollow interior. Each of the open ends of the base tube may independently receive and support one of the plurality of attachment members or an accessory. Accordingly, the user may customize the assembly configuration to suit his or her specific needs by coupling two different attachment members or accessories with a single mounting bracket that is secured to the frame. The two base tube open ends and the seamless hollow interior accommodate a snug, slip fit for receiving a 2-inch by 2-inch conventional hitch insert from an accessory or from one of the attachment members. The snug, slip fit prevents excessive movement within the base tube. The hollow seamless interior is distinguishable from a conventional mounting tube that contains a welded seam.

Figure 1:
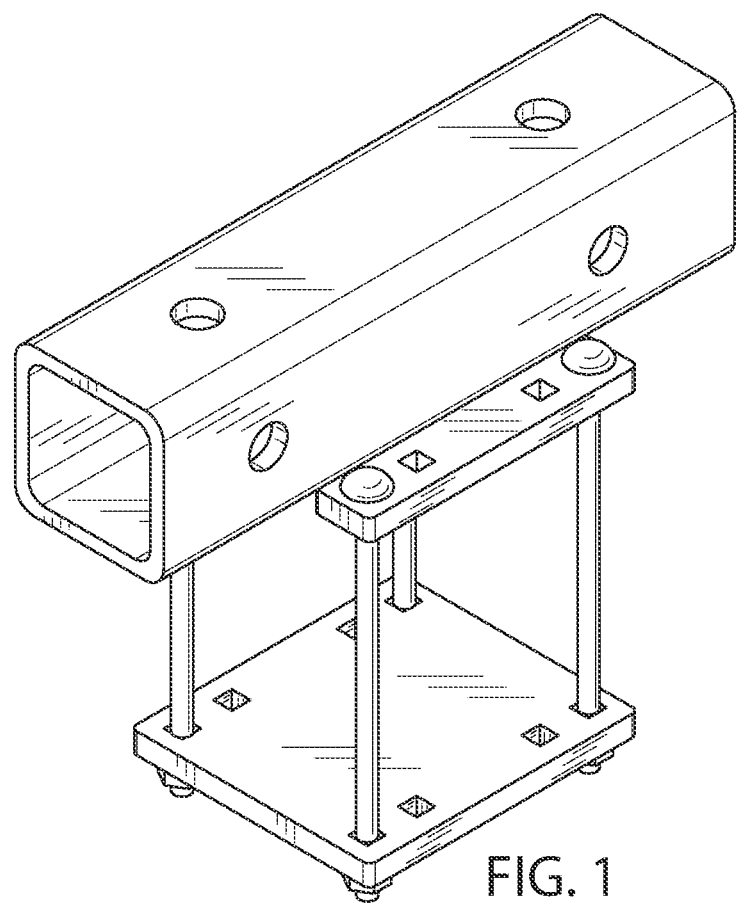
FIG. 1 is a perspective view of a mounting bracket having two mounting plates and a base tube.
Figure 2:
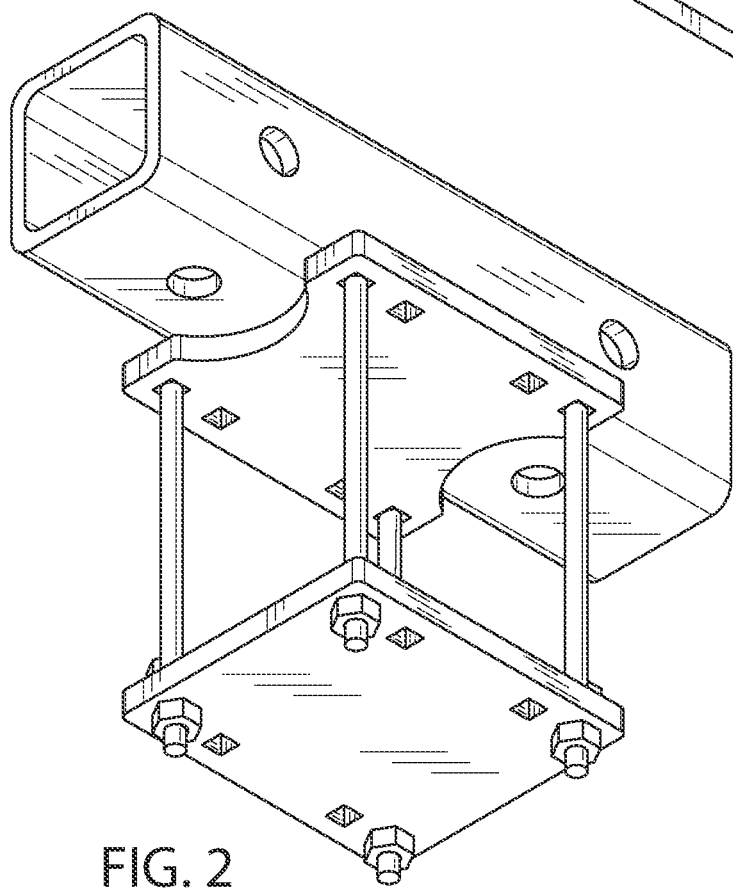
FIG. 2 is another perspective view of FIG. 1 thereof.
Figure 3:
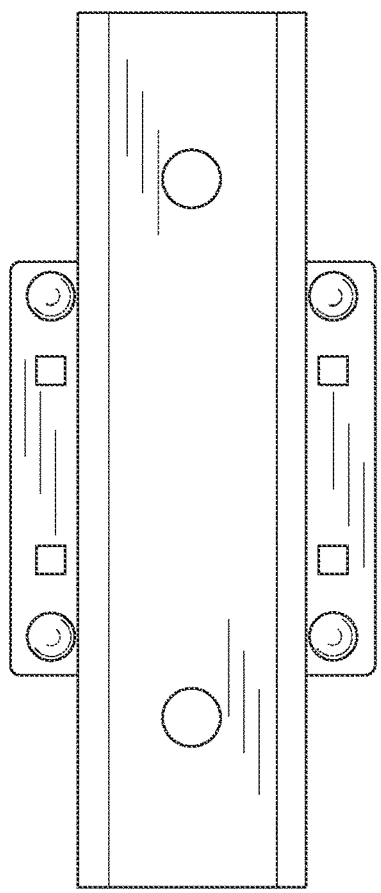
FIG. 3 is a top plan view of FIG. 1 thereof.
Figure 4:
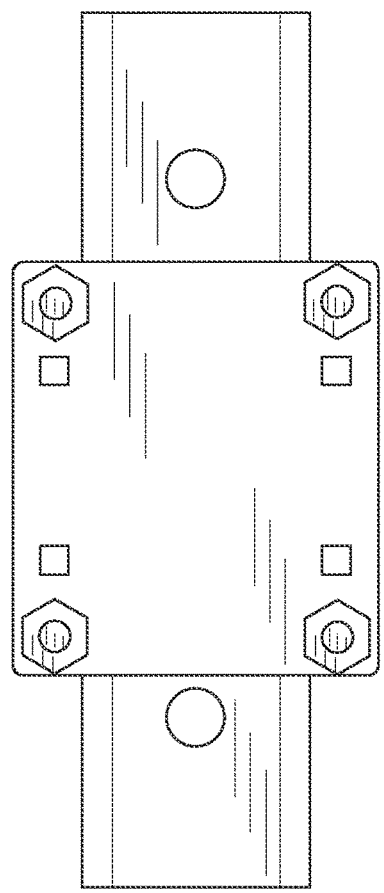
FIG. 4 is a bottom plan view of FIG. 1 thereof.
Figure 5:
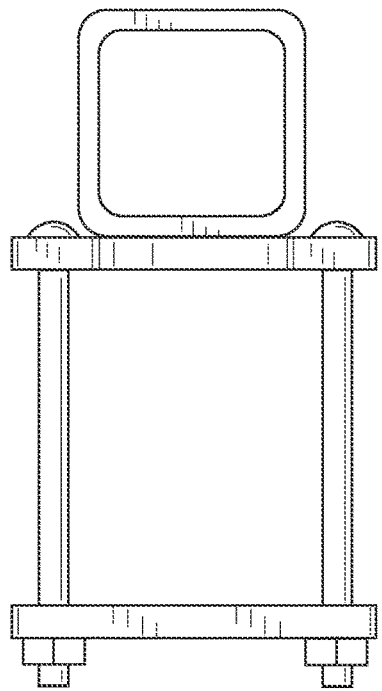
FIG. 5 is a front elevation view of FIG. 1 thereof.
Figure 6:
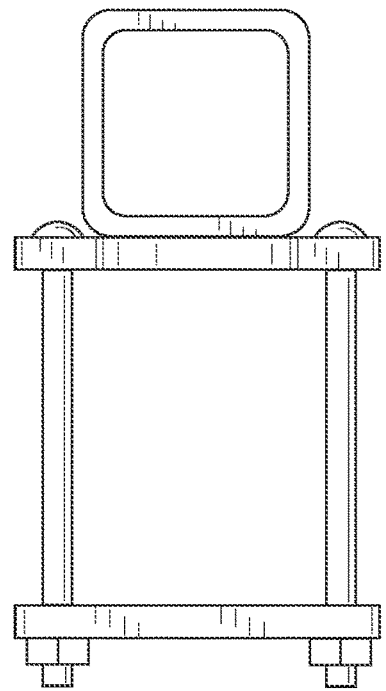
FIG. 6 is a rear elevation view of FIG. 1 thereof.
Figure 7:
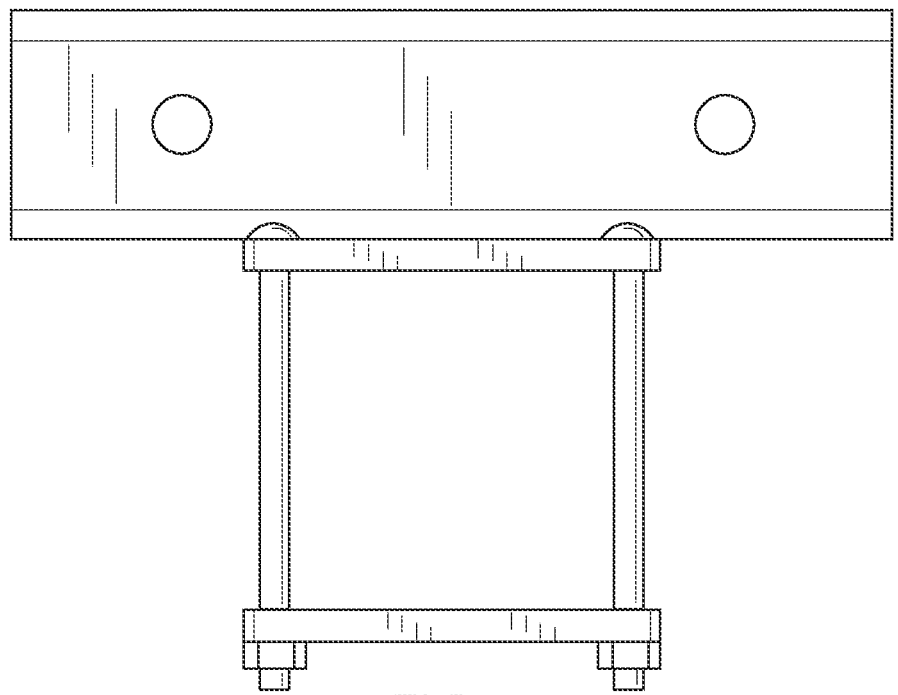
FIG. 7 is a left side elevation view of FIG. 1 thereof.
Figure 8:
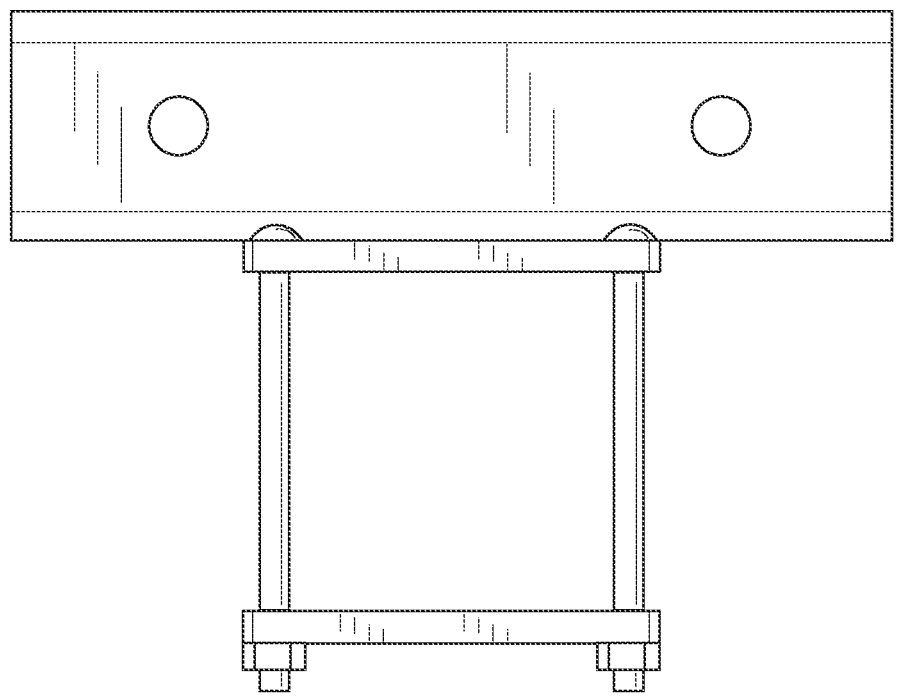
FIG. 8 is a right side elevation view of FIG. 1 thereof.

Each of the holes 4 defined in the base tube 3 can receive a hitch pin 15 therethrough after an attachment member or an accessory is coupled inside the base tube 3. As shown in at least FIGS. 1 and 2, the base tube 3 defines eight holes 4: two spaced apart holes on each lateral side, two spaced apart holes on the top, and two spaced apart holes on the bottom. Each of the two spaced apart holes on the first lateral side are aligned with each of the two spaced apart holes on the second lateral side. Each of the two spaced apart holes on the top of the base tube are aligned with each of the two spaced apart holes on the bottom of the base tube. As shown in FIGS. 1 and 2, the lateral side two holes are essentially arranged as one hole at a proximal (first) end and one hole at a distal (second) end of each lateral side. Also as shown in FIGS. 1 and 2, the top and bottom of the base tube each has two holes essentially arranged as one hole at a proximal end and one hole at a distal end of the respective top and bottom of the base tube.

Figure 11:
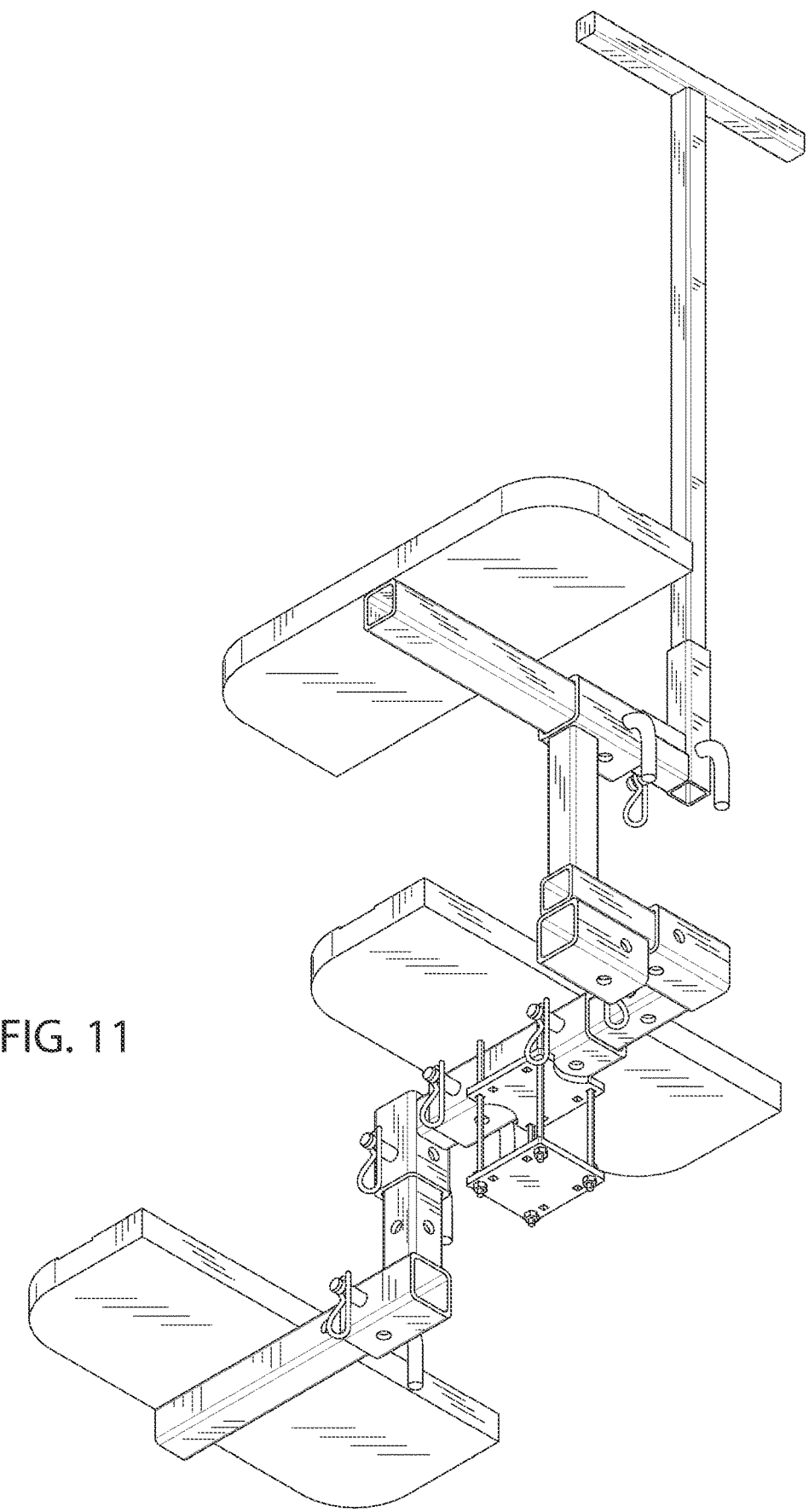
FIG. 11 is another perspective view of FIG. 10 thereof.
Figure 12:
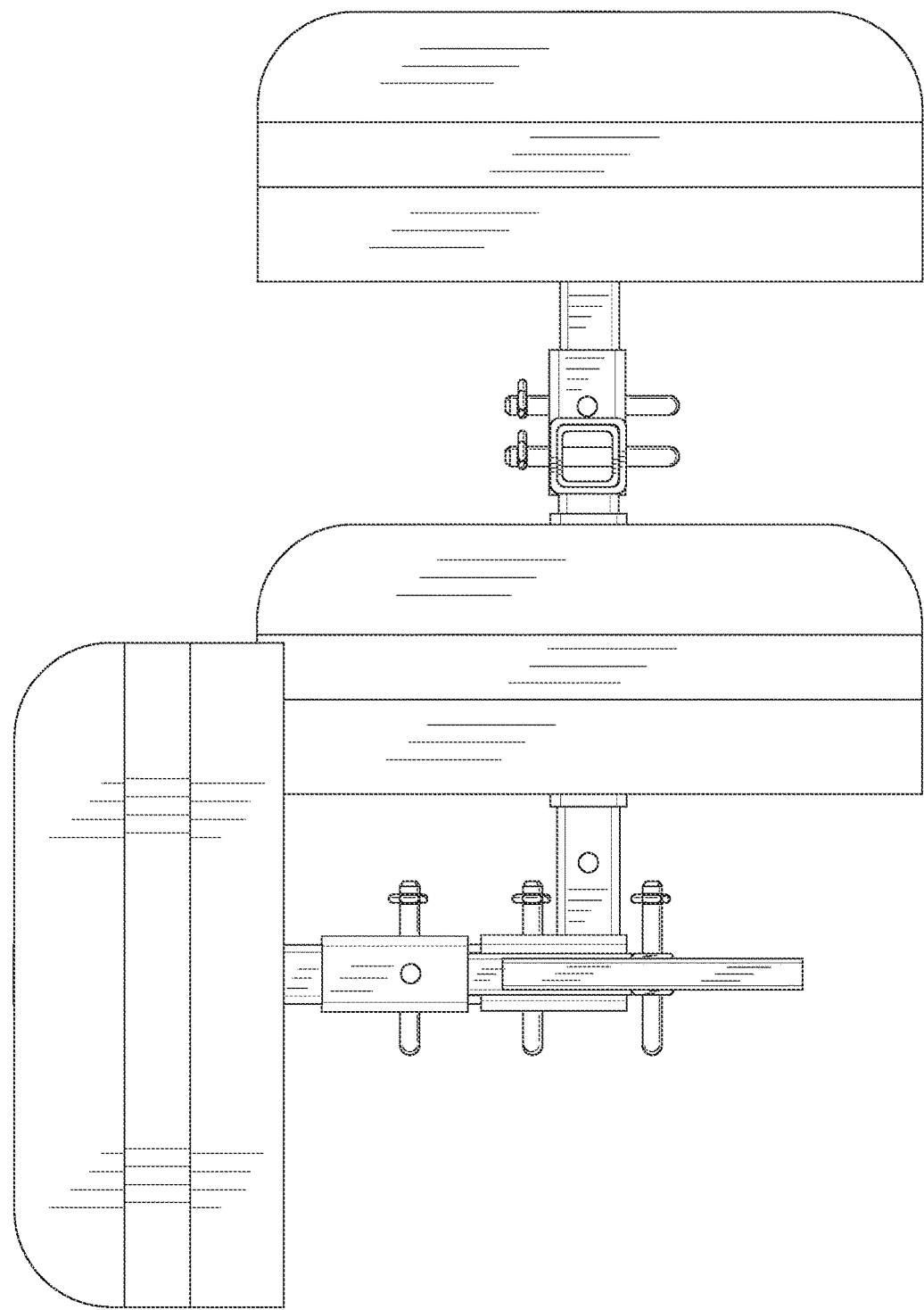
FIG. 12 is a top plan view of FIG. 10 thereof.
Figure 13:
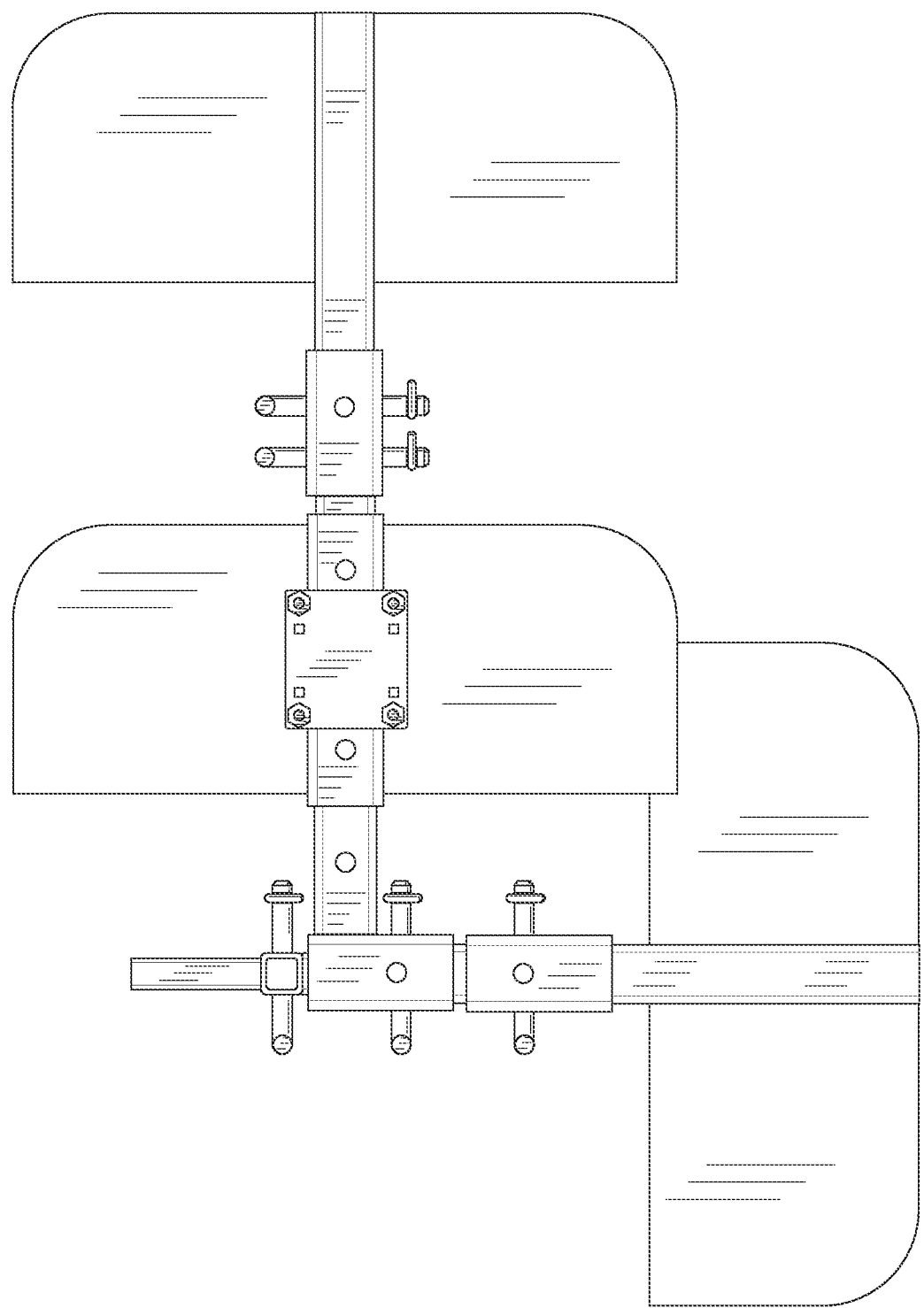
FIG. 13 is a bottom plan view of FIG. 10 thereof.
Figure 14:
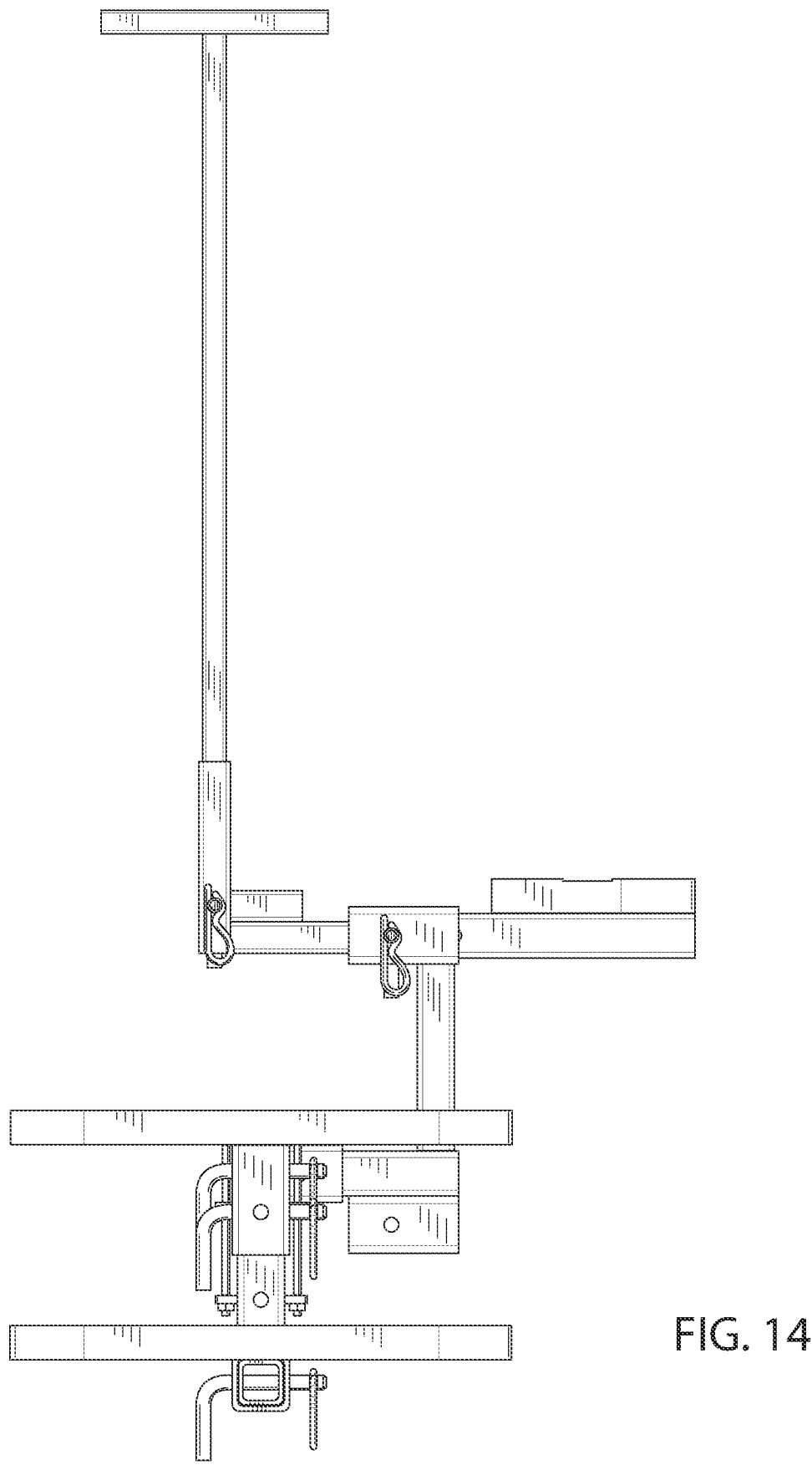
FIG. 14 is a left side elevation view of FIG. 10 thereof.
Figure 15:
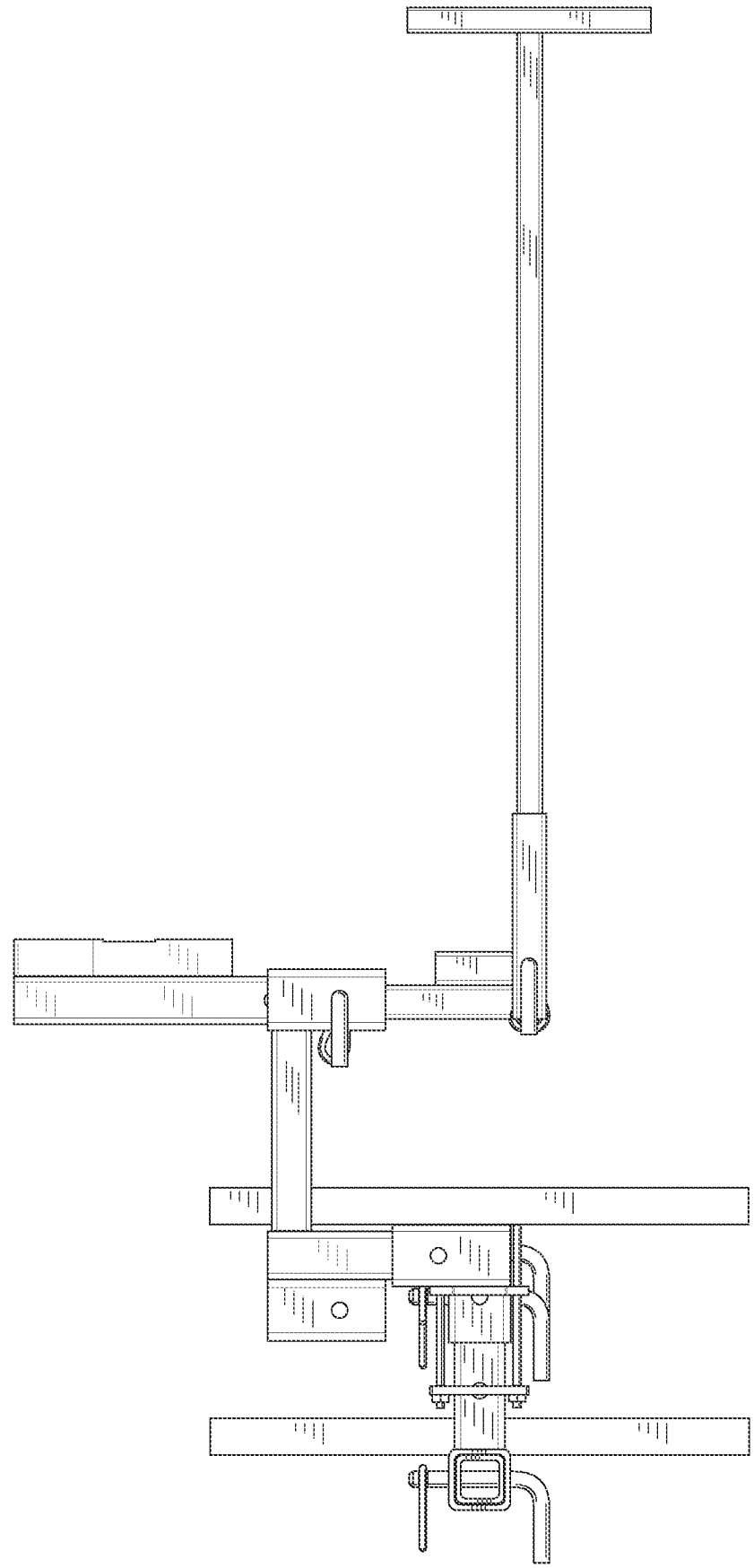
FIG. 15 is a right side elevation view of FIG. 10 thereof.
Figure 16:
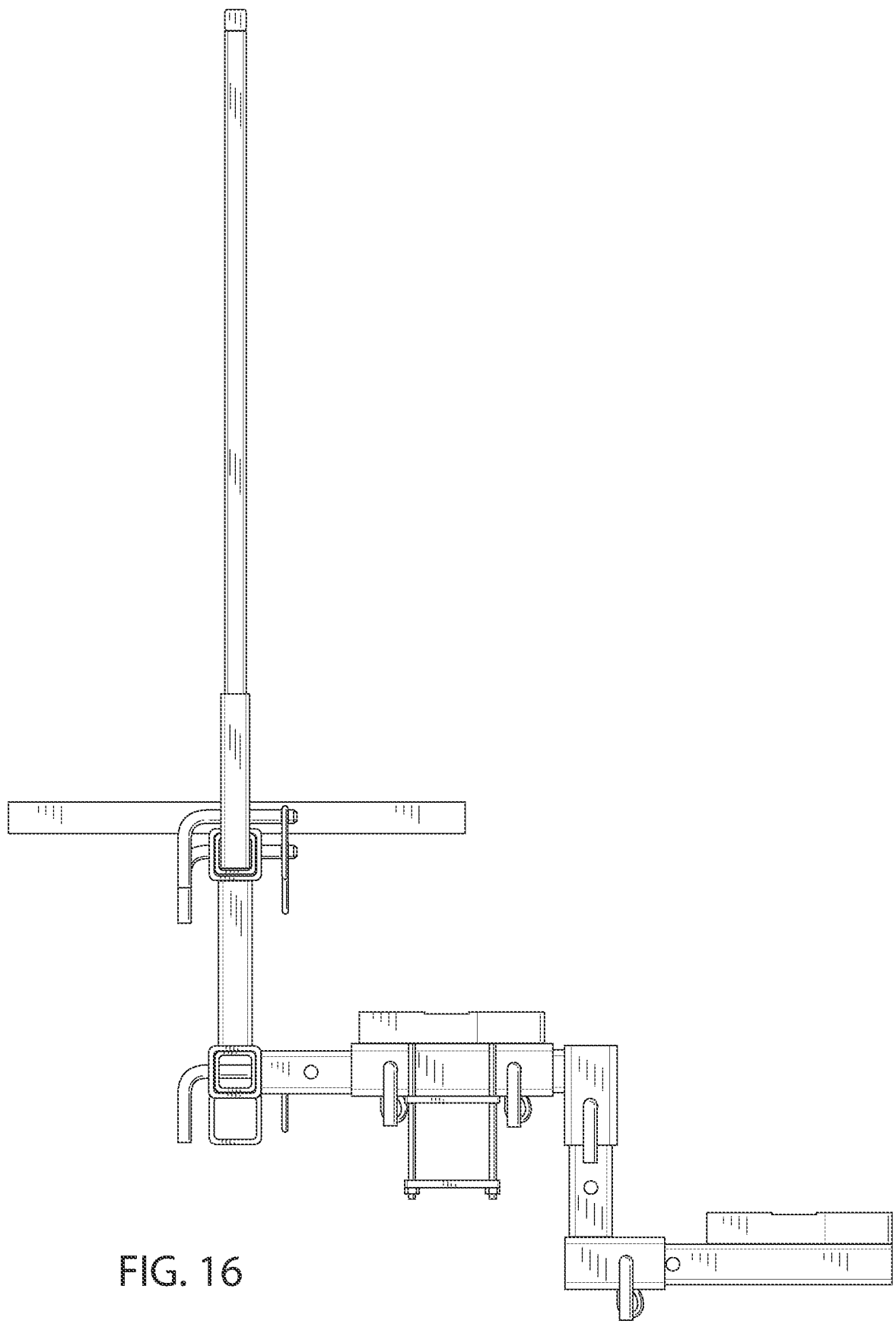
FIG. 16 is a front elevation view of FIG. 10 thereof.
Figure 17:
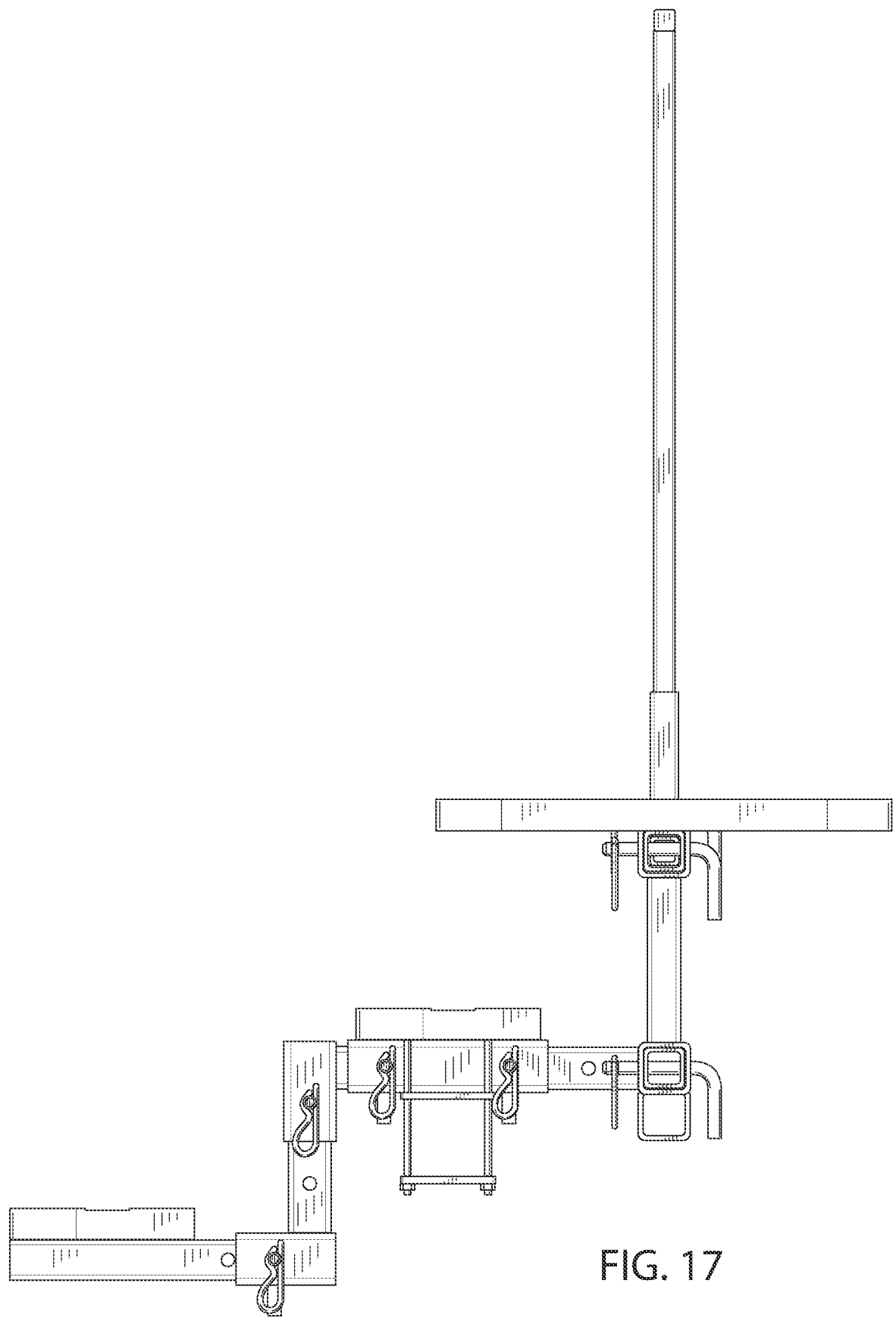
FIG. 17 is a rear elevation view of FIG. 10 thereof.

The corresponding holes at the proximal end of the lateral sides and the top and bottom, respectively, and the corresponding holes at the distal end of the lateral sides and the top and bottom, respectively, each align forming a set of holes for receiving a hitch pin therethrough. The hitch pin is preferably a standard ⅝ inch hitch pin. The hitch pin 15 may be a quick-release hitch pin, a locking hitch pin with keys, or a common ⅝ inch bolt with a nut. The hitch pins are drawn through the appropriate aligned holes in the slidably coupled mounting tubes to secure the mounting tubes together. Selecting which set of holes should receive a hitch pin, either the lateral side holes or the top-bottom holes, depends on the orientation and number of the attachment members or accessories coupled to the base tube. For example, if only one attachment member is coupled to the base tube, then only one hitch pin is inserted through one set of holes in the base tube and in the corresponding holes of the attachment member. As shown in FIG. 11, one attachment member is inserted into and coupled to each open end of the base tube. Here, two hitch pins are used to secure the two independent attachment members through the holes in the lateral sides of the base tube. An attachment member may be coupled to the base tube either vertically or horizontally, then secured with the hitch pin drawn through the appropriate set of holes in the base tube and attachment member.

Each of the two mounting plates 5, 6 of the mounting bracket 2 is essentially a flat rectangular or square plate that further defines a plurality of bores. Each mounting plate is independent from the other, but both are used to essentially sandwich or otherwise securely abut against the frame with the fasteners. Each mounting plate may be made from steel. In a preferred embodiment, each mounting plate is ¼ inch thick. The custom mounting bracket is the foundation of the hitch mount assembly to which varying selective combinations of attachment members and accessories may be attached. The two mounting plates of the mounting bracket can be interchanged with each other.

As shown in the figures, the base tube 3 of the mounting bracket 2 is permanently affixed to or otherwise welded to the top of at least one of the mounting plates 5. The base tube is preferably centered on the mounting plate. Each mounting plate 5, 6 has a width wider than the width of the base tube 3. Each mounting plate has a depth or thickness more than the depth or thickness of the base tube. The length of each mounting plate is shorter than the base tube. In another embodiment (not shown), each of the two mounting plates has a base tube affixed to it, with the mounting plates sandwiching the frame at the respective unaffixed surfaces of each mounting plate. Up to four independent attachment members or accessories, each having its own configurations or extensions, may be each supported within one of the open ends of the base tubes when two base tubes are used.

In the embodiment shown in the figures, a first mounting plate (upper mounting plate) 5 is a plate having a contoured or indented edge on a forward section and a rear section of the mounting plate. The second mounting plate (bottom or lower mounting plate) 6 does not have any contoured or intended edge. A purpose for the contoured edge on the forward and rear sections of the mounting plate 5 is to accommodate a hitch pin 15 drawn through the top and bottom aligned holes 4 of the base tube 3. FIG. 2 shows the contoured forward and rear sections of the mounting plate along with the bottom holes of the base tube.

Preferably and as shown in the figures, each mounting plate 5, 6 further defines two rows of bores 7, with each row having four spaced apart square bores for eight total square bores per mounting plate. Each bore 7 is spaced approximately in 1-inch intervals. The two rows of bores are preferably defined in each mounting plate at 1-inch, 2-inch, 3-inch, and 4-inch arrangements. When assembled, a first of the two mounting plates is positioned above the frame, and a second of the two mounting plates is positioned below the frame, with the first mounting plate being arranged and aligned parallel to the second mounting plate. When the two mounting plates are aligned, the bores of the first mounting plate correspond to the bores of the second mounting plate. The aligned bores form a bore set, with the two mounting plates having four bore sets to accommodate different frame sizes. The size of the frame to which the mounting plates are sandwiched determines which of the bore sets receives one of the plurality of fasteners. Preferably, only four bore sets are used when removably securing the mounting plates to the frame. Each bore set receives one fastener therethrough.

The location of the bores in the mounting plates allows a user to use the same mounting bracket on frames having different widths. For example, the mounting plates may be removably mounted to a 2-inch wide frame or a 3-inch wide frame by installing a fasteners at the two outermost bore sets and a fastener at the two 2-inch or two 3-inch bore sets. In another embodiment, the mounting plates may be removably mounted to a 4-inch wide frame by installing the four fasteners at the 1-inch and 4-inch bore sets.

During installation as shown in FIG. 9, a first mounting plate 5 is positioned on top of the frame and a second mounting plate 6 is positioned underneath the frame, with the mounting plates being parallel to the other. Next, the plurality of fasteners 8 are drawn through the appropriate bore sets 7 defined in the mounting plates 5, 6 to secure and sandwich the mounting plates 5, 6 against the frame. This mounting plate sandwich secures the mounting bracket to the frame and eliminates all movement on the frame after the attachment members are assembled. Each of the plurality of fasteners 8 is preferably a threaded square carriage bolt with a locking nut and a washer. Preferably, the carriage bolt threads extend from a distal portion of each carriage bolt to approximately half the height of the carriage bolt. The length of the carriage bolts depends on the height of the frame plus a 1-inch allowance on each side of the mounting plate. The carriage bolts are a minimum grade 5 hardness for achieving optimal results for the hitch mount assembly. For example, a 3×3 inch frame requires 5-inch carriage bolts. In another example, a 3×4 inch frame requires 6-inch carriage bolts. The user may select which of the four bore sets should receive the four fasteners so that the two mounting plates have the most snug fit about the frame as possible.

The plurality of attachment members includes one or more of the following: extenders, risers 9, hand poles 23, steps 10, tire carriers, and jack mounts. An extender is one of the plurality of attachment members, and may include one or more types of extenders, each of which is essentially different types of mounting tubes. Each type of extender is essentially used to extend the length of the hitch mount assembly when configuring one or more of the plurality of attachment members and/or accessories away from, below, or above the frame, or to change the orientation of the attachment members and/or accessories from horizontal to vertical and vice versa. Like the base mounting tube, each extender is preferably made of steel and has a seamless hollow interior. Some of the extenders have opposing open ends to further accommodate receiving other mounting tubes. Other extenders have at least one closed end (insertion member) for inserting into one of the open ends of the base tube, or another attachment member, or accessory. The extender may be a straight extender, a single open-end weld-on mount member ("single extender") 16, an extender defining an opposing open ends ("double extender") 12, a coupler extender, a T-extender, a short L extender 11, or a long L extender 22.

The straight extender is essentially an elongated mounting tube defining two spaced apart holes near a proximal lateral side of the mounting tube and two spaced apart holes near the distal lateral side of the mounting tube. The opposing lateral side of the straight extender defines corresponding and aligned holes, forming four sets of holes. The sets of holes are adapted to receive a hitch pin, the selection of which depends on the user's needs. The straight extender has opposing ends that may be used as insertion members, with at least one end being closed. The straight extender may be coupled to the base tube, one or two attachment members, and/or one or two accessories. The length of the straight extender is preferably either 5-inches, 6.5-inches, or 8-inches. The ends have 2×2-inch dimensions. The straight extender is essentially an insert to add more length to the hitch mount assembly during installation.

The double extender 12 is a mounting tube defining opposing open ends, four lateral sides, and a seamless hollow interior. The lateral sides of the double extender are essentially identical. Each lateral side of the double extender 12 defines two spaced apart holes 13 near a proximal end of double extender 12 and two spaced apart holes 13 near the distal end of the double extender 12. The opposing lateral side of the double extender defines corresponding and aligned holes, forming four sets of holes. The sets of holes 13 are adapted to receive a hitch pin 15, the selection of which depends on the user's needs. The double extender may be coupled to the base tube, one or two attachment members, and/or one or two accessories. The double extender is essentially an insert to add more length to the hitch mount assembly during installation. The double extender and straight extender are nearly identical, except that the straight extender has at least one closed end, and preferably two opposing closed ends. Alternatively, the double extender may be welded to any solid steel part of the frame.

The single extender 16 is the smallest size of the extenders of the plurality of attachment members. The single extender is a single weld on mounting tube. The single extender is a substantially rectangular, short mounting tube that defines at least one open end for coupling to another attachment member, the base tube, or an accessory. The single extender 16 has four lateral sides, with each lateral side defining a hole 17 therethrough. Each hole 17 is aligned with and corresponds to the hole 17 on the opposing lateral side. The holes 17 receive a hitch pin 15 for securing the single extender 16 to another attachment member, the base tube 3, or to an accessory. The single extender may be used as part of the riser 9. In another example, the single extender may be welded directly to any solid steel location of the frame.

The coupler extender is an elongated mounting tube having a first portion with an insertion member and a second portion defining an open end. The first portion of the coupler extender is smaller than and extends from the second portion of the coupler extender. The first portion of the coupler extender has one lateral side defining three spaced apart holes therethrough that are aligned with and correspond to three spaced apart holes defined in the opposite lateral side of the couple extender. The corresponding, aligned holes in the lateral sides form three sets of holes. The second portion of the coupler extender defines at least a one hole therethrough. A hitch pin may be inserted through any set of holes of the coupler extender. The coupler extender allows for a 4-inch, 6-inch, or 8-inch extension the attachment member or accessory. The coupler extender has one 2-inch insertion member and one 2-inch receiving open end.

A T-extender is provided when a double extender is welded to or otherwise permanently and affixed perpendicularly to second mounting tube. The second mounting tube may have at least one closed end. The second mounting tube has two lateral sides, each lateral side defining at least one hole, preferably two holes, that is aligned with and corresponds to the opposing lateral side hole(s).

The long L-extender 22 is essentially a single extender 16 perpendicularly abutting an elongated mounting tube at ninety degrees, forming an L-shape. The single extender portion of the L-extender defines opposing open ends and has two lateral sides each defining a single hole 25 for receiving a hitch pin 15. The elongated mounting tube defines one open end and has two lateral sides. Each lateral side of the elongated mounting tube has at least two spaced apart holes 25, each hole 25 for receiving a hitch pin 15. Each hole of one lateral side is aligned with the corresponding hole of the opposing lateral side. Preferably, one lateral side of the elongated mounting tube has three spaced apart holes that correspond to the three spaced apart holes on the opposing lateral side. The three holes defined in the elongated mounting tube of the L-extender allows for 4-inch, 5½-inch, or 7-inch coupling to the base tube, another attachment member, or an accessory.

The short L-extender 11 is essentially two single extenders arranged into an L-shape, wherein one end of the single extender abuts the side of another single extender. Here, one of the single extenders 16 is larger than the other single extender, with the larger single extender being the same size as the single extender used with the riser 9. Each of the single extenders defines a single hole 26 through opposing lateral sides, for a total of four holes. The holes defined in the smaller single extender are located near a distal end of the smaller single extender. The holes defined in the larger single extender are preferably centrally located on the larger single extender.

To form a Z-extender (not shown) or U-extender (not shown), a short L-extender and a long L-extender are coupled together to form an adjustable U-shaped extender or Z-shaped extender to provide more versatility to the assembly configuration. The orientation of the base tube can be changed to use the hitch mount assembly with a vertical frame by using an L-extender.

Figure 18:
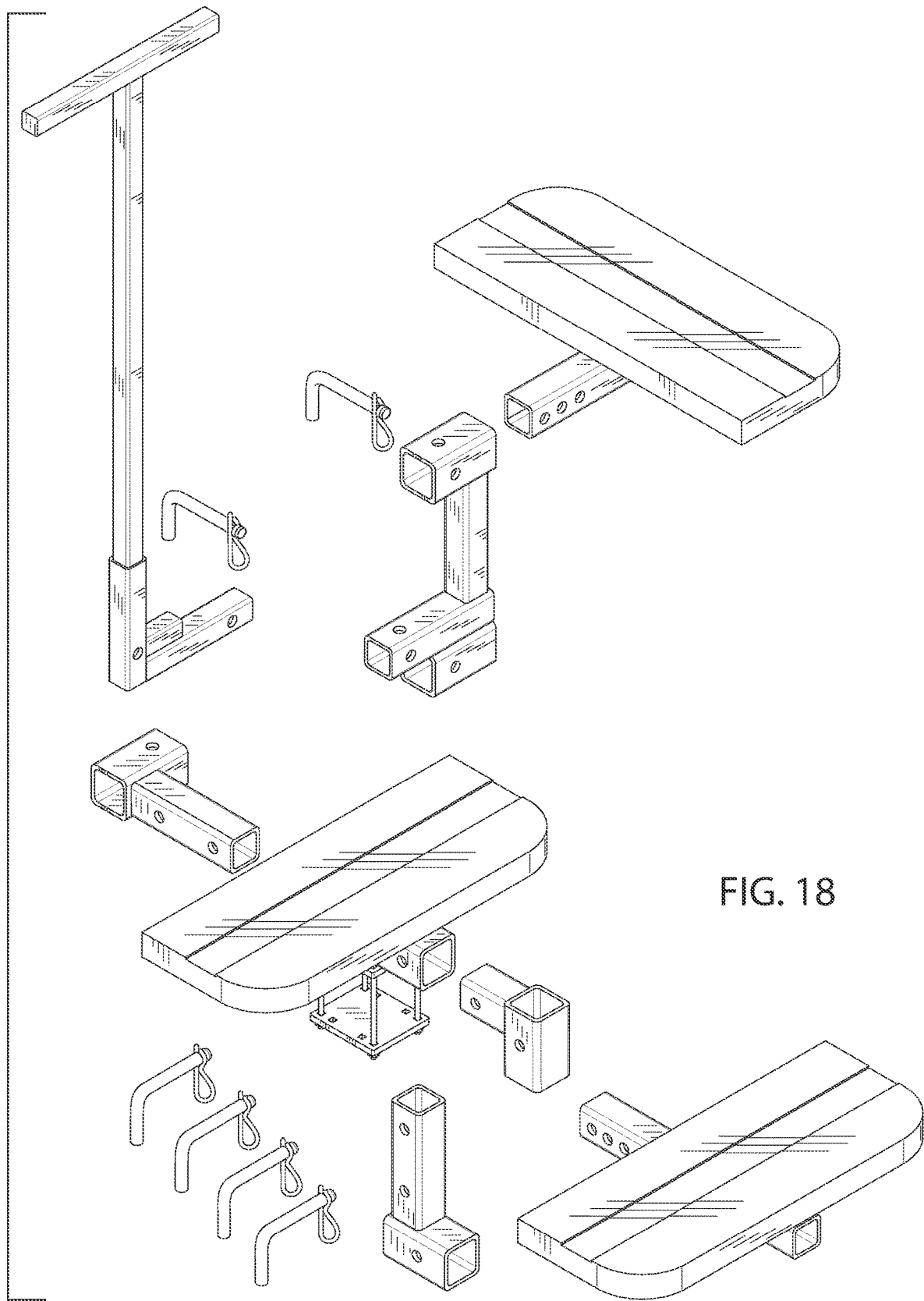
FIG. 18 is a perspective view of FIG. 10, showing the components of the stair kit disassembled.

The riser 9 is one of the plurality of attachment members. The riser allows the user to change the height and/or horizontal orientation of the assembled attachment members or accessories. The riser may be coupled to the base tube 3 or to any other attachment member. As shown in FIG. 18, the riser 9 has a horizontal bottom (lower) mounting tube 16, a middle mounting tube 19 having at least a portion of a lateral side affixed to a top surface of the bottom mounting tube 16, a support member 18 upstanding from the middle mounting tube 19, and an upper mounting tube 16 parallel to the middle mounting tube 19 and to the bottom mounting tube 16.

The bottom mounting tube 16 defines a single hole 17 at each lateral side and at the bottom of the bottom mounting tube. The middle mounting tube 19 defines a single hole 20 at each lateral side and at the top of the middle mounting tube 19. The upper mounting tube 16 defines a single hole 17 at each lateral side and at the top of the upper mounting tube 16. The holes 17 and 20 can each receive a hitch pin therethrough when securing another attachment member, base tube, or accessory to it. At least one end of the bottom mounting tube defines an opening for coupling to another attachment member, base tube, or accessory. The upper mounting tube further defines opposing open ends, each open end for coupling to another attachment member, base tube, or accessory. The upper mounting tube is wider than the middle mounting tube and the bottom mounting tube. The upper mounting tube and the bottom mounting tube are each 2-inch receivers. The middle mounting tube 19 is longer than the upper mounting tube 16 and the bottom mounting tube 16. The middle mounting tube has an insertion member that may be inserted into the base tube or the receiving portion of any other attachment member or accessory.

The hand pole 23 is one of the plurality of attachment members. The hand pole 23 serves two functions. First, when the hand pole is arranged in an upstanding configuration as shown in the figures, the user may use the hand pole (or support rail) to aid in lifting the user up to the frame. Second, when the hand pole is arranged parallel both to the ground and/or the base tube, the hand pole may be used as a handle to guide pushing or pulling a wheeled trailer (or frame). The hand pole 23 is essentially a handle 27, an upstanding pole member 28, an elbow brace 29, and a mounting tube 31 having an insertion member for coupling. The handle 27 is perpendicular to and affixed to the pole member 28. The pole member 28 extends from the elbow brace 29. As shown in FIG. 18, the mounting tube 31 extends from and abuts an end of the elbow brace 29. The mounting tube 31 is perpendicular to the pole member 28 and parallel to the handle 27. The mounting tube defines a 5/16-inch hole therethrough for receiving a hitch pin 15. The elbow brace 29 also defines a hole 30 therethrough for receiving a hitch pin 15.

Figure 19:
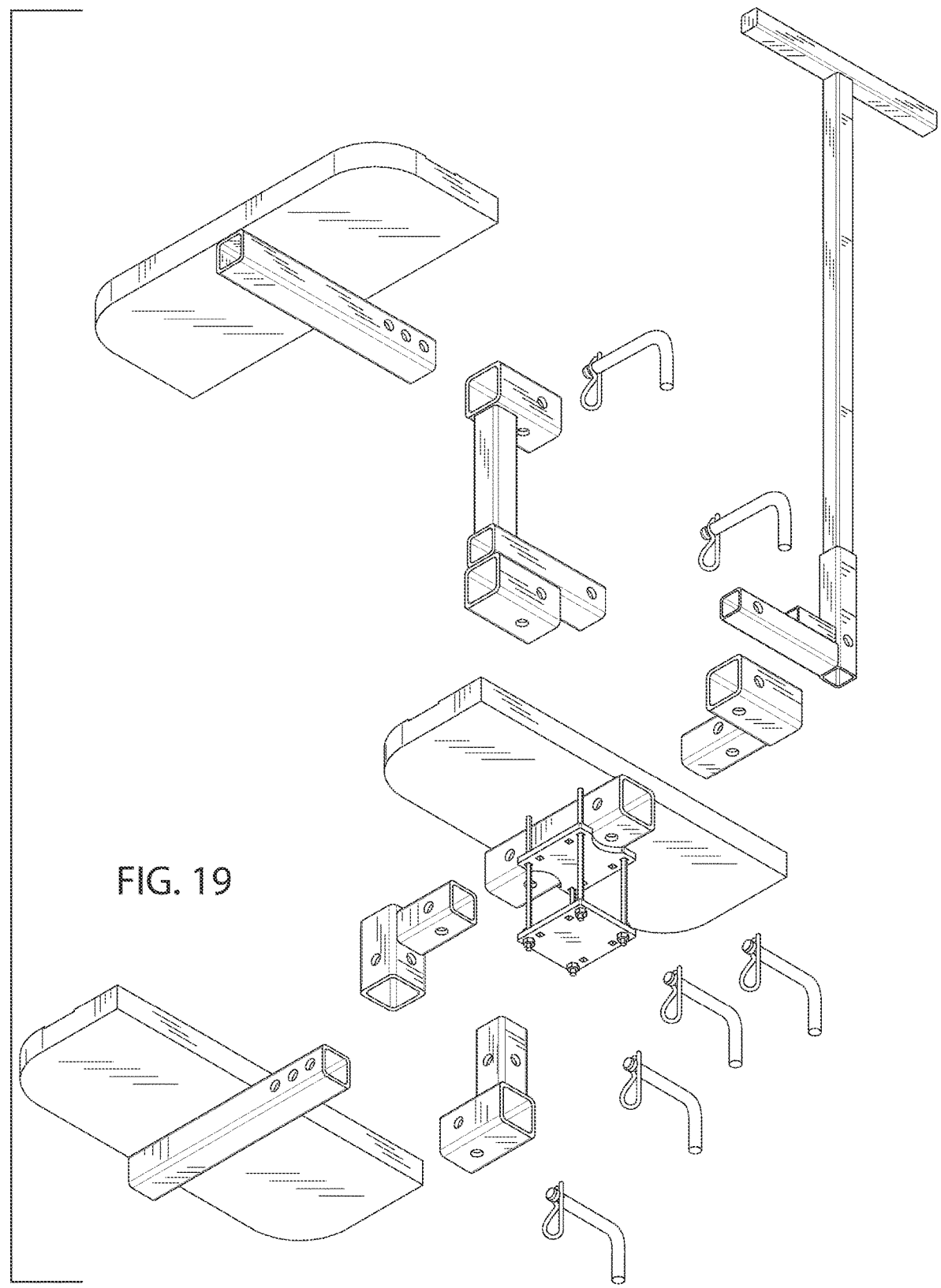
FIG. 19 is another perspective view of FIG. 18 thereof.
Figure 20:
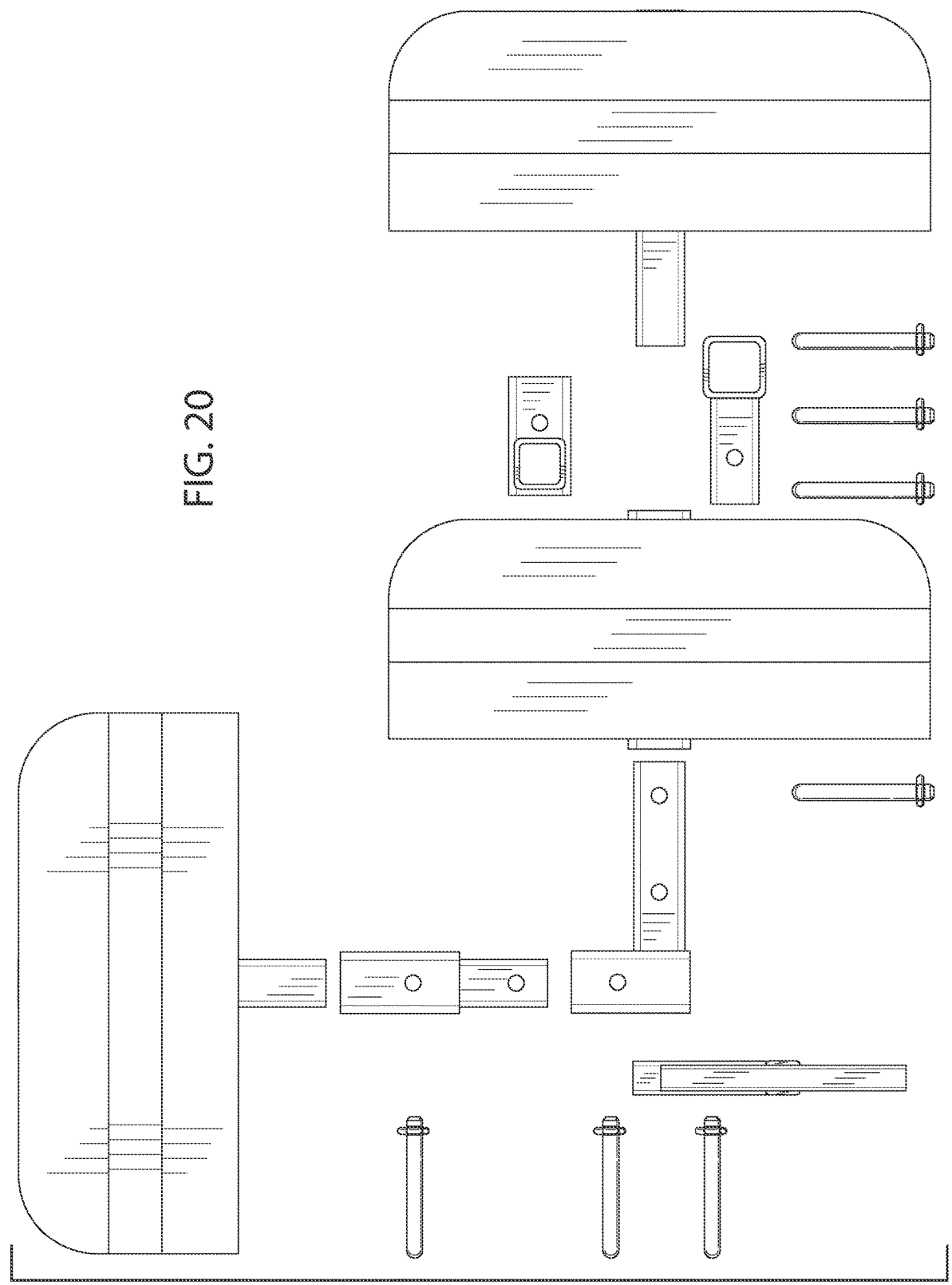
FIG. 20 is a top plan view of FIG. 18 thereof.
Figure 21:
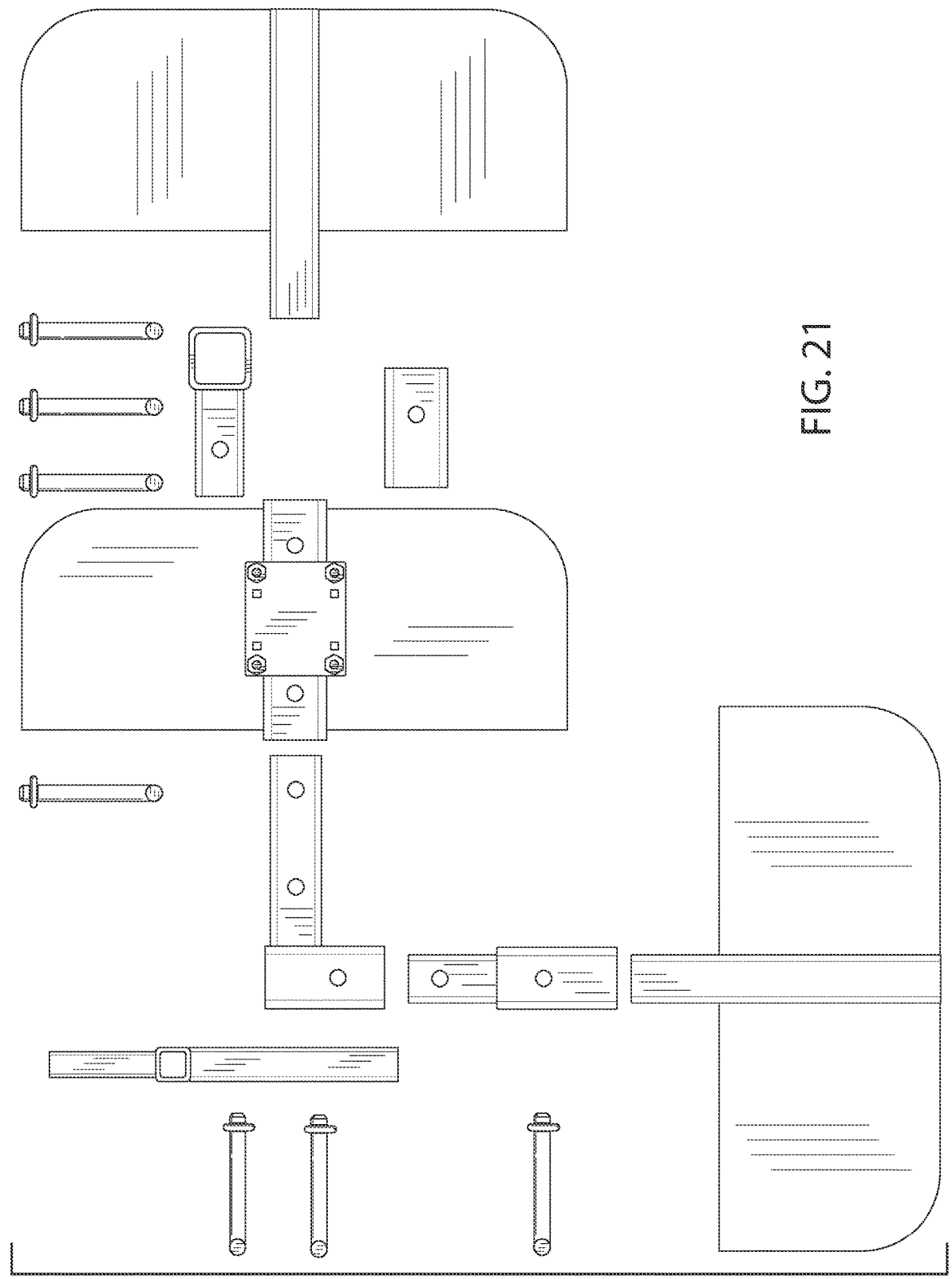
FIG. 21 is a bottom plan view of FIG. 18 thereof.
Figure 22:
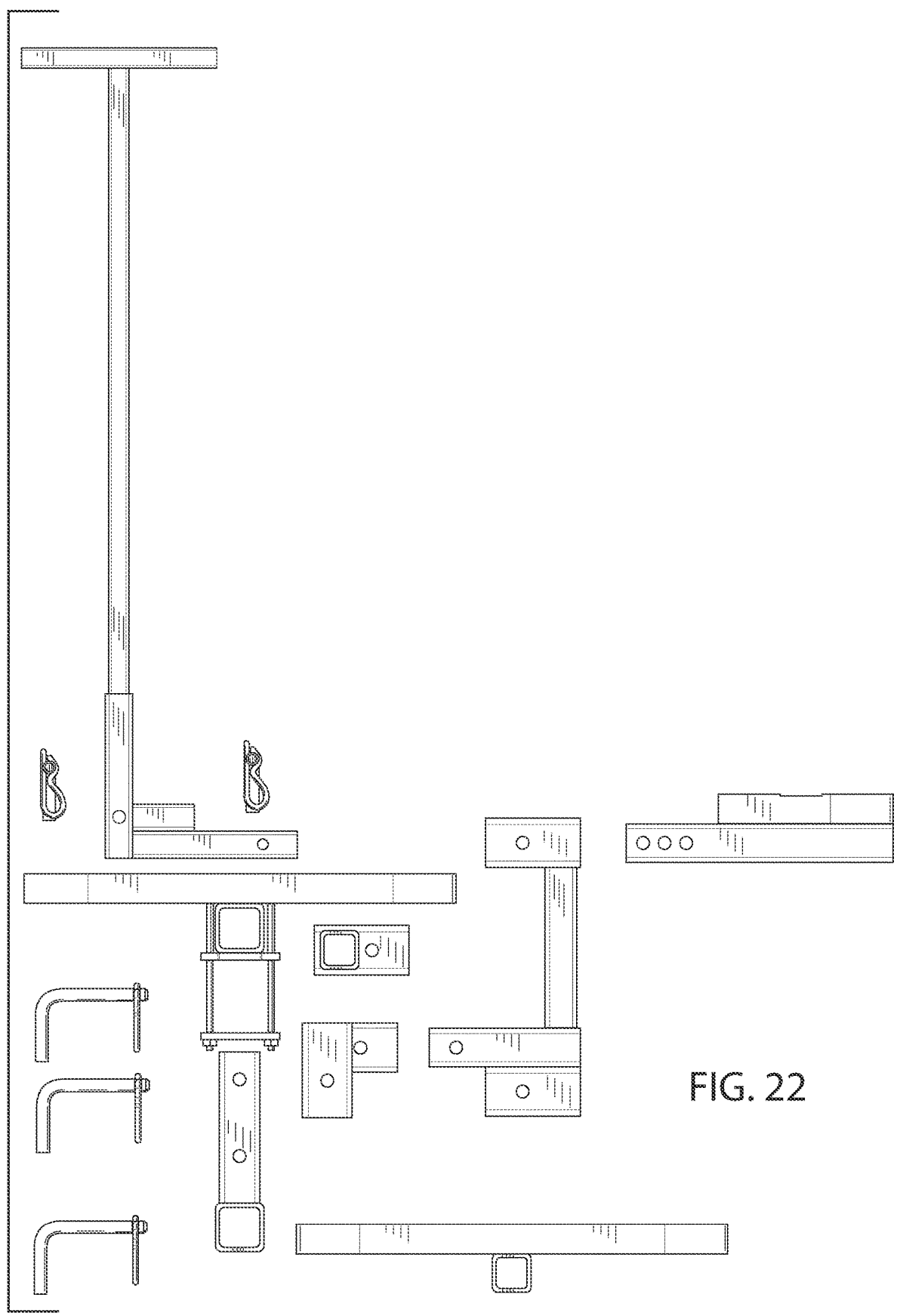
FIG. 22 is a left side elevation view of FIG. 18 thereof.
Figure 23:
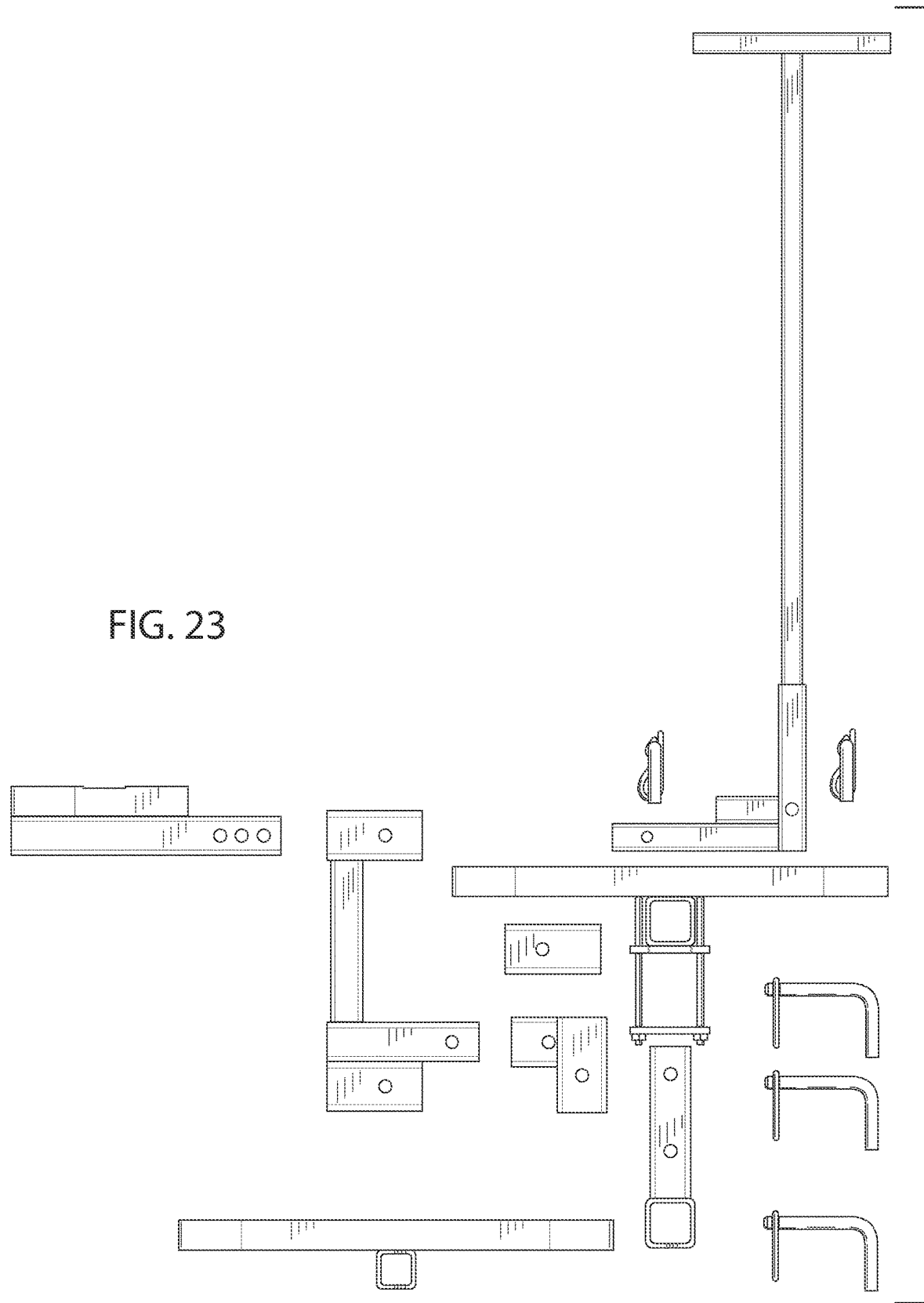
FIG. 23 is a right side elevation view of FIG. 18 thereof.
Figure 24:
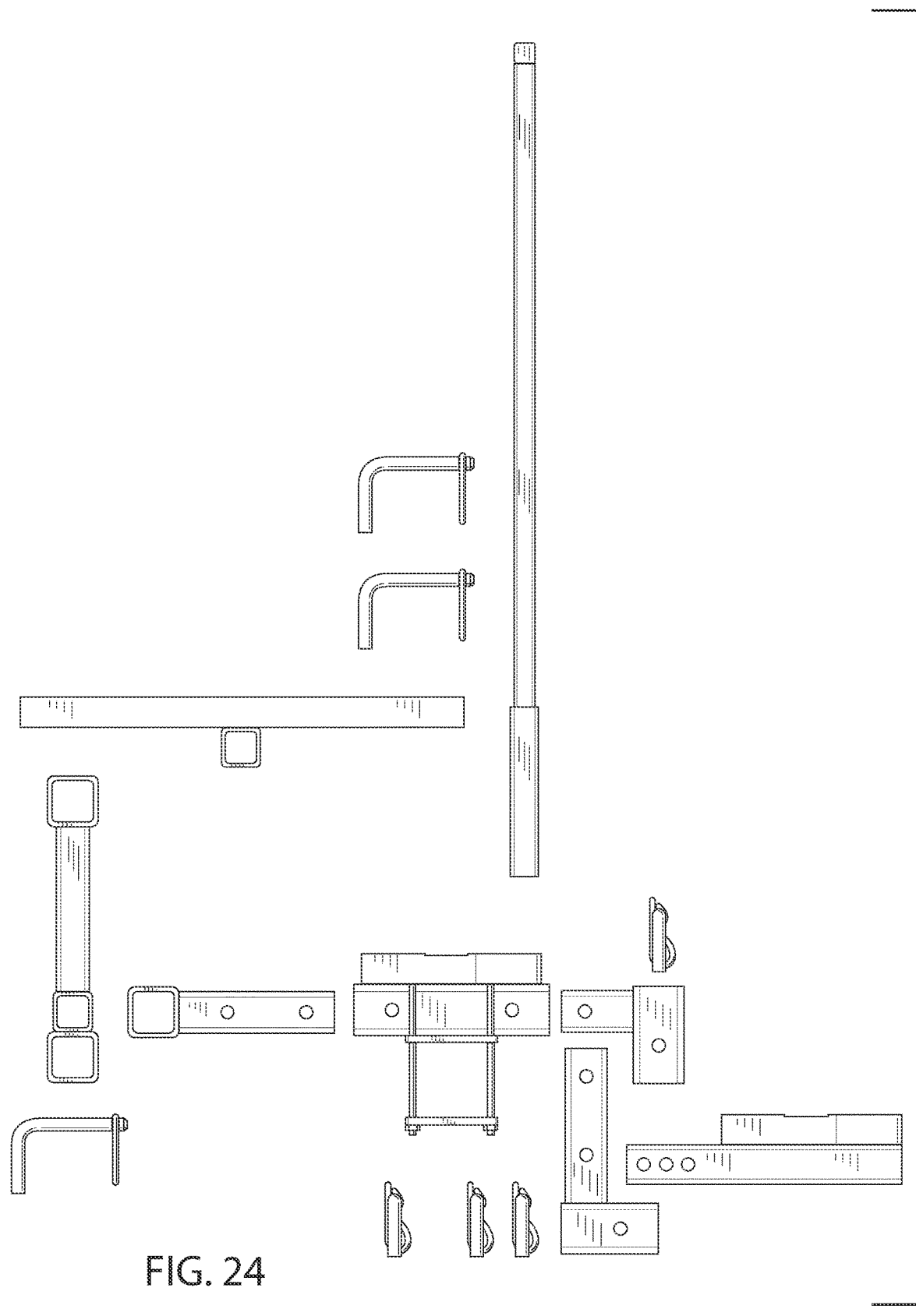
FIG. 24 is a front elevation view of FIG. 18 thereof.
Figure 25:
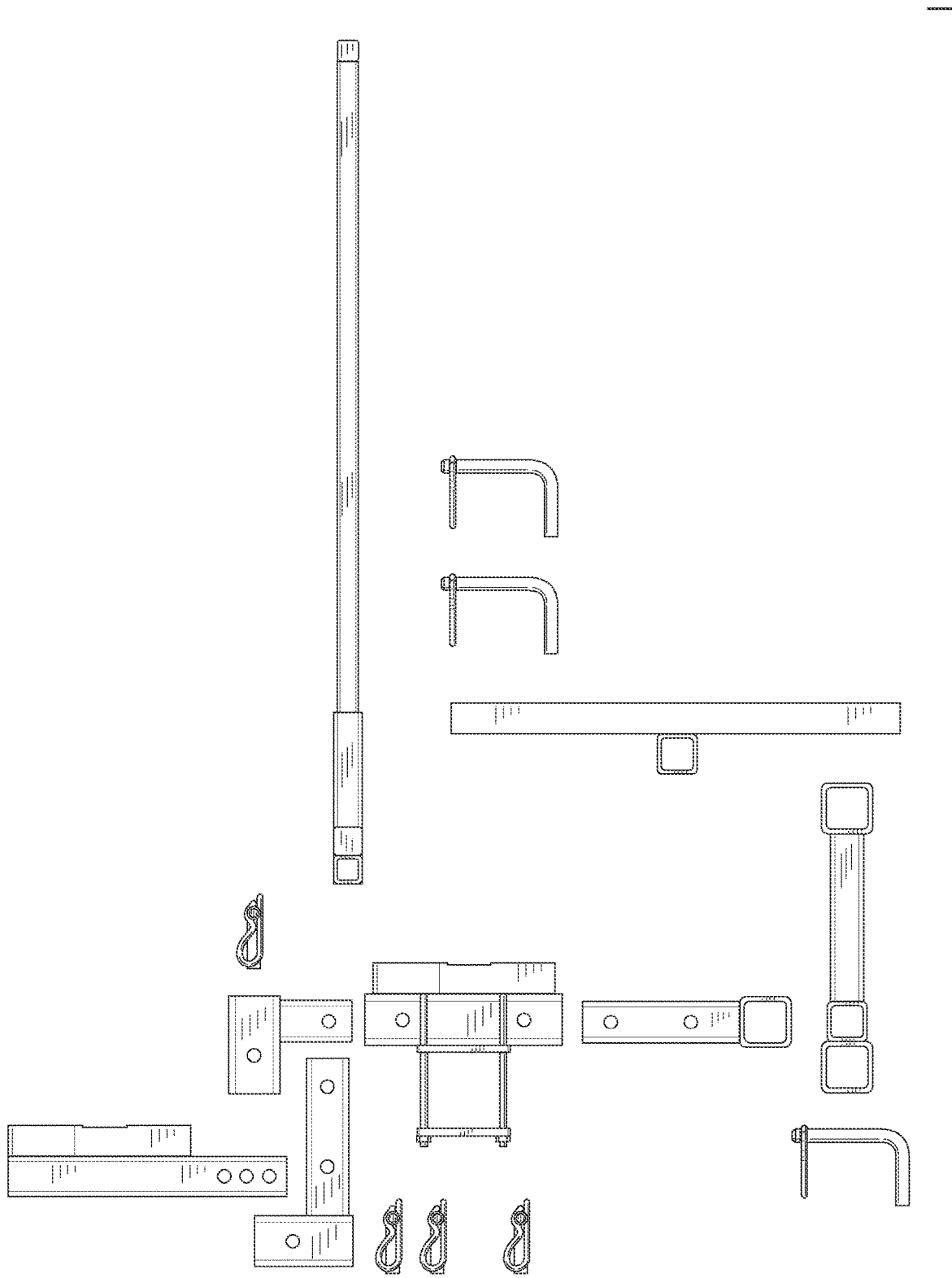
FIG. 25 is a rear elevation view of FIG. 18 thereof.
Figure 26:
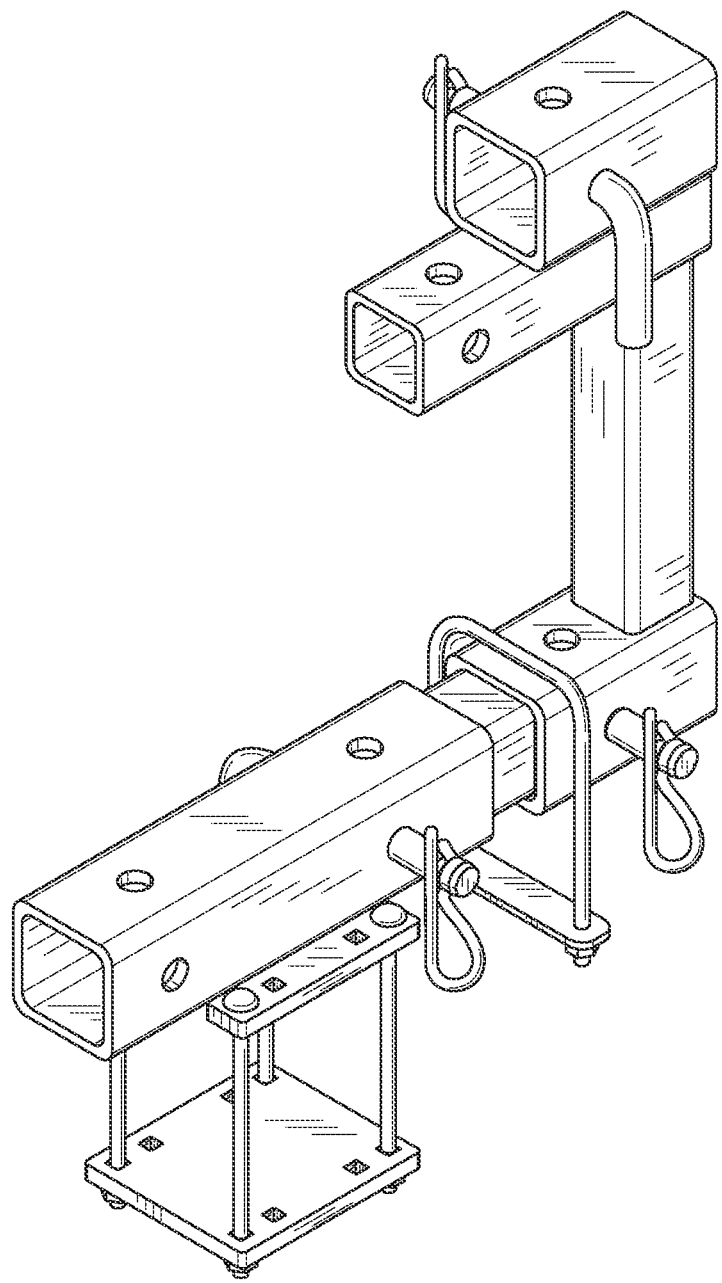
FIG. 26 is a perspective view of another embodiment of the hitch mount assembly showing a selected configuration of an assembled trailer mount kit.
Figure 27:
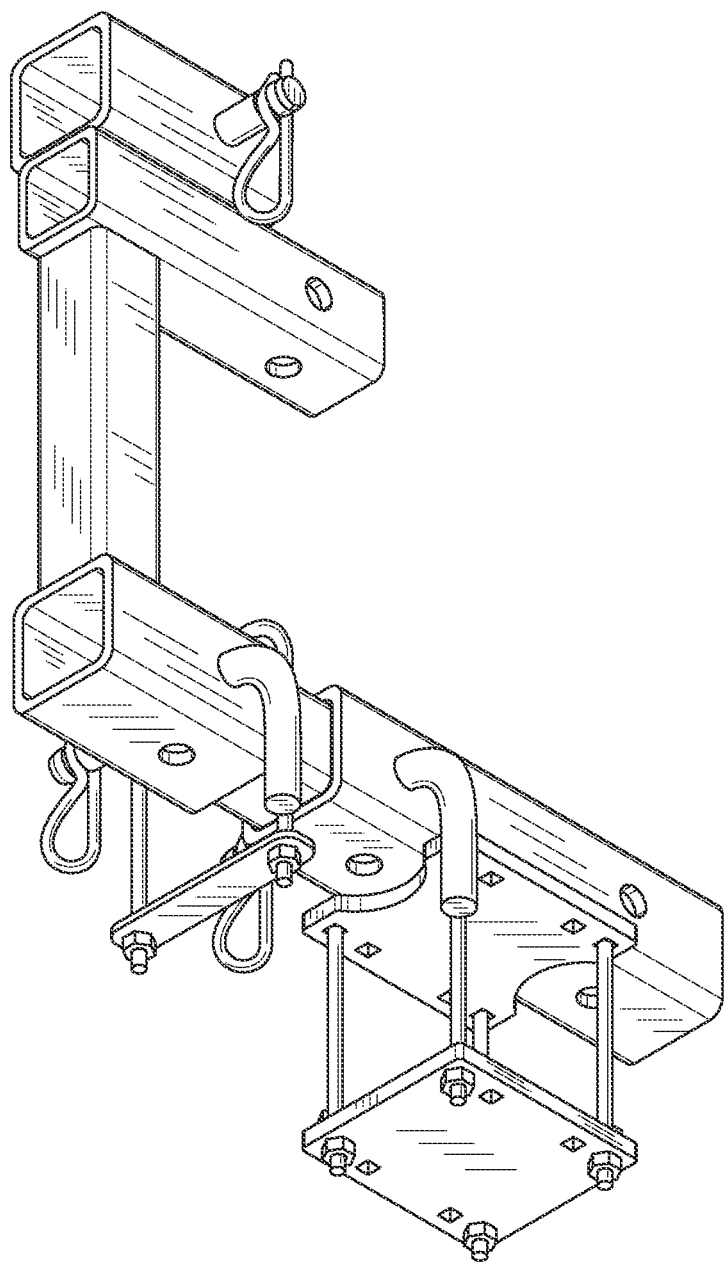
FIG. 27 is another perspective view of FIG. 26 thereof.
Figure 28:
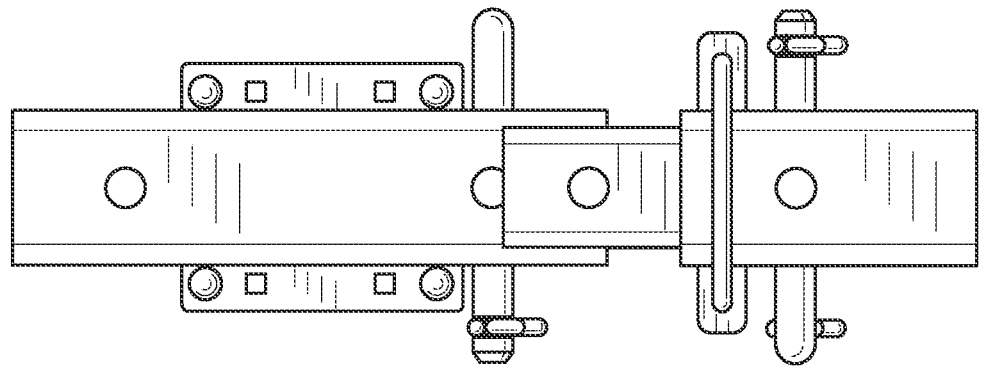
FIG. 28 is a top plan view of FIG. 26 thereof.
Figure 29:
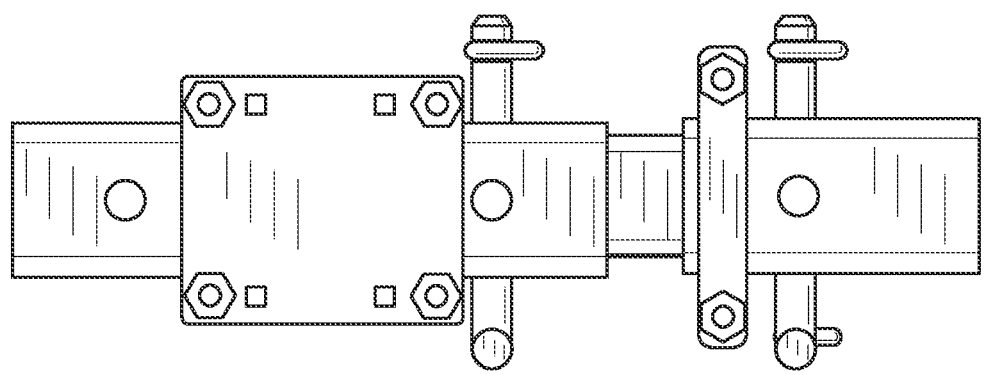
FIG. 29 is a bottom plan view of FIG. 26 thereof.
Figure 30:
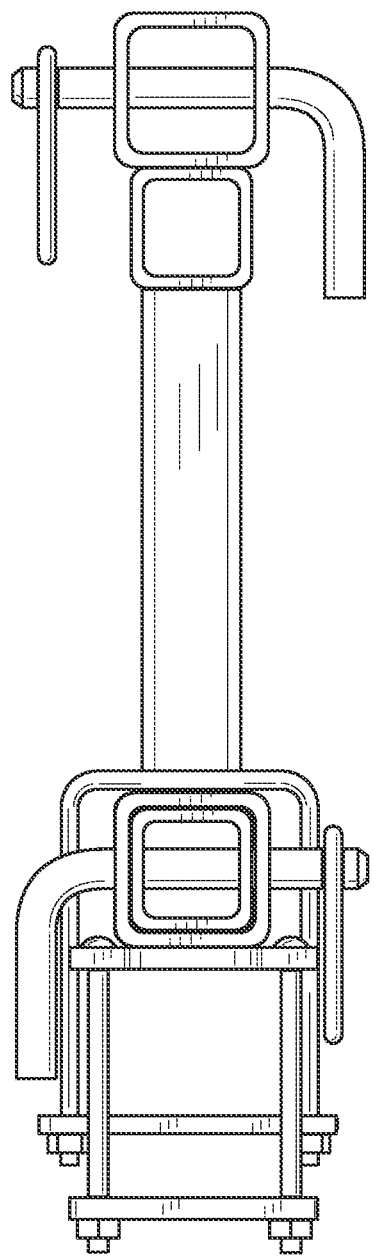
FIG. 30 is a front elevation view of FIG. 26 thereof.
Figure 31:
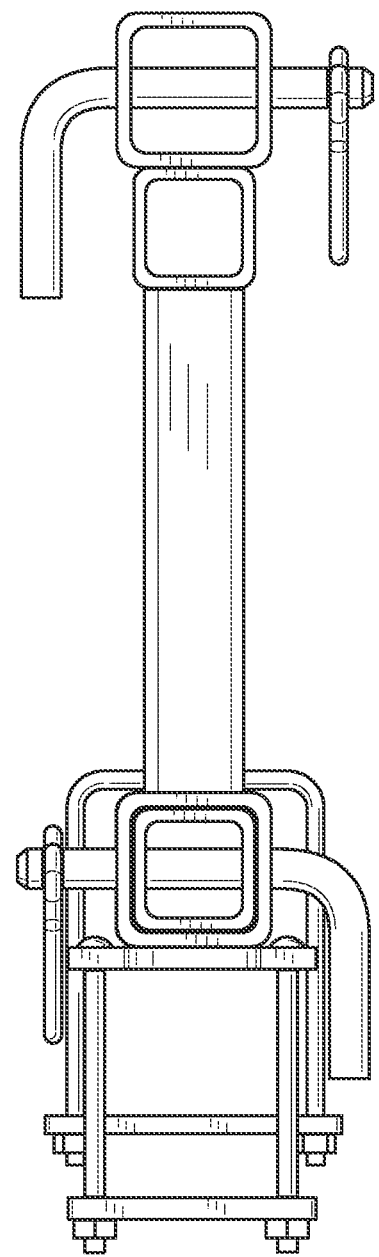
FIG. 31 is a rear elevation view of FIG. 26 thereof.
Figure 32:
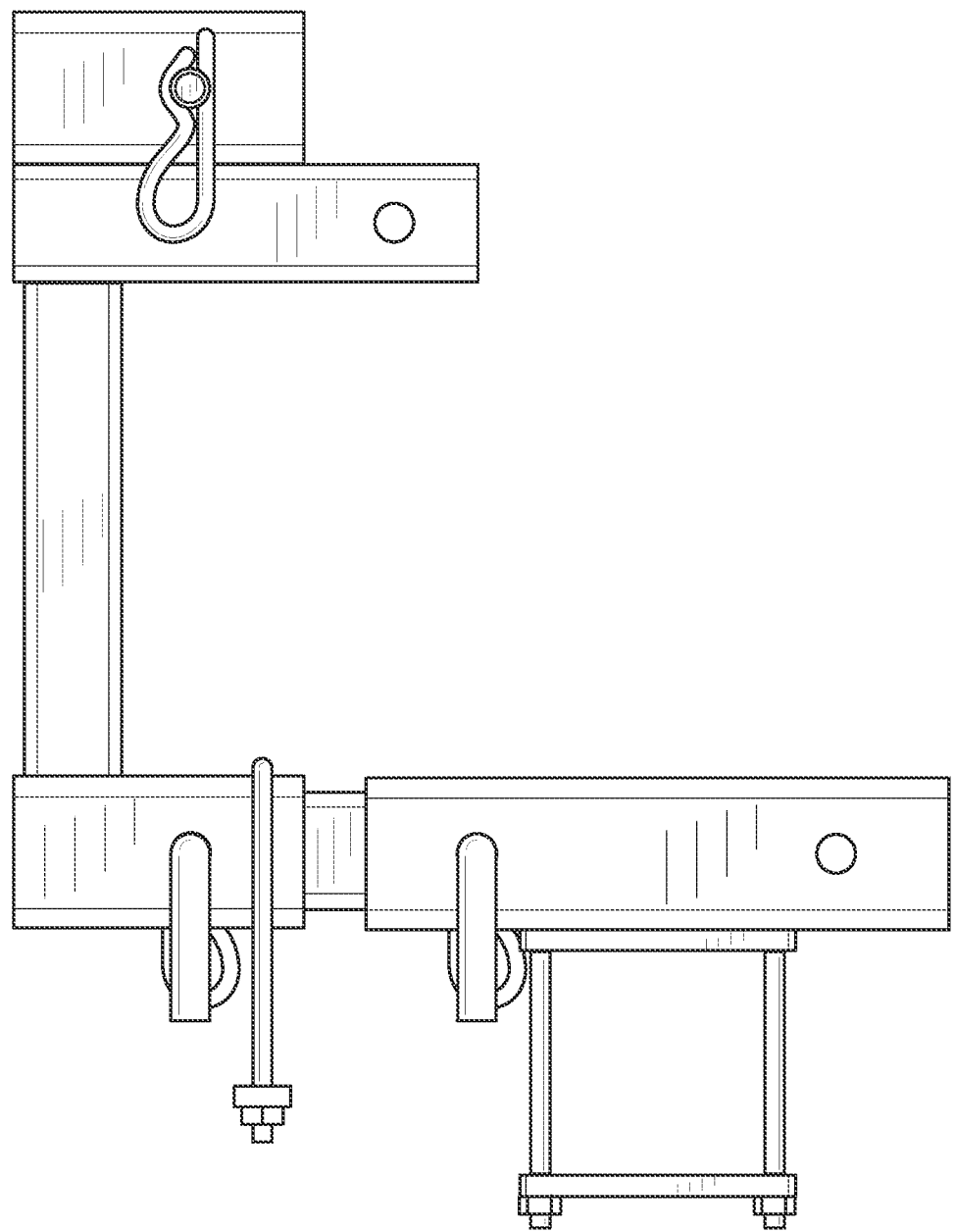
FIG. 32 is a left side elevation view of FIG. 26 thereof.
Figure 33:
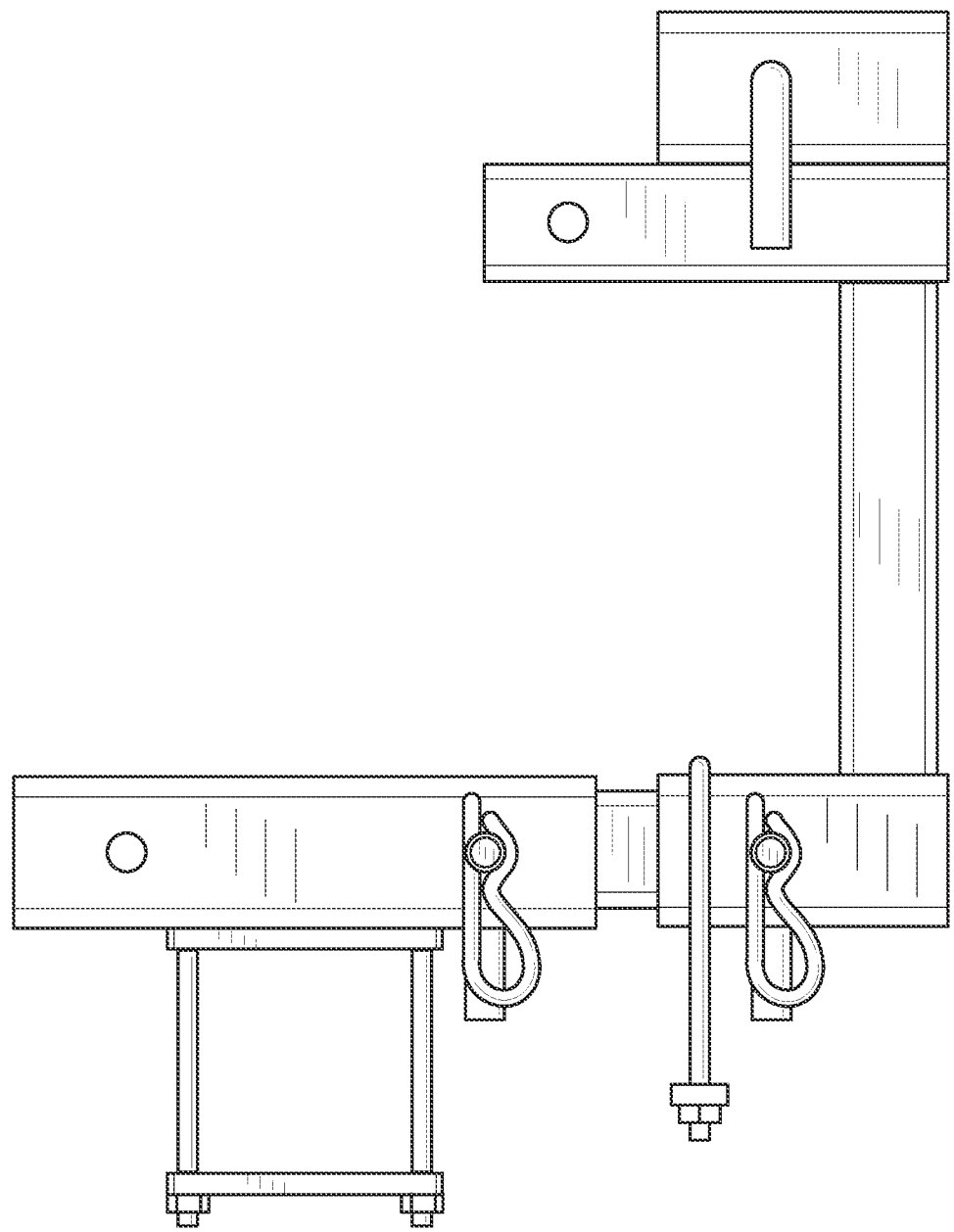
FIG. 33 is a right side elevation view of FIG. 26 thereof.
Figure 34:
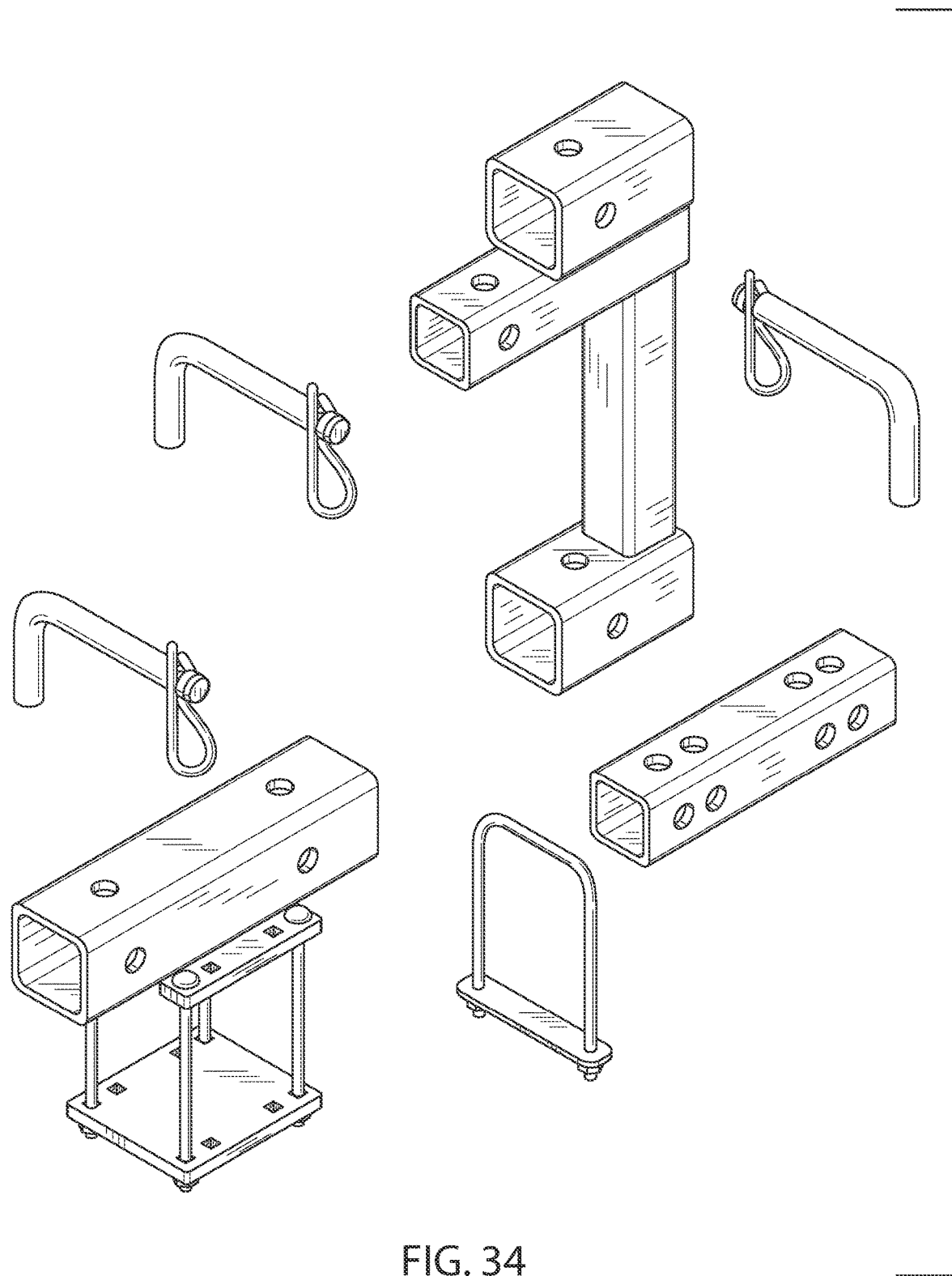
FIG. 34 is a perspective view of FIG. 26, showing the components of the trailer mount kit disassembled.
Figure 35:
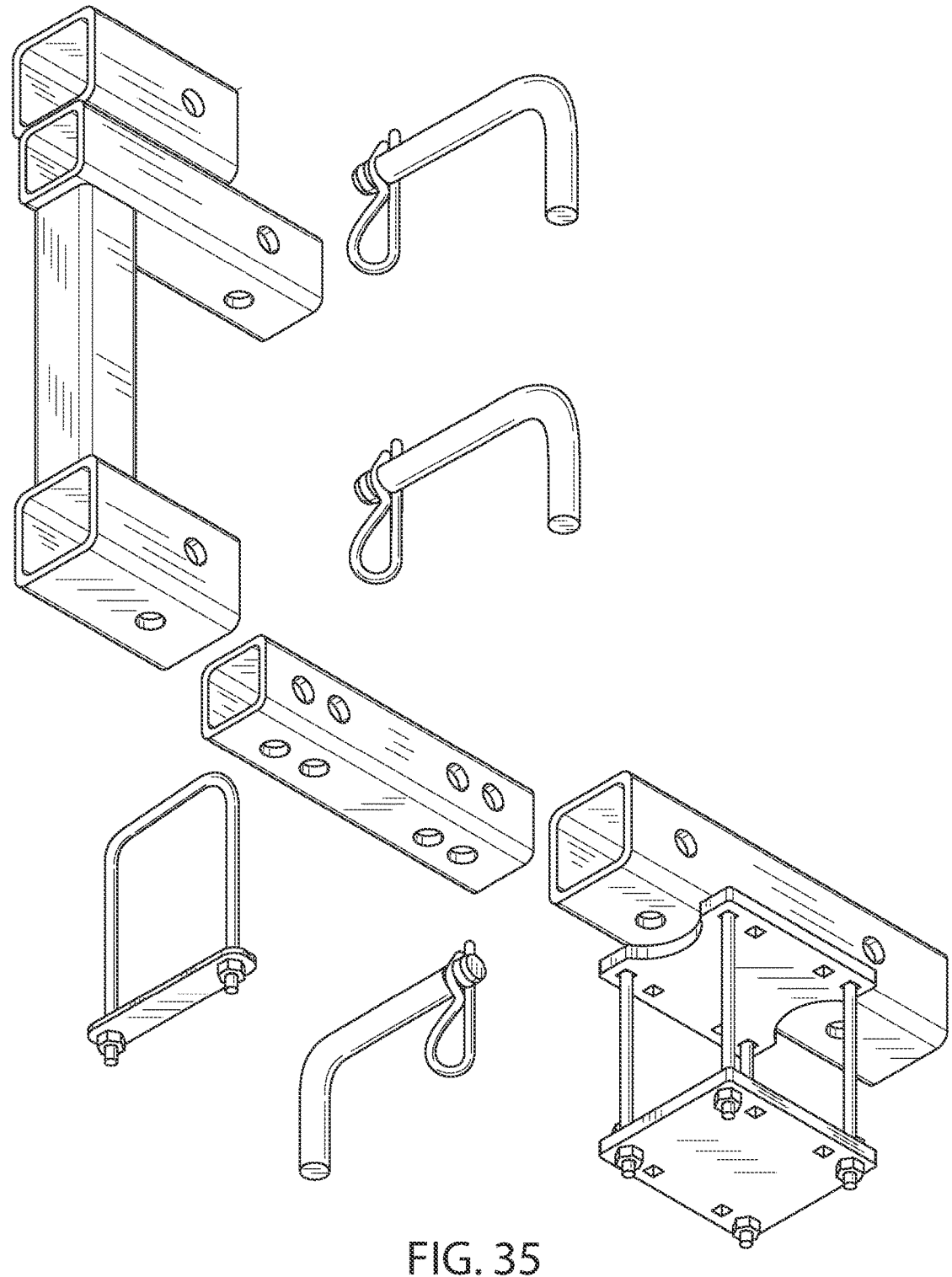
FIG. 35 is another perspective view of FIG. 34 thereof.
Figure 36:
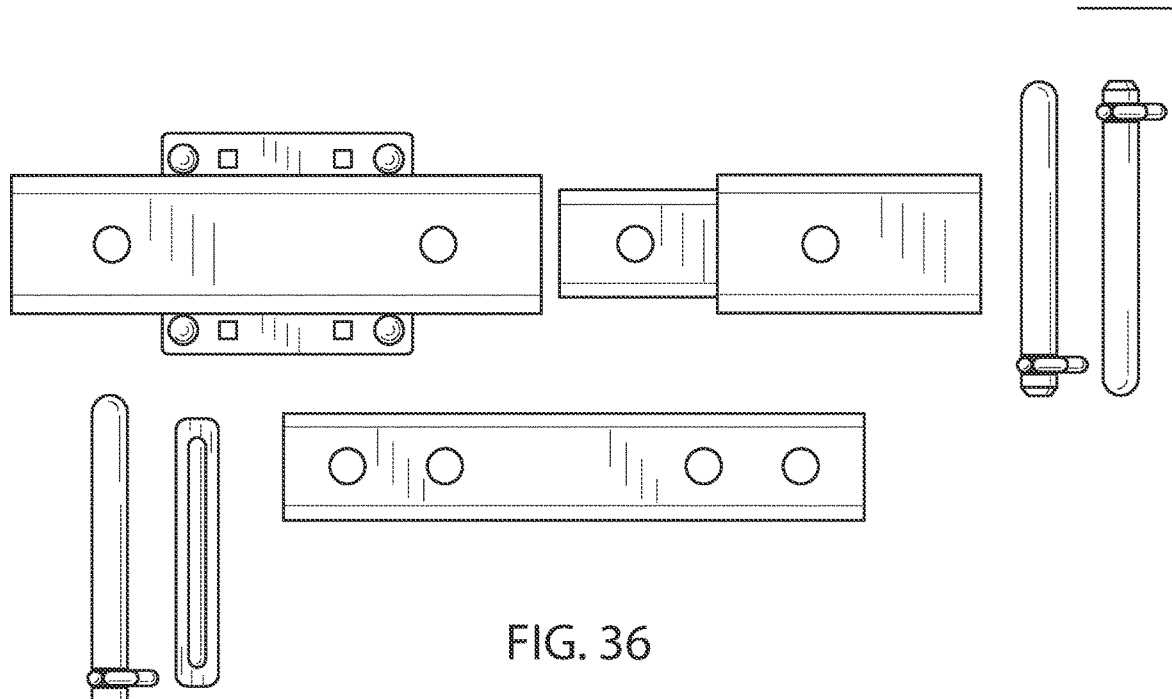
FIG. 36 is a top plan view of FIG. 34 thereof.
Figure 37:
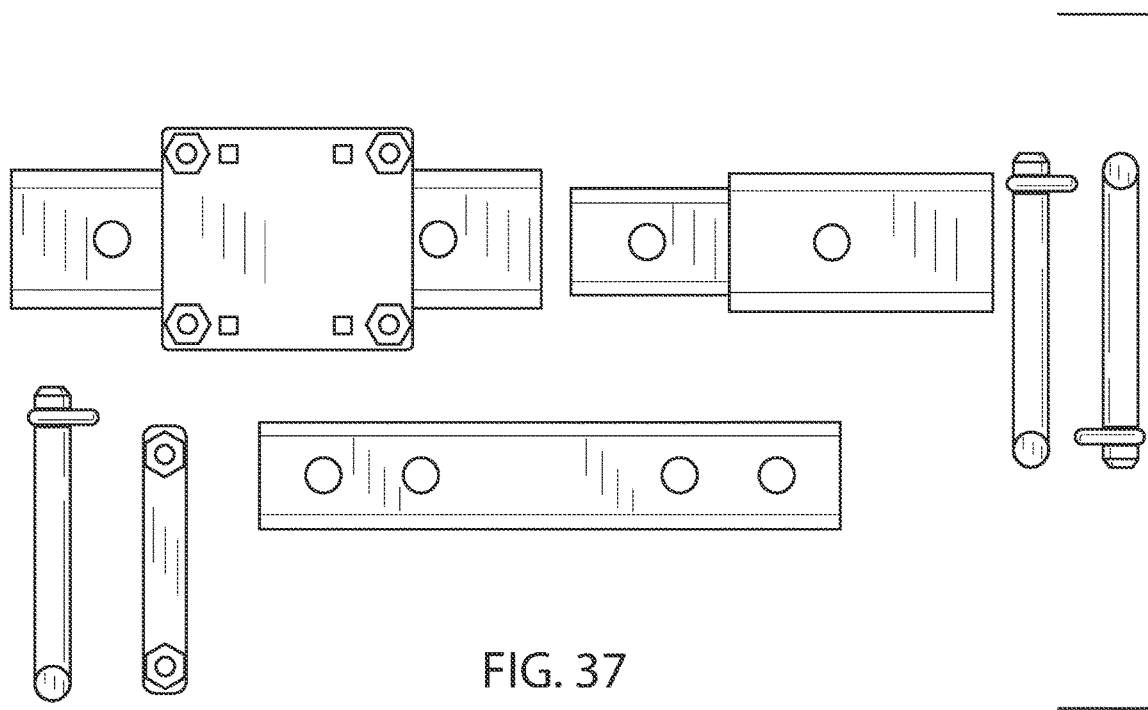
FIG. 37 is a bottom plan view of FIG. 34 thereof.
Figure 38:
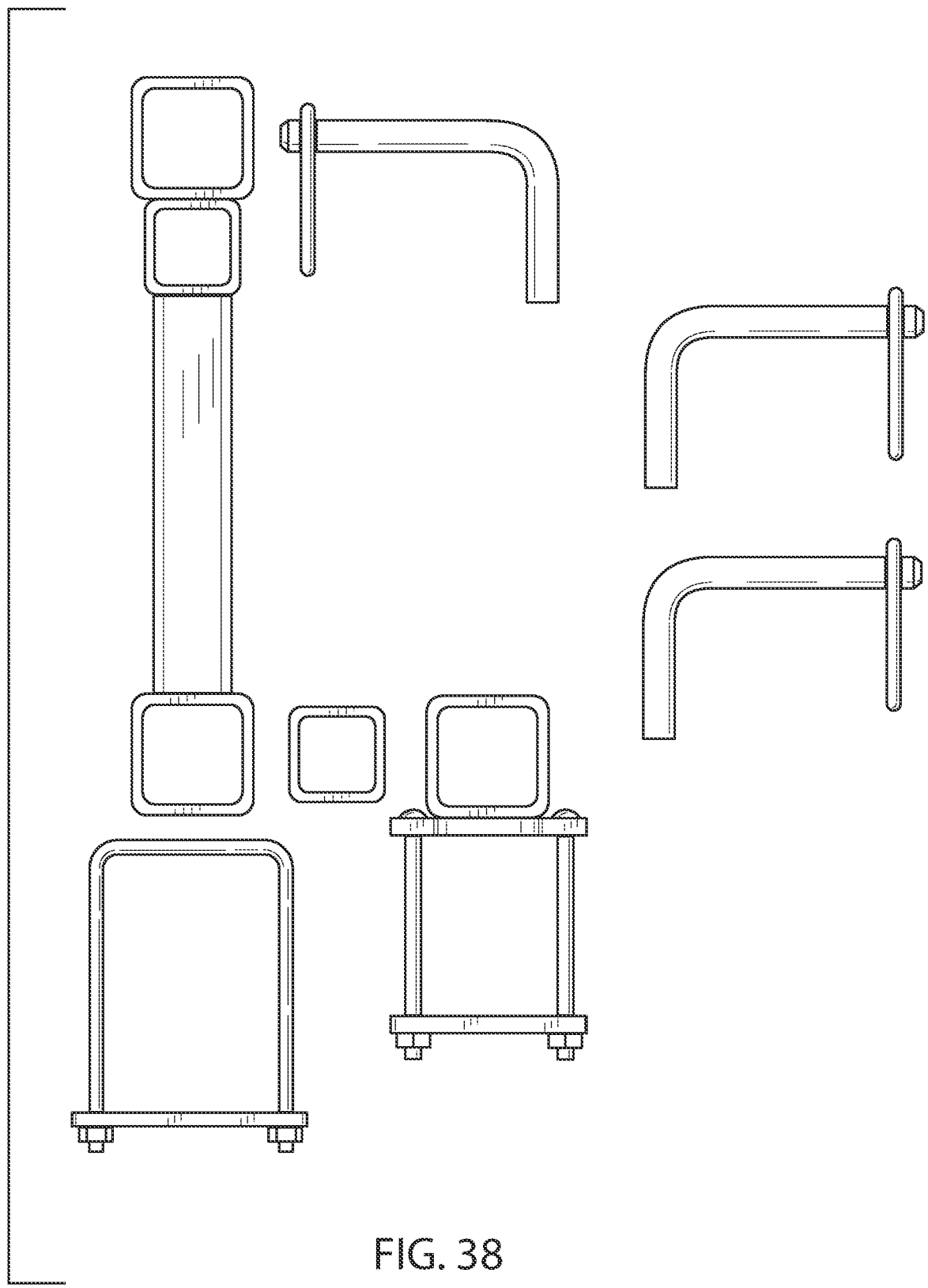
FIG. 38 is a front elevation view of FIG. 34 thereof.
Figure 39:
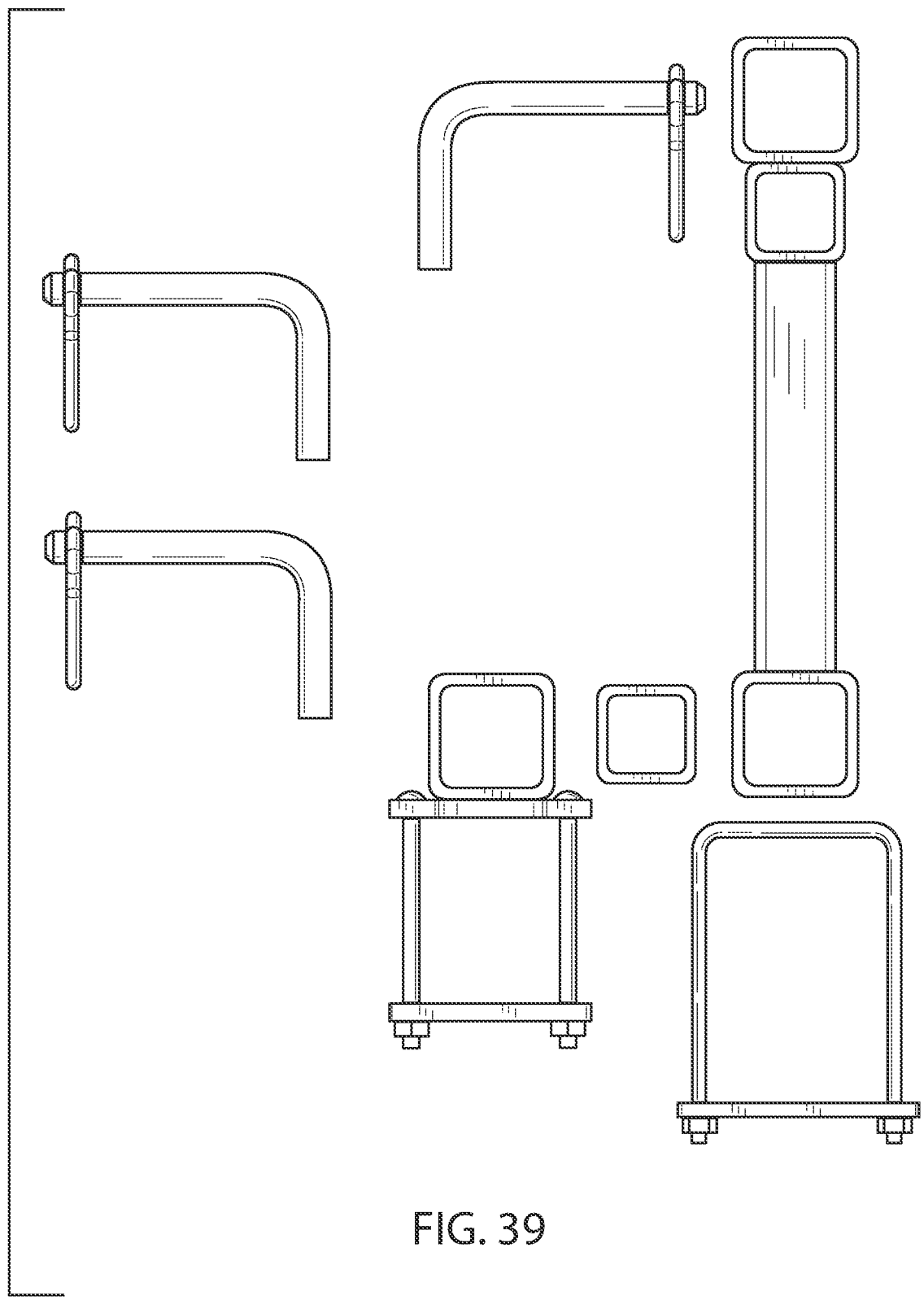
FIG. 39 is a rear elevation view of FIG. 34 thereof.
Figure 40:
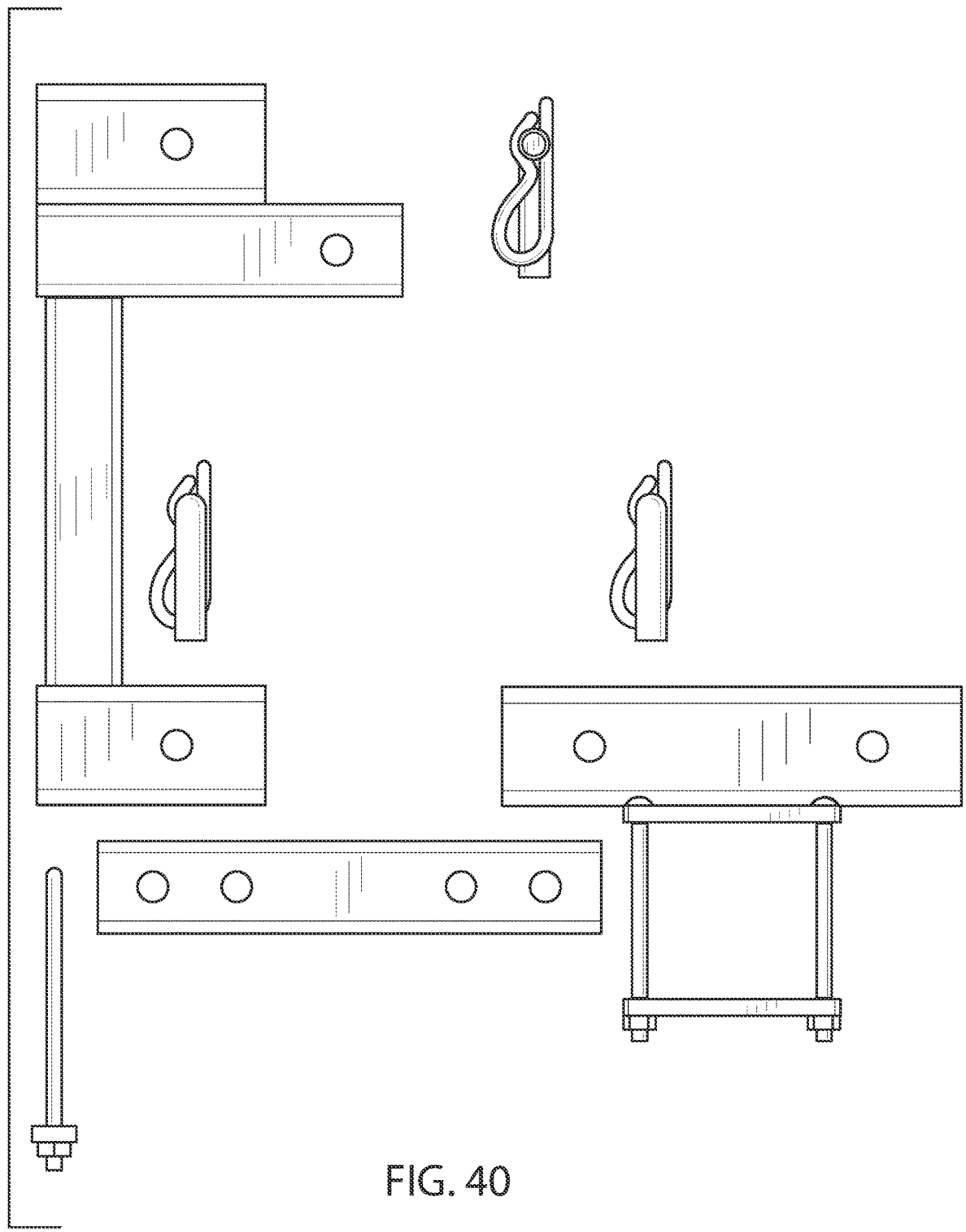
FIG. 40 is a left side elevation view of FIG. 34 thereof.
Figure 41:
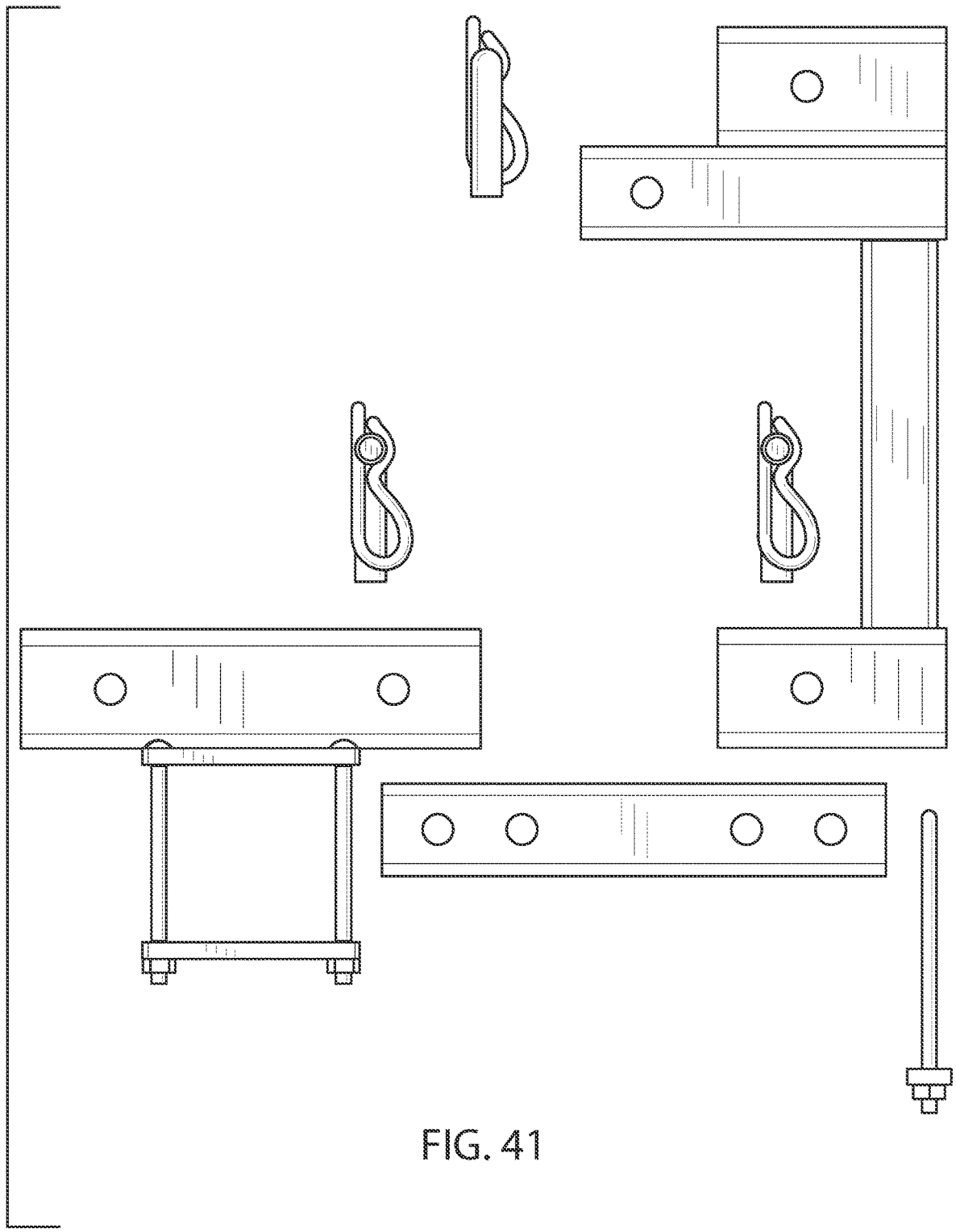
FIG. 41 is a right side elevation view of FIG. 34 thereof.
Figure 42:
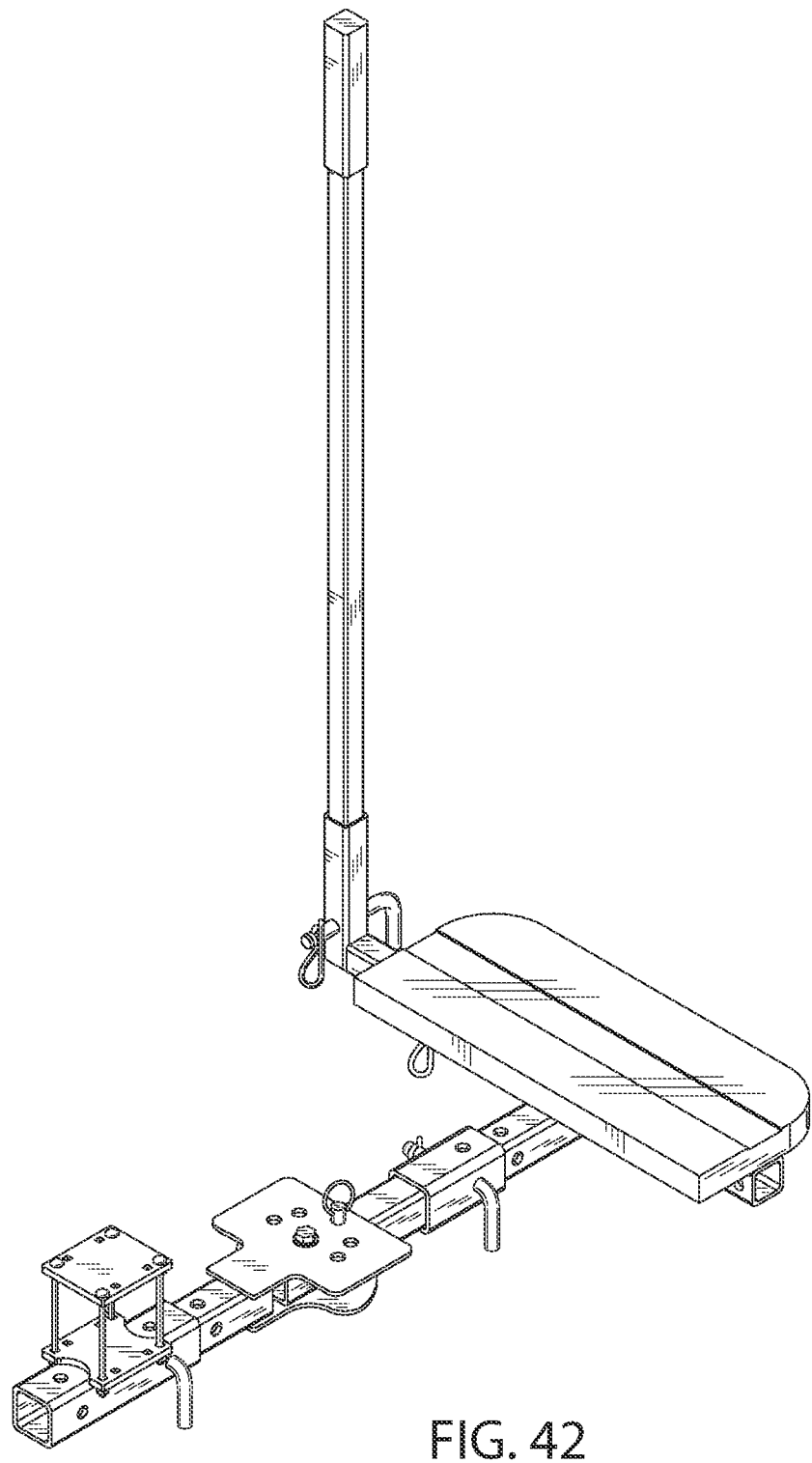
FIG. 42 is a perspective view of another embodiment of the hitch mount assembly showing a configuration of an assembled swing step mount kit.

The step 10 is one of the plurality of attachment members. Each step 10 is detachable from the hitch mount assembly 1. The steps may be arranged in a variety of configurations and heights, including adjacent, parallel, and staggered heights. With the hitch mount assembly, the user now has flexibility in arranging the step layout for easier access to structures like boats, trailers, or other equipment. Each step 10 has a platform and a mounting tube. Each platform 10 is elongated and provides a non-slip, flat surface with a non-skid chemical resistant heat diffusing surface. The platform also allows a person to stand on the platform with two feet. The platform size is preferably 8-inches wide by 18-inches long. In the embodiment shown in the figures, the platform 10 has a forward edge, rear edge, and two opposing side edges. Here, the forward edge contours to the side edges, eliminating corners to mitigate injury or damage to a person or property. The top surface of the platform defines a longitudinal indentation or groove to prevent rain, debris, or other liquid from pooling on the surface. The steps may further define perimeter apertures for tie-downs and/or eyelets for the attaching of license plates (not shown). The step is affixed above and arranged perpendicular to a mounting tube. The mounting tube may be the base tube 3 of the mounting bracket 2 or another type of extender. One embodiment as shown in FIGS. 18 and 19, the step 10 is affixed to the top of the base tube 3. The step is affixed above a mounting tube 21, with the mounting tube defining at least one open end and two opposing lateral sides, with each opposing lateral side defining three spaced apart holes 24 for selectively receiving a hitch pin therethrough. The spaced apart holes allow the user to position the step closer to or father away from the mounting tube to which it is coupled. Here, the step mounting tube may be selectively inserted into the base tube, to another extender, or to a riser.

The tire carrier (spare tire mount) (not shown) is one of the plurality of attachment members. The tire carrier has a mounting tube with an insertion member; an arm; a brace member; and at least one hitch pin. The tire carrier provides for easy mounting and removal of spare tires. The mounting tube may be selectively inserted into any attachment member receiving (mounting) tube or the base tube, or in any conventional hitch receiver. The tire carrier allows the user to store or transport a spare tire without using the vehicle or equipment's conventional options. An extender and/or a riser may also be used if additional spacing or height clearance is needed. The mounting tube of the tire carrier defines an open end, and further defines at least two aligned holes. The mounting tube extends laterally on the same plane as the tire carrier. Extending downwardly at an acute angle is a tubular arm. The arm extends approximately forty-five degrees from an end of the mounting tube to the opposing end of the arm, which abuts and is affixed to the brace member. The arm defines an open end. This arm allows the tire carrier to extend outwardly away from the attachment. The arm has a length longer than the mounting tube. The brace member of the tire carrier is preferably made from steel. The brace member is essentially a flat square plate welded onto a rectangular bracket. The brace member further defines four bores, each of which is arranged to match common spare tire bolt patterns. The outer side of the brace member removably abuts the spare tire. Lug nuts, or other fasteners, are drawn through the brace member bores to secure the spare tire to the brace member. The fasteners are preferably ½ in carriage bolts. A first rectangular bracket is welded onto a second rectangular bracket in an upward tilting position. The upward angle of the first bracket attachment extends the plate upwardly, positioning the plate away from the frame. The second rectangular bracket is welded to the first bracket attachment in a horizontal position that allows the tire mount to be attached to a trailer hitch.

The wheel mounting plate is one of the plurality of attachment members. The wheel mounting plate allows for easy mounting and removal of most trailer jacks (jack mounts) having a 4.375-inch×5.375-inch bolt pattern. The wheel mounting plate has a 2-inch mounting tube and a mounting plate. The mounting tube has four holes therethrough. The plate has four bores therethrough. Here, the wheel mounting plate can attach a jack mounting for changing a flat tire. Alternatively, the two independent wheel mounting plates, each with an attached trailer wheel, may installed on either side of the trailer tongue to allow a tandem axle trailer to be easily moved.

In yet another embodiment of the hitch mount assembly as shown in FIGS. 42-62, the hitch mount assembly 101 comprises a swing step attachment member or swing step mount kit 102 ("swing step"). The swing step may used with any other existing hitch mounts for removably attaching the swing step to any frame. The swing step gives the user a versatile, sturdy, and safe way to enter and to exit the trailer, boat, vehicle, or other structure. The step member of the swing step may be selectively rotated, pivoted, or swiveled up to 180 degrees of travel about a central bore pivot point. The swing step may be provided to the user as a kit.

As depicted in FIGS. 42-62, the hitch mounting member is a mounting bracket comprising a base tube 148 defining at least one open end 147 and defining a plurality of holes; two mounting plates 155 each of which further defines a plurality of bores 156; and a plurality of fasteners 157. The mounting bracket 2 is the same as previously described in other embodiments for this invention. Alternatively, the hitch mounting member may be any other hitch mount.

The swing step 102 generally comprises (includes or has) a swing assembly and at least one step 103. The swing assembly of the swing step mount kit 102 comprises a swivel mount 105, an extender mounting tube 106, a swing arm 107, a pivoting bolt 108, and at least one swing fastener 109 or locking pin 109. A proximal portion 120 of the swing assembly is removably attachable or coupled to a hitch mounting member 147, 148 with another hitch pin 149 for securing the swing step to a frame of a vehicle, a watercraft trailer, a boat, a trailer, or other mountable structure. A distal portion 128 of the swing assembly 123 is removably attachable or coupled with the slidably insertable step 103. The swing assembly can selectively and pivotably adjust the position of the step 103 in relation to the swing assembly. The swing step 102 may further include a plurality of attachment members, preferably, at least one hand pole 104, as depicted in FIGS. 42, 43, 46-49, 53-62. The plurality of attachment members may be inserted into any available open ended coupler tube, step mounting tube, or any other open ended portion of the swing step.

The swivel mount 105 is essentially an upper swivel plate 110 and a lower swivel plate 111 that are each affixed to a portion of the extender mounting tube 106 at one section of the two swivel plates 110, 111 and that are each removably coupled to a portion of the swing arm at an opposite section of the two swivel plates. The extender mounting tube 106 and the swing arm 107 are each sandwiched between the upper swivel plate 110 and the lower swivel plate 111. As depicted in FIGS. 42-43 and 55-56, the upper swivel plate 110 is essentially a rigid plate having a flange 112 extending from a lateral side of the upper swivel plate 110, with the upper swivel plate 110 defining a plurality of holes 113 therethrough arranged about a swivel bore 114 or a central bore 114 defined therethrough. A locking pin 109, or other hitch pin, is selectively inserted through one of the upper swivel plate 110 plurality of holes 113 to secure the position of the swing arm 107. Preferably, the upper swivel plate flange 112 substantially extends from the lateral side of the plate. In one embodiment, the upper swivel plate flange 112 has a width wider than the extender mounting tube 106 to which it is affixed. The upper swivel plate 110 is preferably made from the same material as the mounting bracket plates. The surface of the upper swivel plate may also be slip resistant. Preferably, elongated strips of slip resistant material may be arranged or otherwise affixed around the perimeter of the upper swivel plate. The flange 112 may further include at least one, but preferably two, spaced part strips of slip resistant material. The corners of the upper swivel plate 110 may be further rounded or contoured to eliminate or minimize sharp corners.

The upper swivel plate plurality of swivel holes 113 are preferably spaced apart in an approximate semi-circle on the upper swivel plate 110 around the central swivel bore 114. The upper swivel plate 110 and the lower swivel plate 111 each preferably has five (5) corresponding spaced apart holes 113 therethrough. One of each of the plurality of swivel holes 113 corresponds to one of a plurality of lockdown positions. In a preferred embodiment, one of each of the plurality of holes 113 corresponds to at an approximate 0-degree left position (FIG. 51), a 45-degree left position (FIG. 50), a 90-degree (straight out) position (FIG. 54), a 135-degree (45-degree right) position (FIG. 52), and a 180-degree right position (a mirror image of FIG. 51). These five different lockdown positions provide up to 180 degrees of travel about the swivel mount 105 to allow the user to selectively arrange the position of the swing arm 107, and consequently, the step 103 about the swivel mount 105. Many conventional adjustable plates or swivel mounts only allow rotation or swing of an attachment member, such as a step, up to 90-degrees in a single direction.

The upper swivel plate bore 114 is preferably and approximately centered on the upper swivel plate 110. The swivel bore 114 is also aligned at the approximate midpoint width of the flange 112. The swivel holes 113 at the 0-degree and 180-degree positions are parallel with the central bore 114 and with the lateral sides of the upper swivel plate 110. The hole 113 at the 90-degree position is perpendicular to the central bore 114. A pivoting bolt 108 is insertable through the central bores 114, 118 of both the upper swivel plate 110 and the lower swivel plate 111. A bolt 108 having a threaded end, a nut, and washer(s) are preferred, but other conventional fasteners are contemplated. The upper swivel plate 110 preferably has a length or lateral sides longer than its width or ends. As shown in the figures, the upper swivel plate 110 preferably has a width of approximately 5 inches before the start of the flange 112, a length of approximately 8 inches, and a depth of approximately 0.250 inches. The flange 112 has a length of approximately 2.625 inches and a length of 3 inches. Other dimensions that maintain the aforementioned proportions are also contemplated. When installed, the lateral sides or length of the upper swivel plate are arranged parallel to the mounting bracket or hitch mount.

Figure 43:
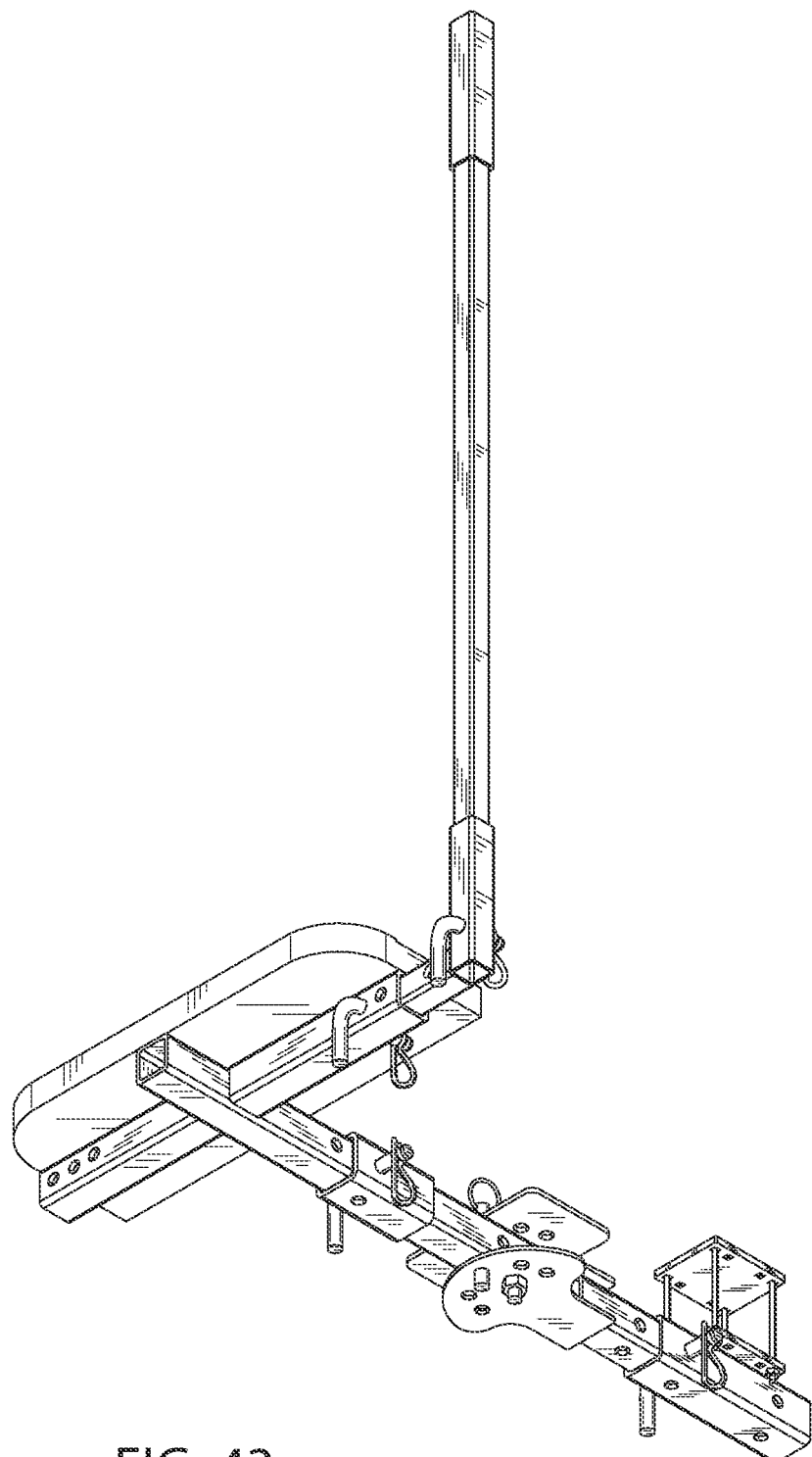
FIG. 43 is another perspective view of FIG. 42.
Figure 44:
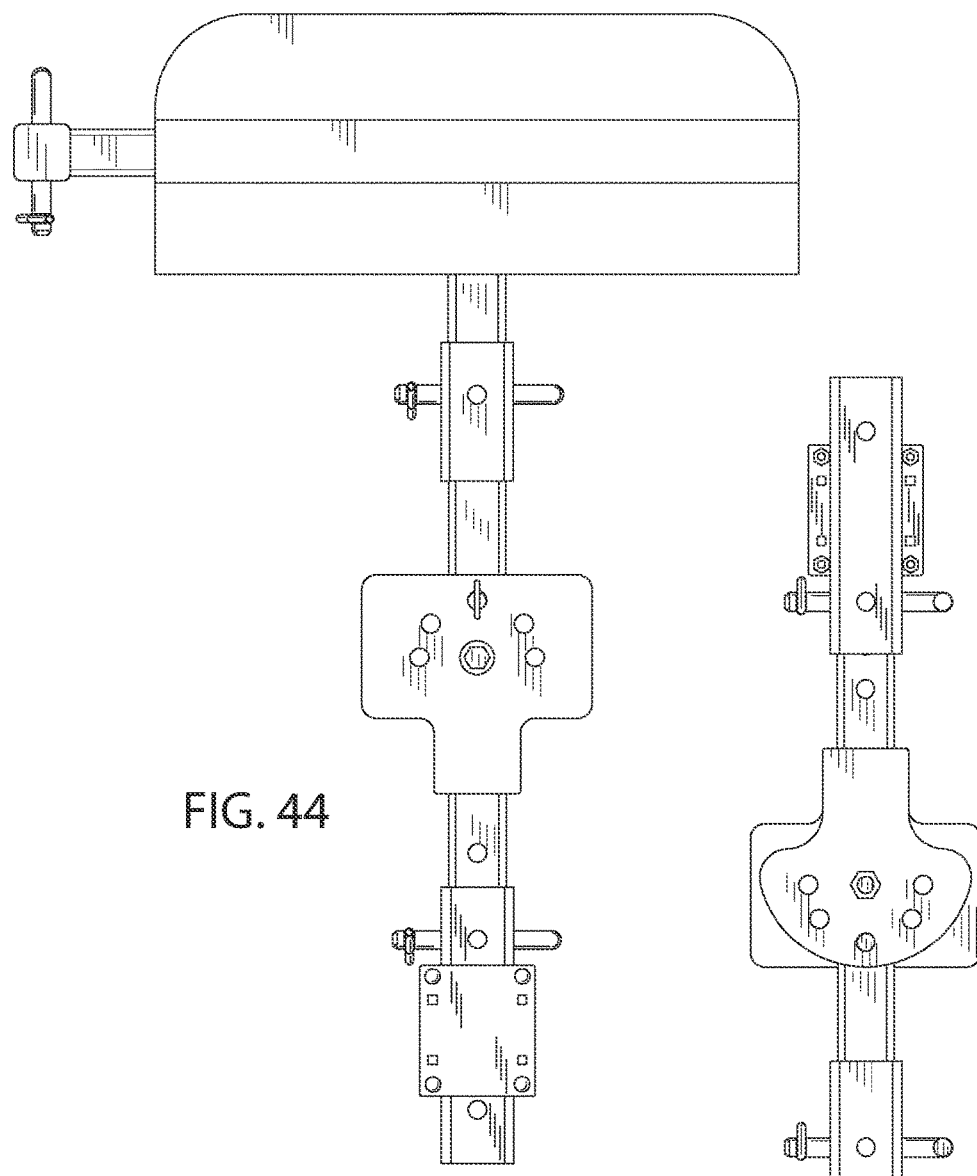
FIG. 44 is a top plan view of FIG. 42.
Figure 45:
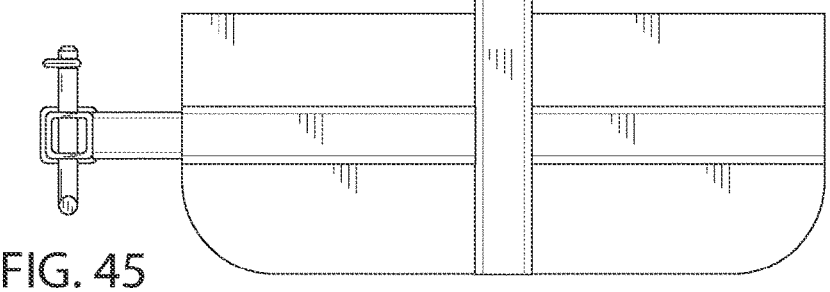
FIG. 45 is a bottom plan view of FIG. 42.
Figure 46:
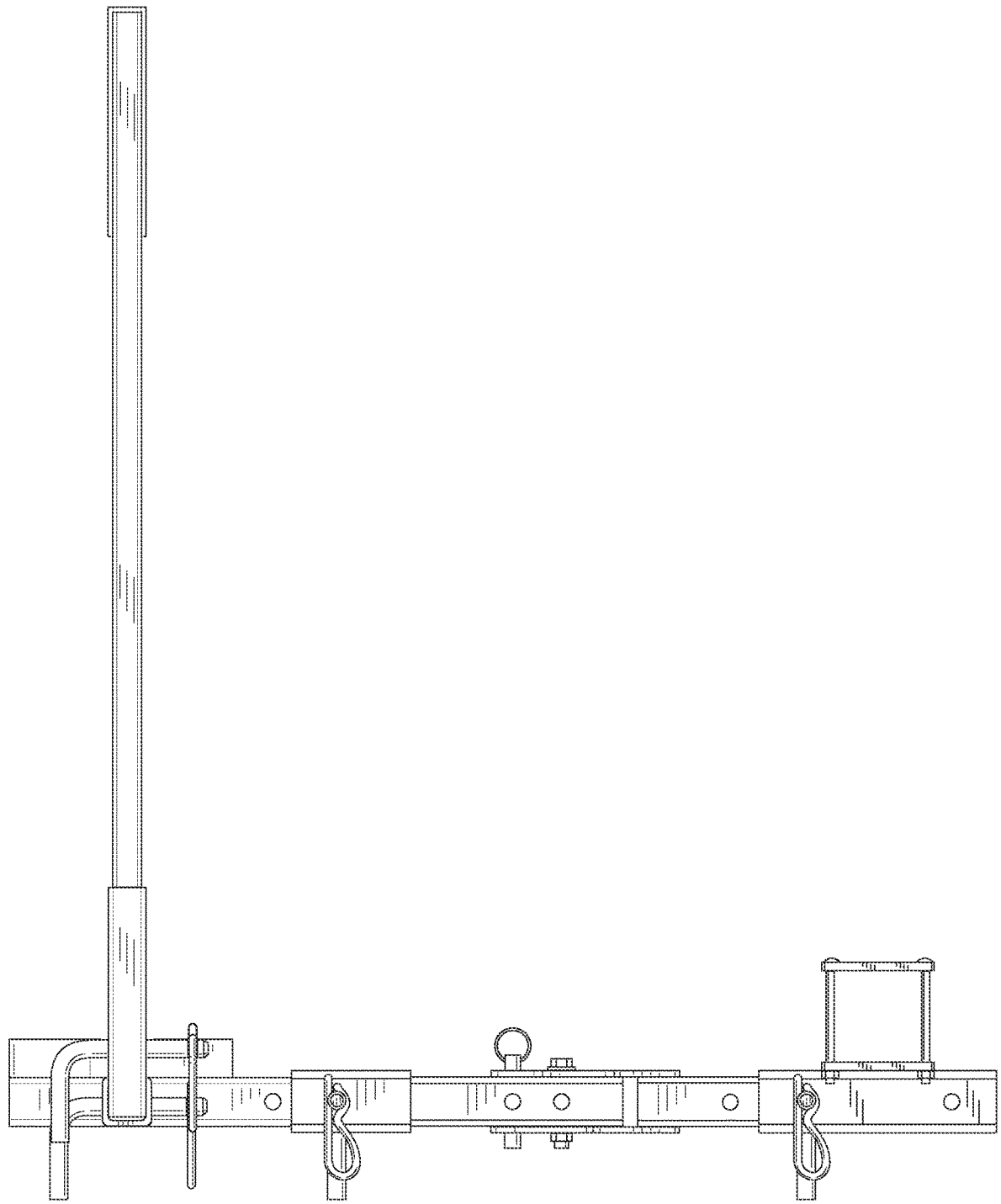
FIG. 46 is a left side elevation view of FIG. 42.
Figure 47:
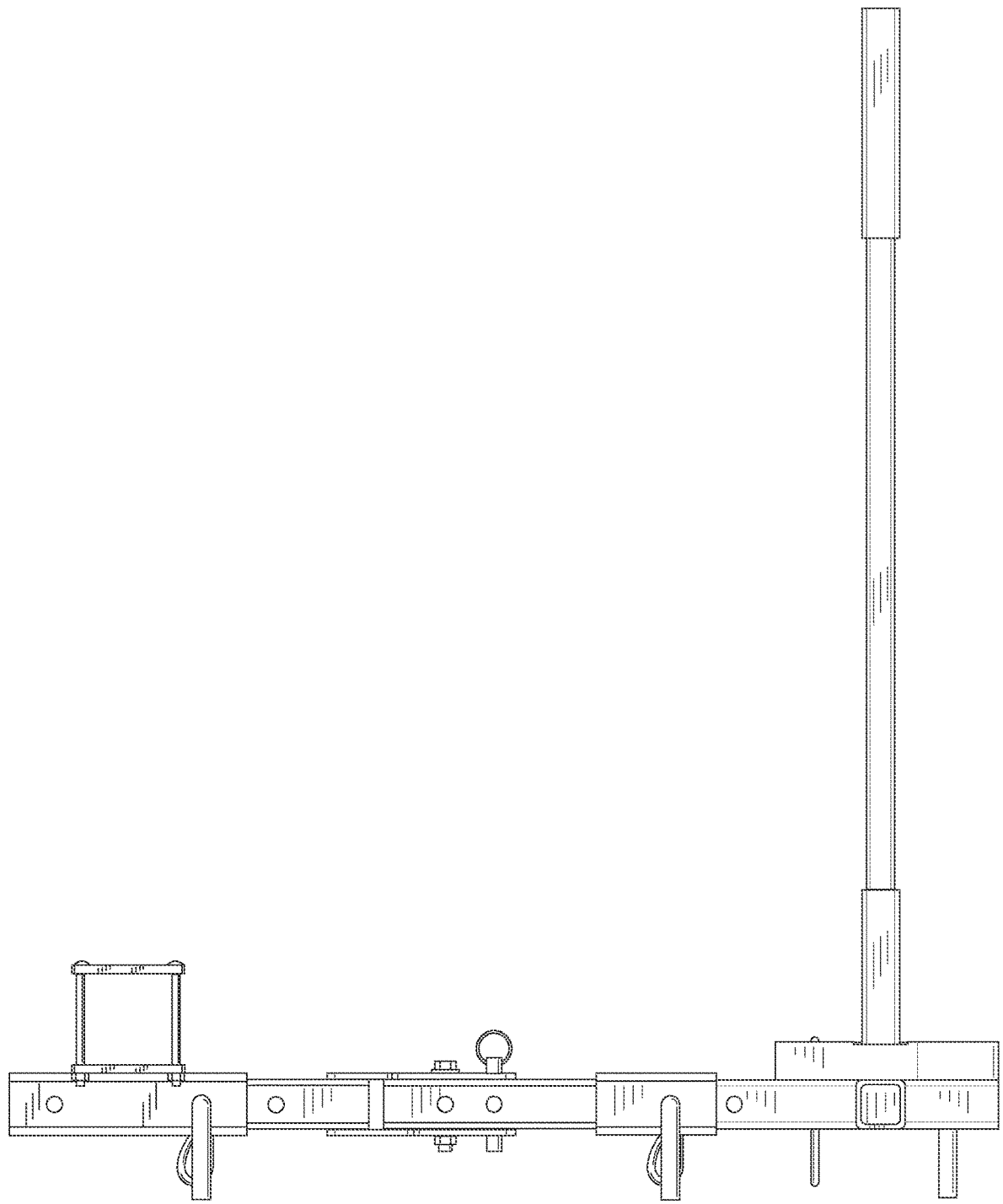
FIG. 47 is a right side elevation view of FIG. 42.
Figure 48:
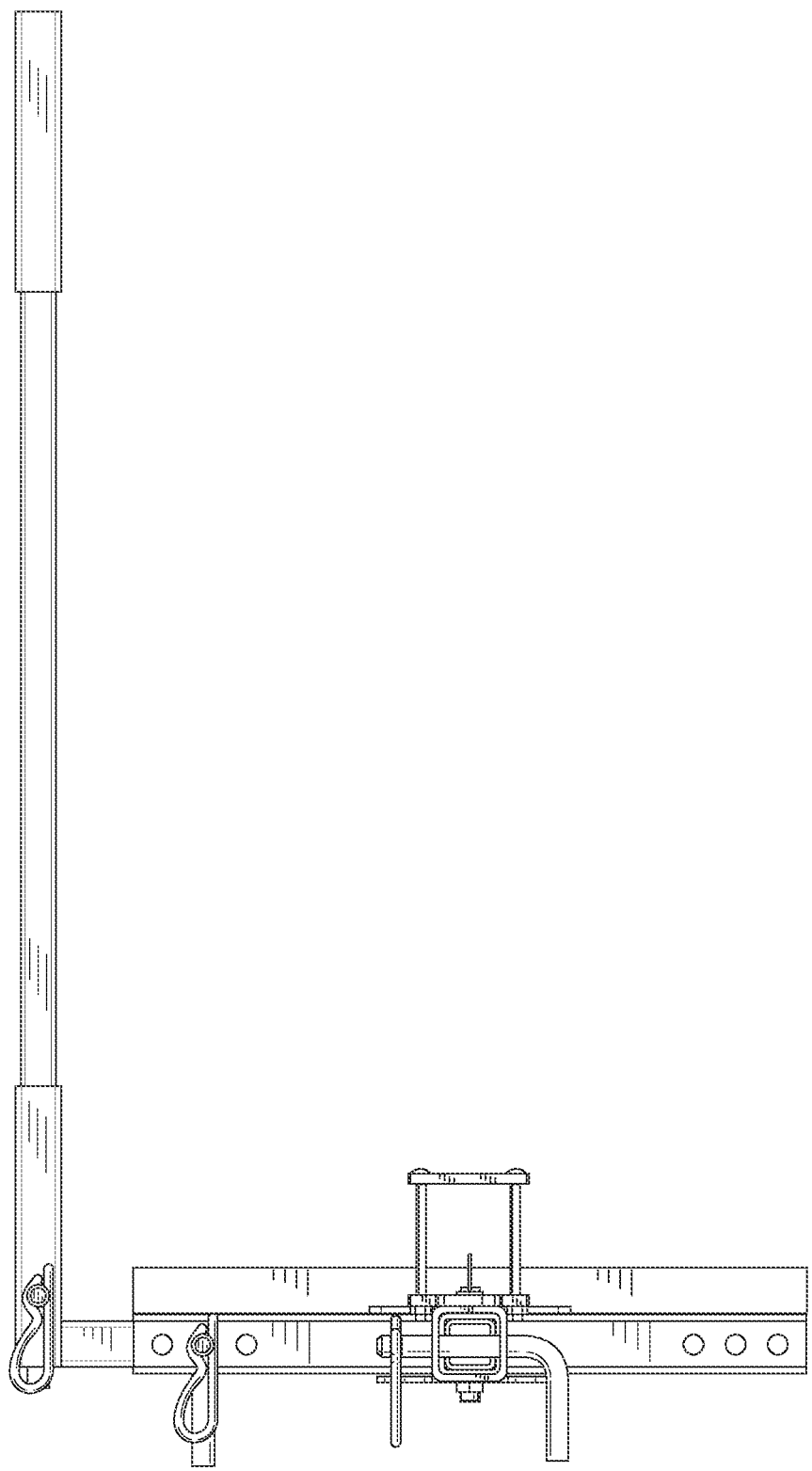
FIG. 48 is a front elevation view of FIG. 42.
Figure 49:
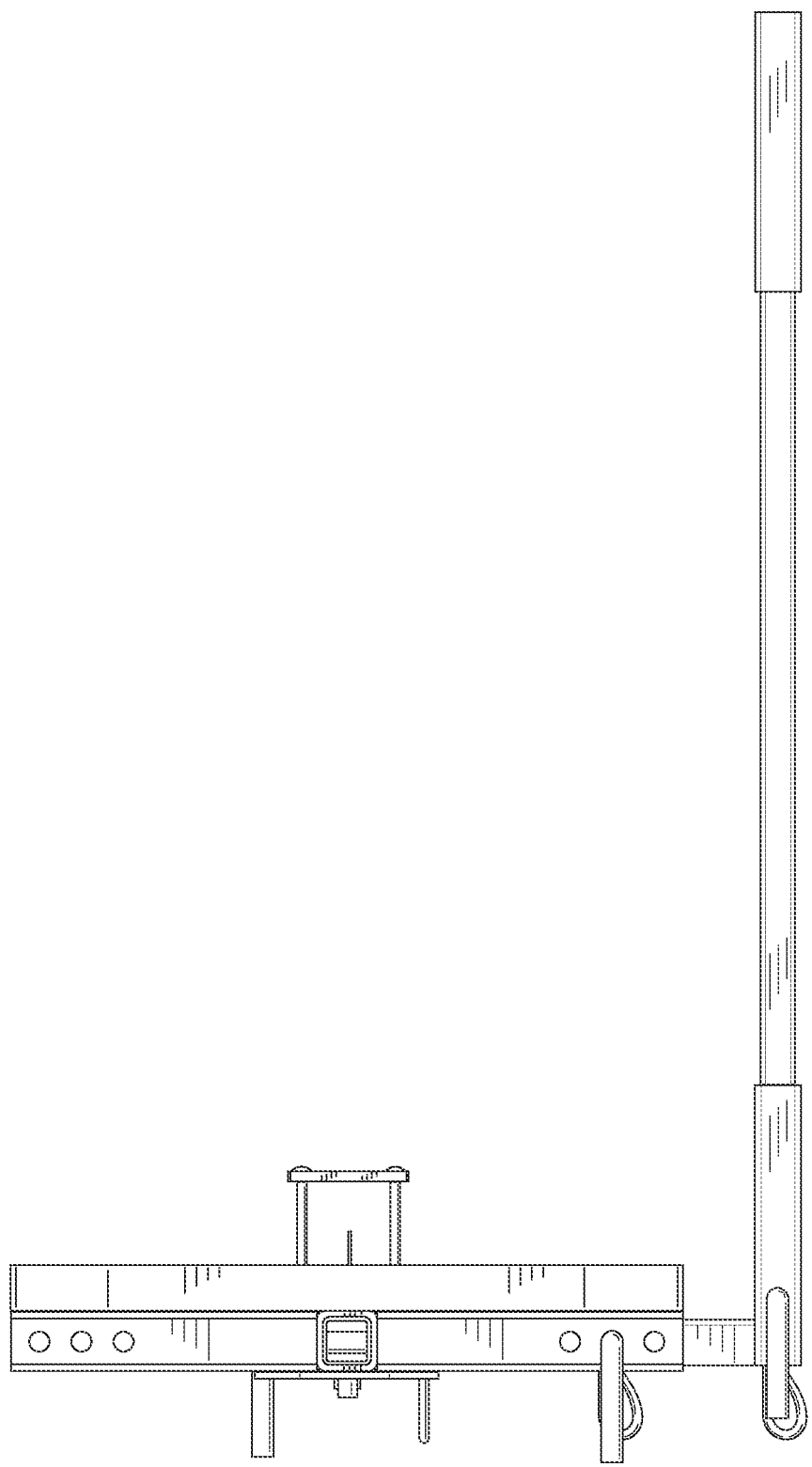
FIG. 49 is a rear elevation view of FIG. 42.
Figure 50:
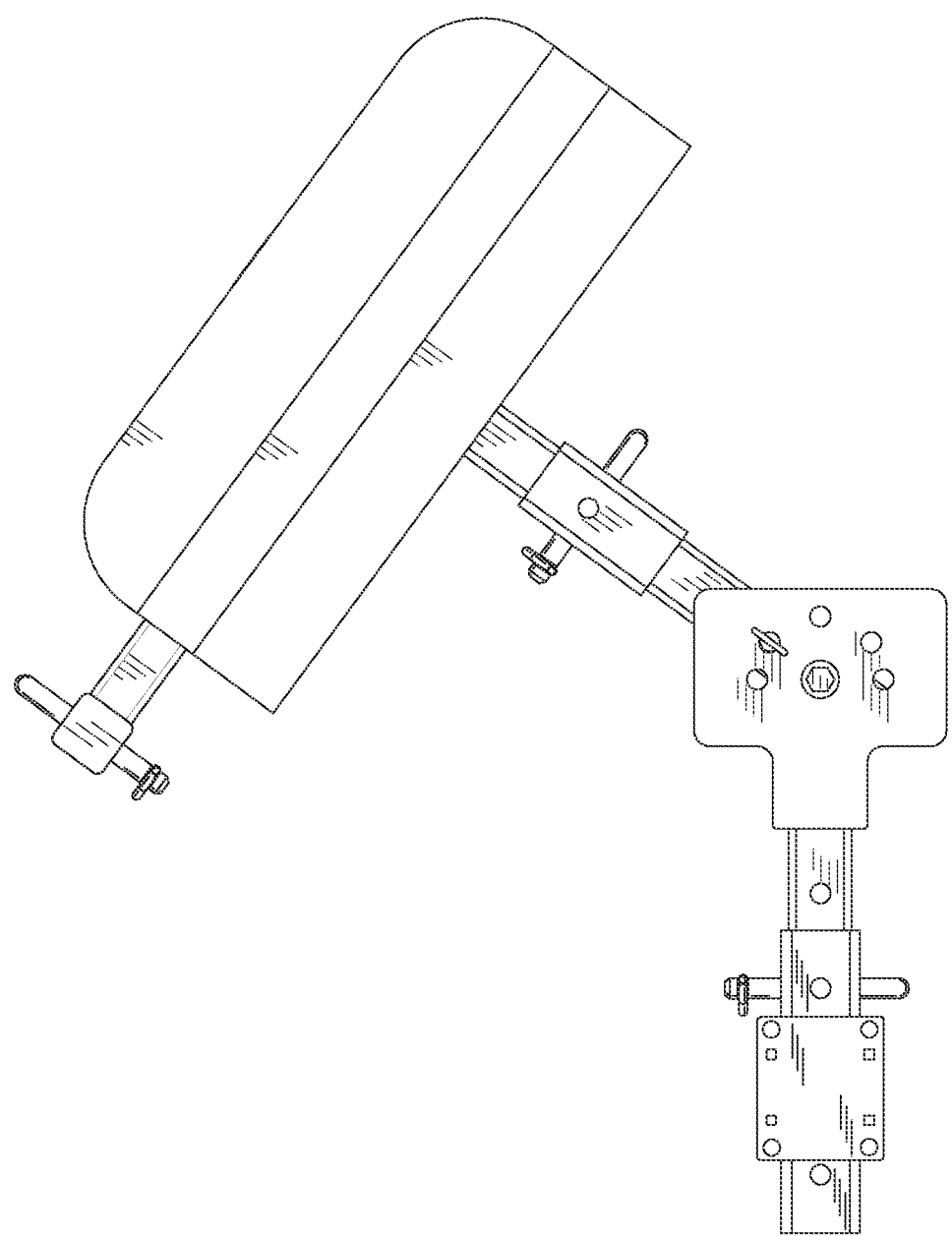
FIG. 50 is a top plan view of FIG. 42, showing the swing arm at an angled position.
Figure 51:
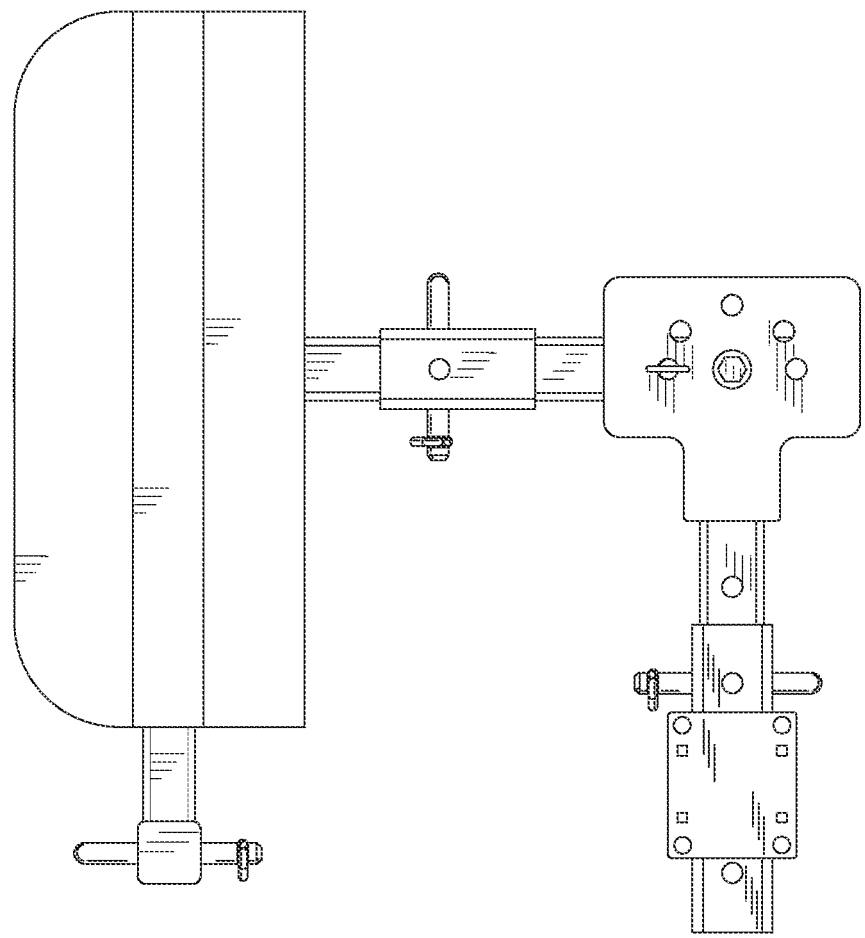
FIG. 51 is a top plan view of FIG. 42, showing the swing arm at a 90-degree position, with the opposite 90-degree position being a mirror image thereof.
Figure 52:
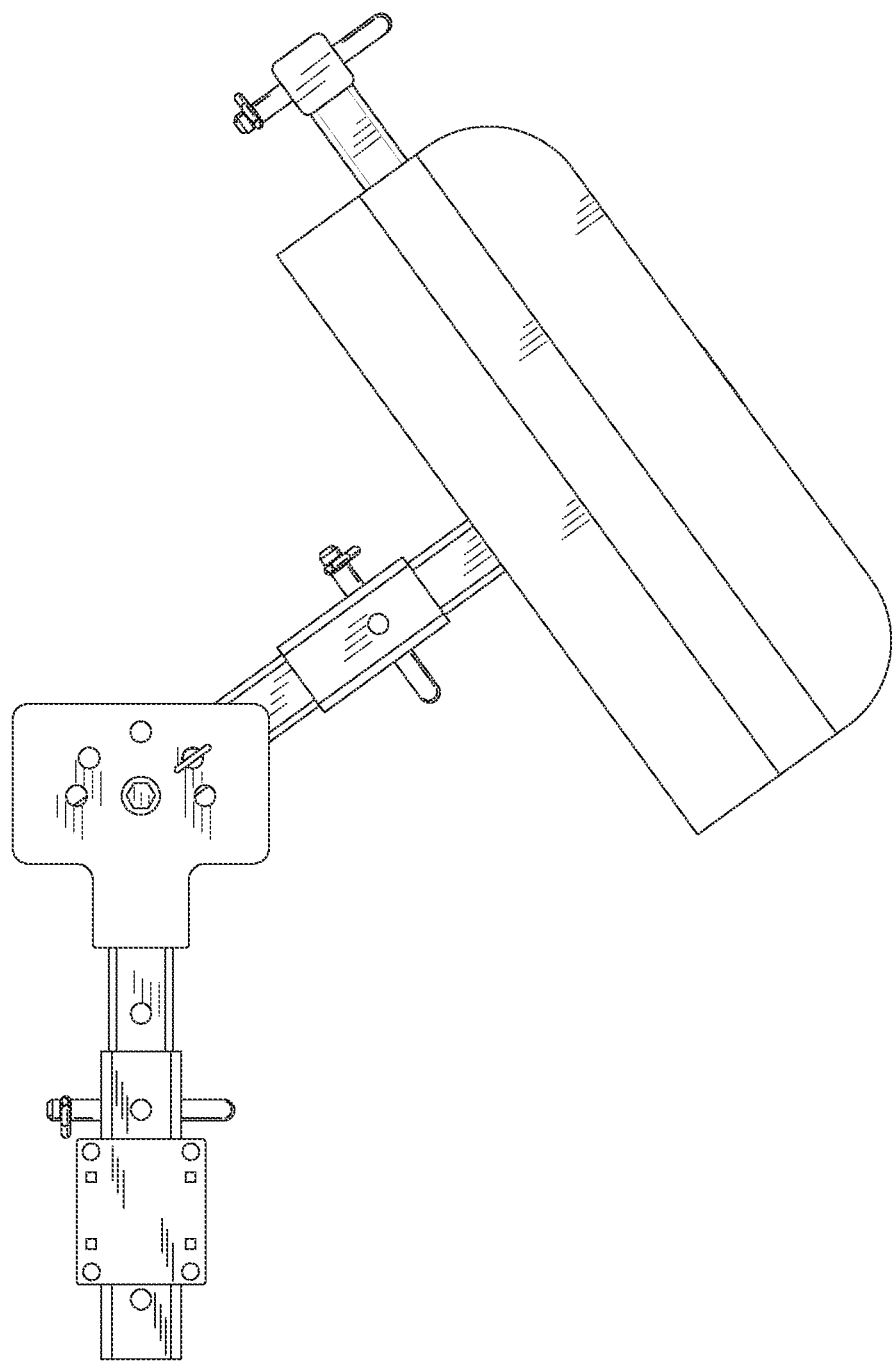
FIG. 52 is a top plan view of FIG. 42, showing the swing arm at an opposite angled position.
Figure 53:
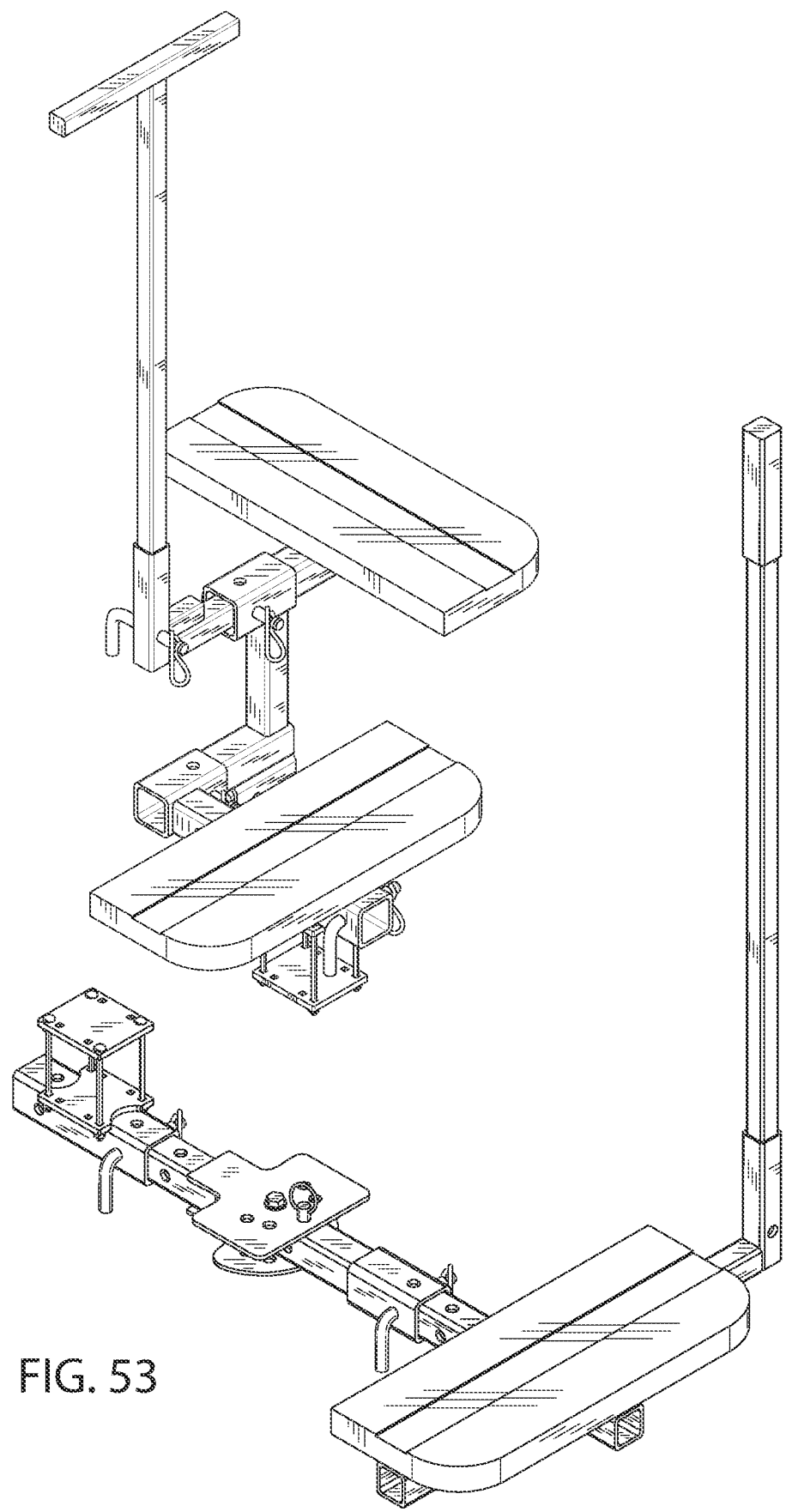
FIG. 53 is a perspective view of FIG. 42 and also showing a configuration of the stair kit.
Figure 55:
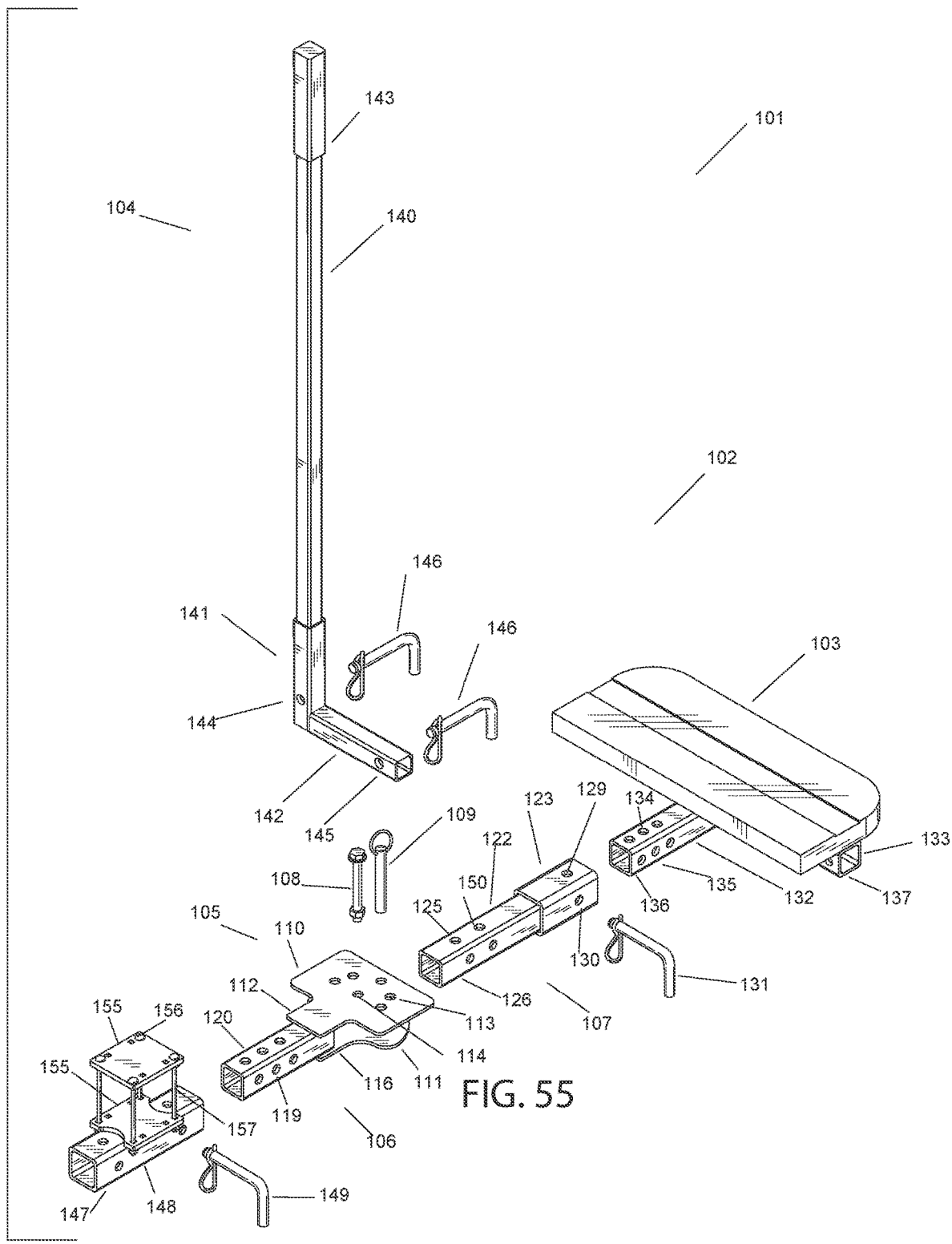
FIG. 55 is an exploded perspective view of FIG. 42, showing the components of the swing step mount kit disassembled.
Figure 56:
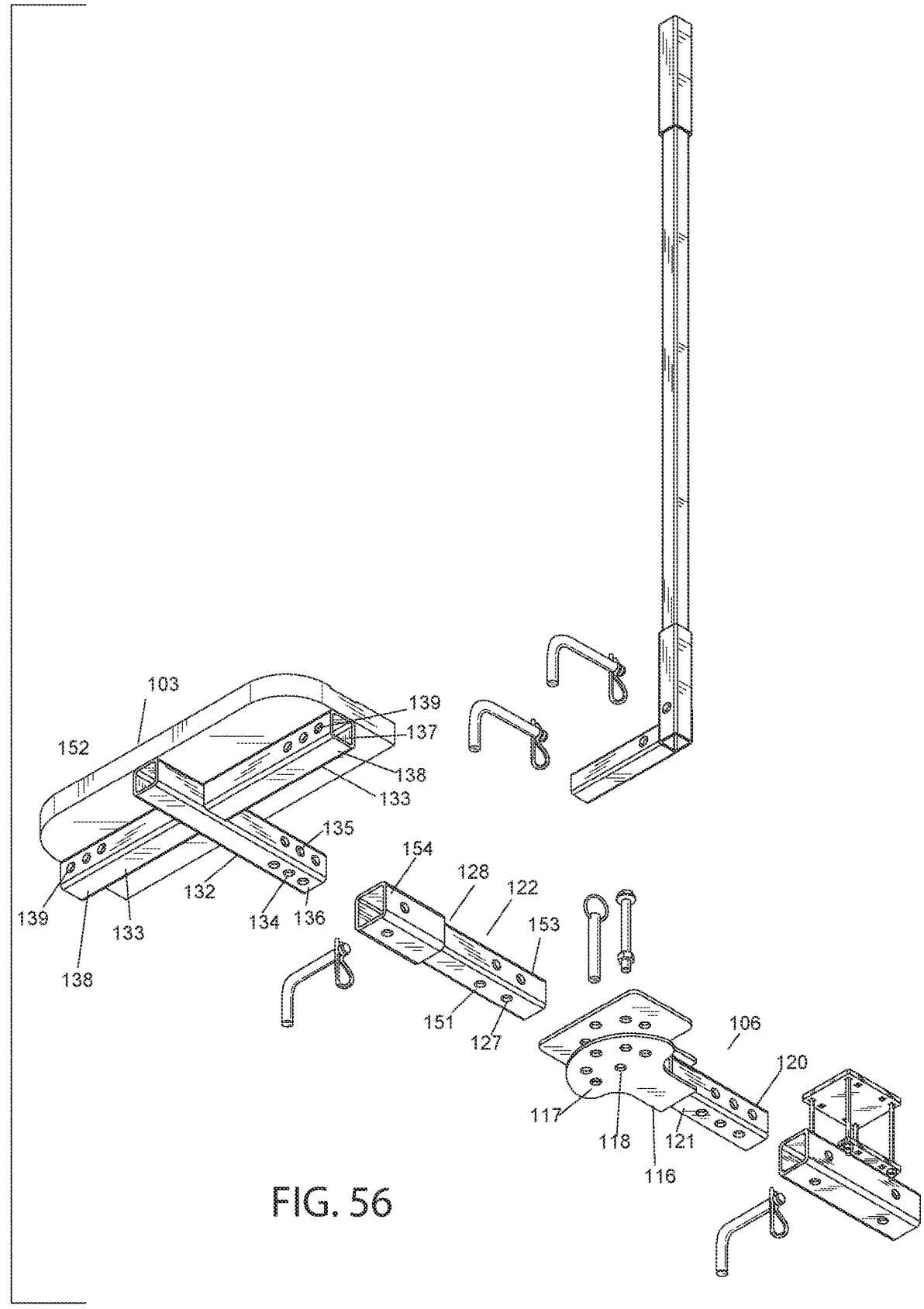
FIG. 56 is another exploded perspective view of FIG. 55.
Figure 57:
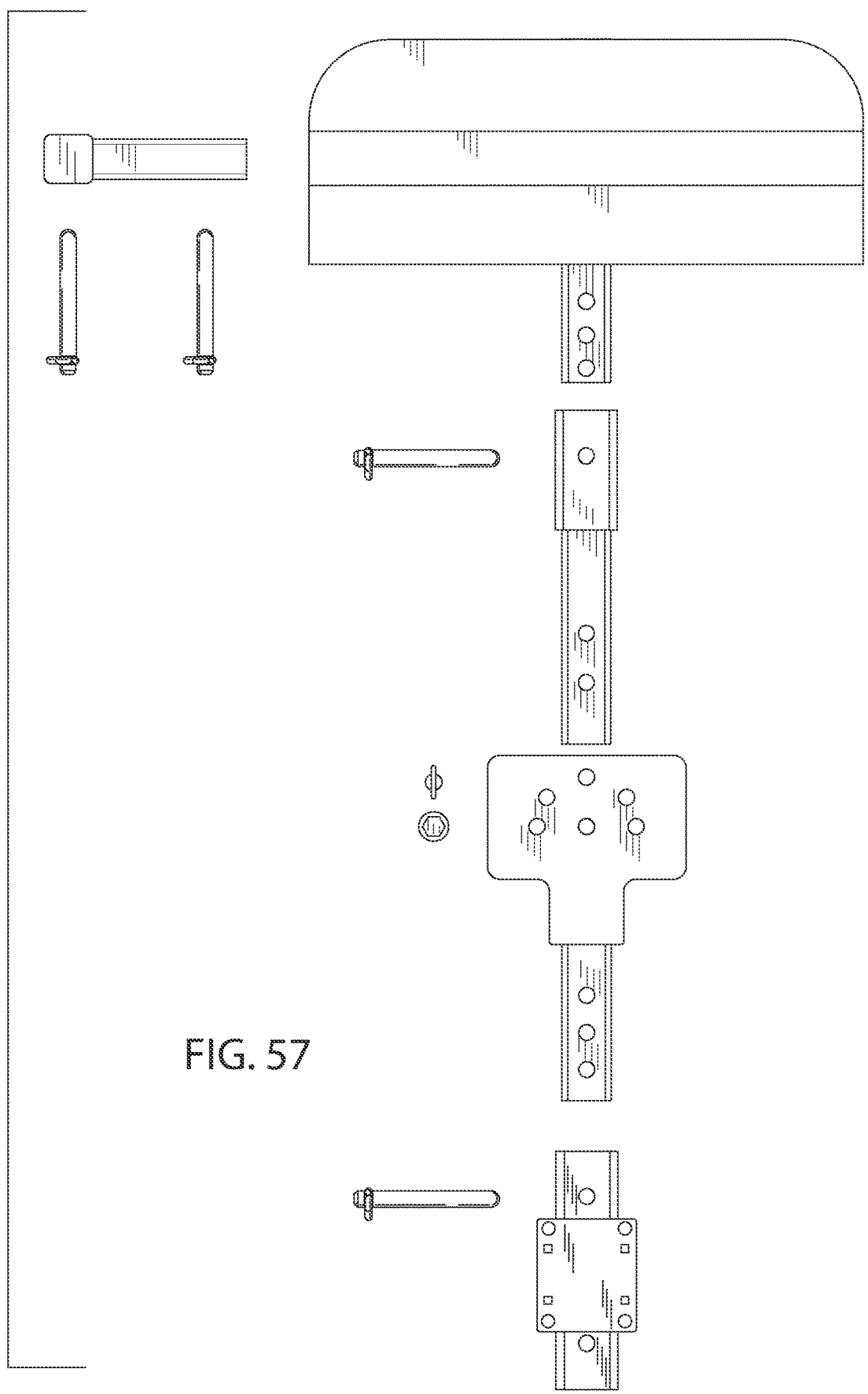
FIG. 57 is an exploded top plan view of FIG. 55.
Figure 58:
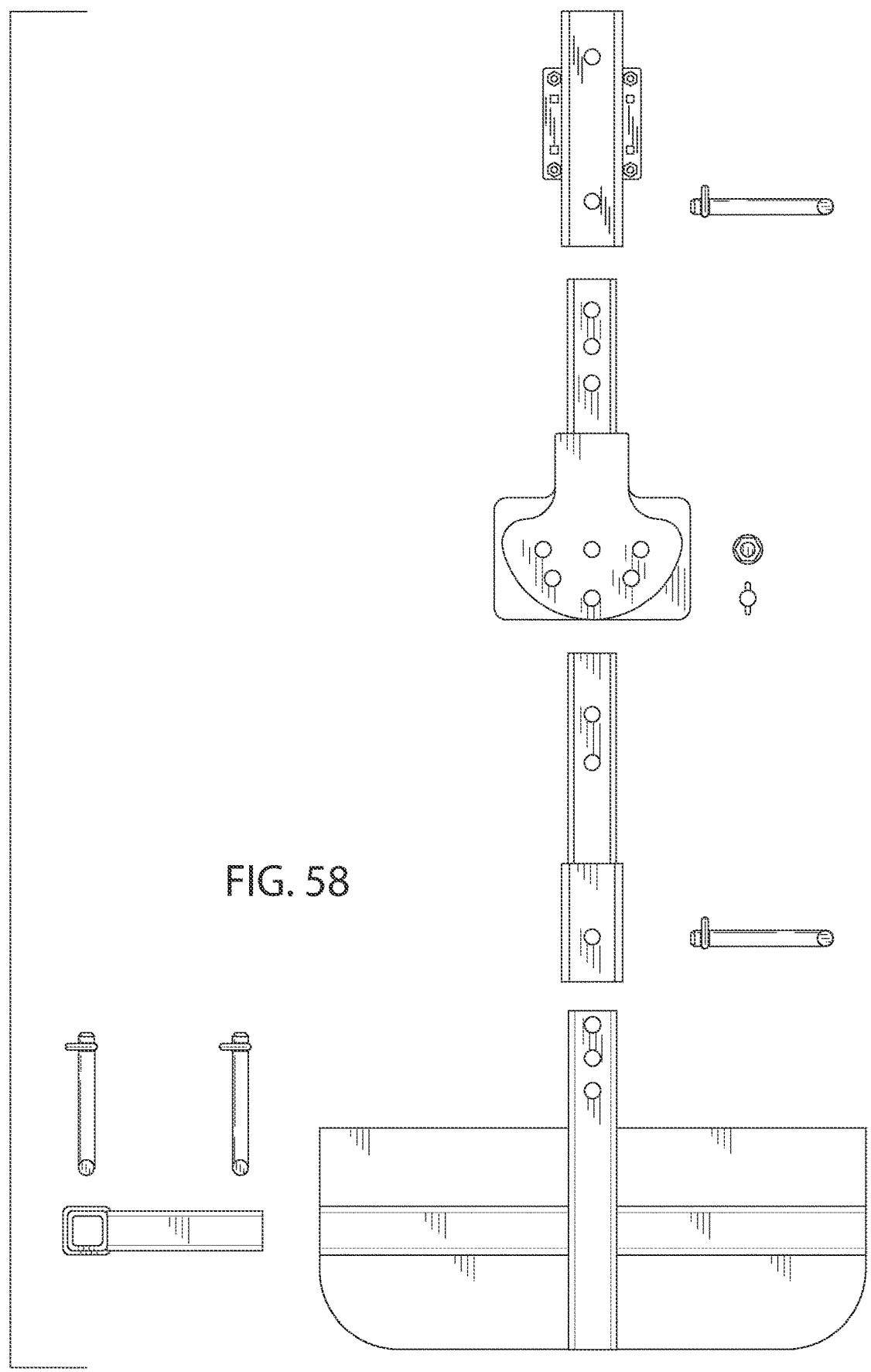
FIG. 58 is an exploded bottom plan view of FIG. 55.
Figure 59:
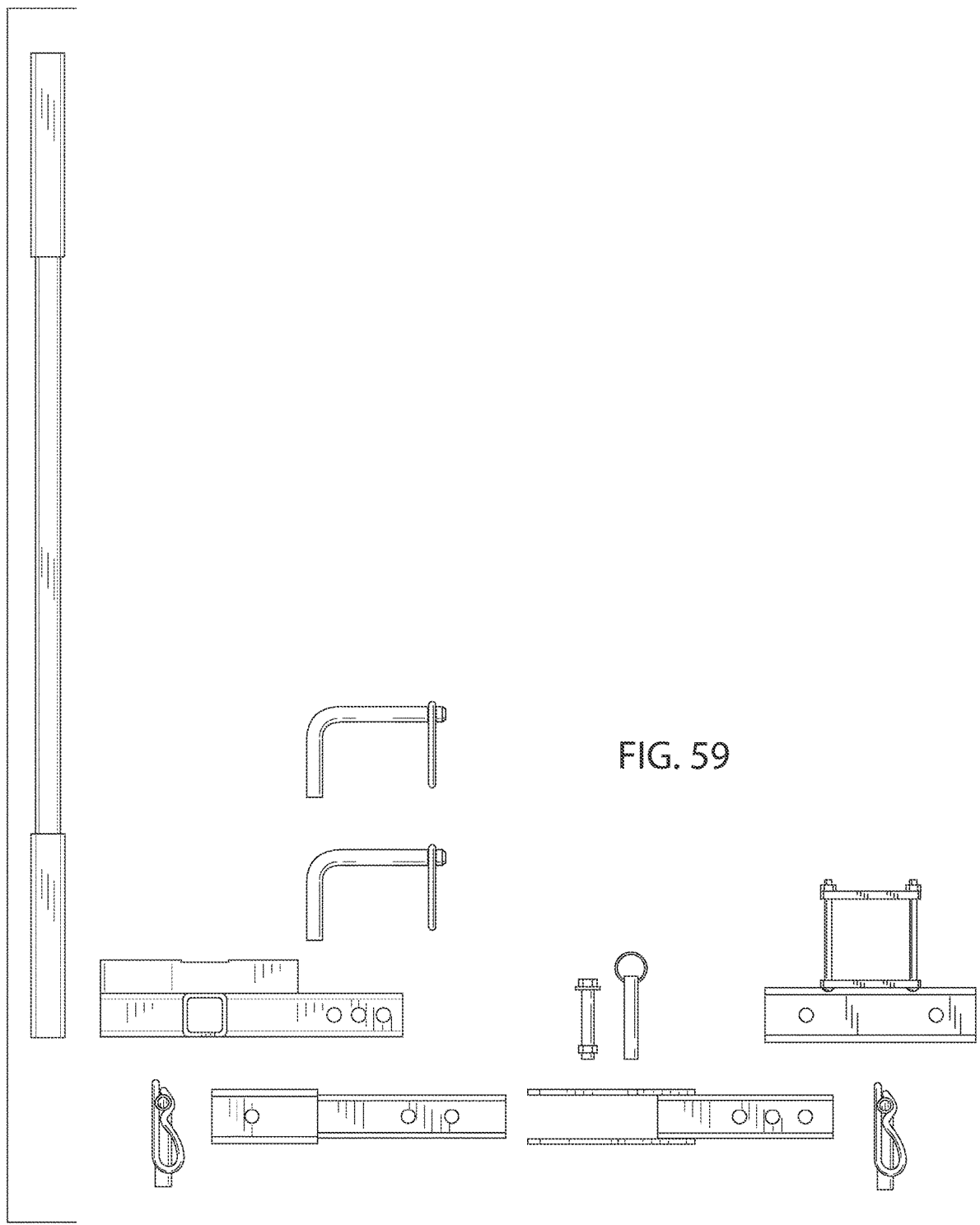
FIG. 59 is an exploded left side elevation view of FIG. 55.
Figure 60:
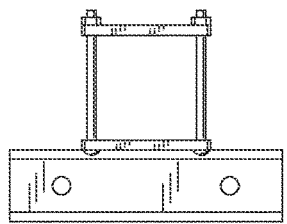
FIG. 60 is an exploded right side elevation view of FIG. 55.
Figure 60:
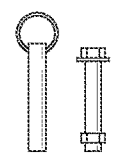
Figure 60:
Figure 60:
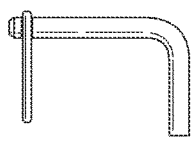
Figure 60:
Figure 60:
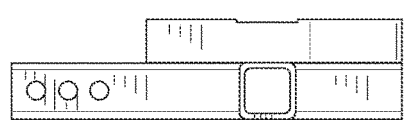
Figure 60:
Figure 60:
Figure 60:
Figure 60:
Figure 61:
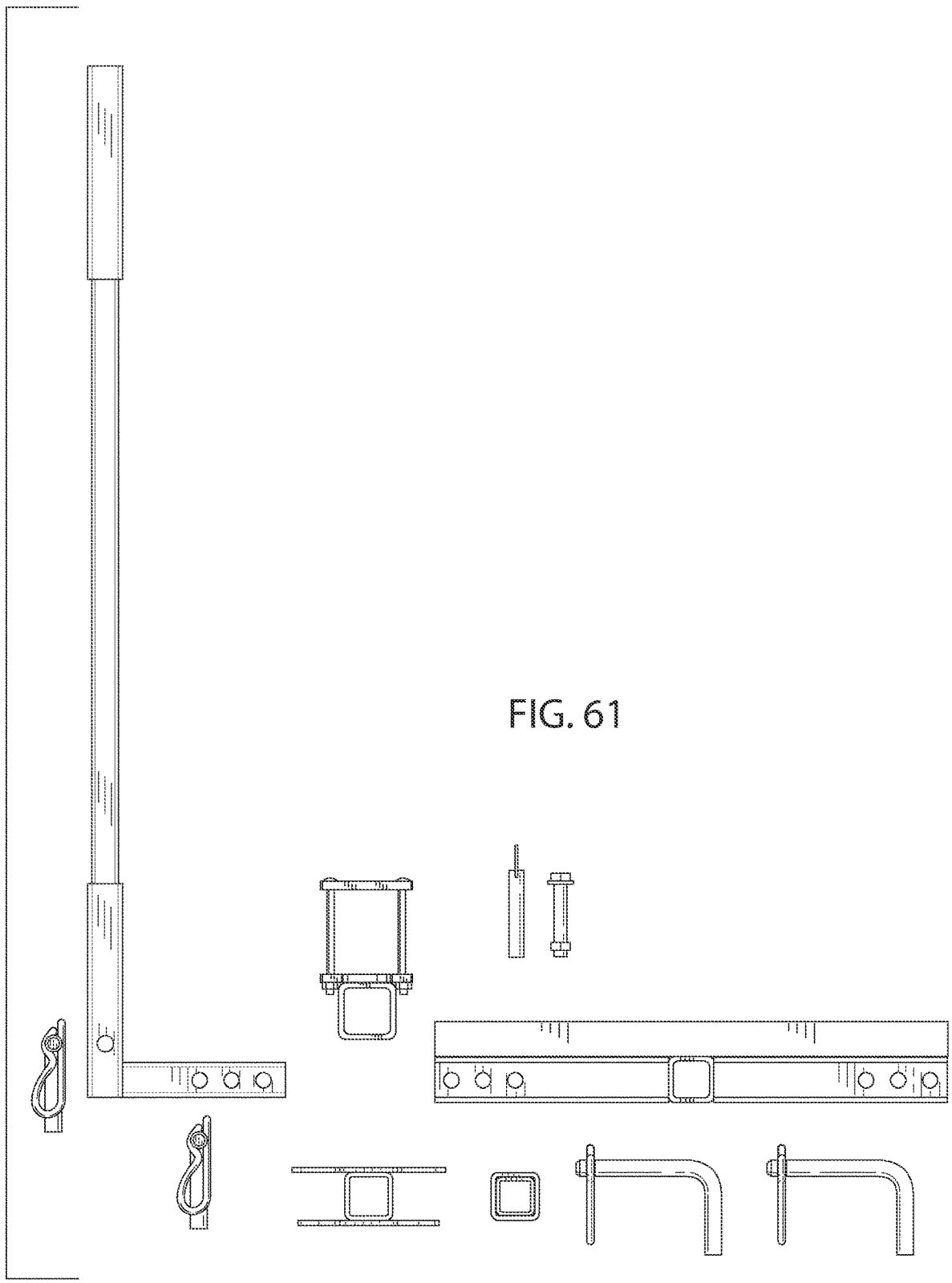
FIG. 61 is an exploded front elevation view of FIG. 55.
Figure 62:
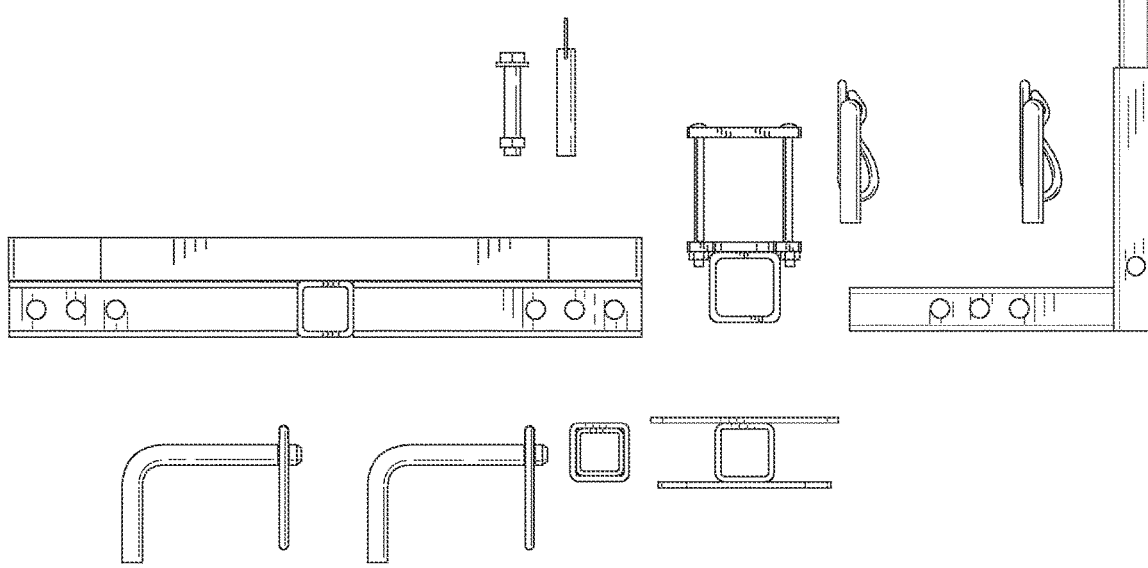
FIG. 62 is an exploded rear elevation view of FIG. 55.

As depicted in FIGS. 42-43 and 55-56, the lower swivel plate 111 of the swivel mount 105 is essentially a rigid plate having a flange 116 extending from a lateral side of the lower swivel plate 111, with the lower swivel plate 111 defining a plurality of swivel holes 117 therethrough arranged about a central bore 118 defined therethrough. The plurality of holes 117 and the central bore 118 correspond to the respective plurality of holes 113 and the central bore 114 defined in the upper swivel plate 110. The locking pin 109, or other hitch pin, is selectively inserted through one of the lower swivel plate 111 plurality of holes 117 and the corresponding aligned upper swivel plate 110 plurality of holes 113 to secure the position of the swing arm 107. In one embodiment, the lower swivel plate flange 116 has a width more than the width of the extender mounting tube 106. The lower swivel plate is made from the same materials as the mounting bracket mounting plate and the upper swivel plate. As depicted in FIGS. 43, 45, and 56, the lower swivel plate 111 is preferably a bell shaped or a semi-circular contoured shaped plate. A structural purpose for the shape of the lower swivel plate is to hold the swing arm member 107 in a secure horizontal position with the lower swing plate holes 117 being in alignment with the upper swivel plate holes 113. This configuration will allow the swing arm 107 to be secured in all matching bored or hole positions.

The lower swivel plate plurality of swivel holes 117 are preferably spaced apart in an approximate semi-circle on the lower swivel plate 111 around the central pivot bore 118. Corresponding to the upper swivel plate holes 113, the lower swivel plate 111 preferably defines five (5) spaced apart holes 117 therethrough. One of each of the plurality of holes 117 corresponds to one of the plurality of lockdown positions. The lower swivel plate central bore 118 is preferably and approximately centered on the lower swivel plate 111. The central bore 118 is also aligned at the approximate midpoint width of the flange 116. The holes 117 at the 90-degree left and right positions are parallel with the central bore 118 and with the lateral sides of the lower swivel plate 111. The hole 114 at the 0-degree position is perpendicular to the central bore 118. A pivot bolt 108 or fastener is insertable through the central bores 114, 118 of both the upper swivel plate 110 and the lower swivel plate 111. A bolt 108 having a threaded end, a nut, and washer(s) are preferred, but other conventional fasteners are contemplated. The lower swivel plate 111 is preferably smaller in overall area size than the upper swivel plate. The lower swivel plate 111 has an approximate width of 4.126 inches before the start of the flange 116, a length of approximately 7.357 inches, and a depth of approximately 0.250 inches. The flange 116 has an approximate width of 3.499 inches, an approximate length of 3.0 inches, and an approximate depth of 0.250 inches. As with the upper swivel plate dimensions, the lower swivel plate flange has a width and length each of which is less than the width and length of the lower swivel plate structure.

As depicted in FIGS. 42-62, an extender mounting tube 106 ("extender") of the swing assembly is essentially an elongated mounting tube 106 having a top, a bottom, two opposing ends, and two opposing lateral sides. The extender 106 defines a plurality of extender holes 119 near a proximal portion 120 of the extender 106. In one embodiment, the plurality of extender holes 119 are defined through the top, the bottom, and each of the lateral sides of the extender mounting tube 106. At least one end of the extender mounting tube is open ended. The distal portion 121 of the extender mounting tube 106 is affixed between and to the flanges 112, 116 of the upper swivel plate 110 and the lower swivel plate 111, preferably by welding, although other means of fixation, extrusion, or mounting are contemplated. In an alternative embodiment, the distal portion 121 of the extender is an integral part of the upper swivel plate 110 and lower swivel plate 111.

The proximal portion 120 of the extender 106 may be removably coupled to the mounting bracket with a base tube 148 or other hitch member and may be secured with a hitch pin 149, locking pin, or a common ⅝ inch bolt with nut at one of the plurality of extender holes 119. The plurality of extender holes 119 are three spaced apart extender holes 119 at the top-bottom of the extender 106 and three spaced apart extender holes 119 at the side-side of the extender 106 for receiving the hitch pin therethrough after the user selectively adjusts the forward and rearward spacing of the swing step 102 in relation to the mounting bracket or hitch mount. Once the desired distance is determined, the user inserts the pin 149 through one of the corresponding holes 119 to secure the extender 106 to the mounting bracket base tube 148 or other hitch mount. The distal portion 121 of the extender preferably does not extend along the entire length of the flanges 112, 116. Preferably, the length of the distal portion 121 of the extender 106 that is permanently affixed between the flanges 112, 116 of the upper and lower swivel plates is approximately half the length of the flanges 112, 116. As shown in the figures, the extender mounting tube has an approximate length of 8 inches, an approximate width of 2 inches, and an approximate depth of 0.19 inches.

The swing arm 107 has a mounting tube shaft 122, a single extender mounting tube 123, and a hitch pin 131. The mounting tube shaft 122 has a top, a bottom, two opposing sides, and two opposing ends. As depicted in FIGS. 42-62, the mounting tube shaft 122 is essentially another extender mounting tube. The mounting tube shaft defines a plurality of swing arm holes 125, 127, 150, 151. The mounting tube shaft 122 defines a first upper swing arm hole 125 and a second upper swing arm hole 150 in the top and in the first side of the mounting tube shaft 122. The mounting tube shaft 122 further defines a first lower swing arm hole 127 and a second lower swing arm 151 in the bottom and in the second side of the mounting shaft tube 122. The upper swing arm holes 125, 150 are aligned and correspond with the lower swing arm holes 127, 151. The holes 125, 127, 150, 151 are located near a proximal portion 126 of the mounting tube shaft 122. At least one end of the mounting tube shaft is preferably open ended. The proximal portion 126 of the mounting tube shaft 122 is removably insertable between the upper swivel plate 110 and the lower swivel plate 111 opposite the two swivel plates flanges 112, 116. The user may insert the pivot bolt 108 through the central bore 114 of the upper swivel plate 110, through the first of the swing arm holes 125, 127 in the top-bottom or side-side of the mounting tube shaft 122, through the central bore 118 of the lower swivel plate 111 through a corresponding one of the two spaced apart lower holes 125 of the mounting tube shaft 122, then tightened with the nut and washer. This type of fastening creates the pivot point about which the swing arm, and consequently the step, can rotate or swivel to a desired 0-degree, 45-degree left or right, or 90-degree left or right positions.

As depicted in FIGS. 42-62, the single extender mounting tube (the "single extender") 123 of the swing arm 107 is affixed to a distal portion 128 of the mounting tube shaft 122. The single extender 123 has a top, a bottom, two opposing lateral sides, and two opposing ends. A proximal end or portion 153 of the single extender 123 is affixed to the distal portion 128 of the swing arm mounting tube shaft 122. In another embodiment, the swing arm mounting tube shaft may incorporate the single extender as a single tube component. The opposing distal end 154 of the single extender 123 is open ended to couple with another attachment member. The single extender 123 defines at least one pair of holes 129 (top-bottom holes) therethrough at each of the top and the bottom of the single extender 123, and at least one pair of holes 130 (side-side holes) therethrough at the two opposing lateral sides of the single extender 123. Each top-bottom hole 129 is aligned with and corresponds to the top-bottom hole 129 defined through the top or bottom of the single extender 123. Each side-side hole 130 is aligned with and corresponds to the side-side hole 130 defined through the two opposing sides of the single extender 123. Each of the top-bottom holes 129 and side-side holes 130 is capable of receiving a hitch pin 131 for securing the single extender 123 to another attachment member. In the figures, the single extender mounting tube has an approximate 2-inch width and an approximate 10-inch length.

The user may select to arrange another attachment member either perpendicular with or parallel to the swivel plates by coupling the attachment member to either the single extender 123 top-bottom holes 129 or side-side holes 130, then securing the attachment member to the single extender with a hitch pin 131 removably inserted through the selected top-bottom holes 129 or side-side holes 130 of the single extender 123. Alternatively, the top-bottom holes 129 or side-side holes 130 allow options for installing the hitch pin 131.

The step 103 or step member of the swing step mount kit 102 essentially comprises a platform 103, a step mounting tube 132 perpendicularly affixed to the platform 103, two opposing open ended coupler tubes 133, and a step locking member. In an embodiment shown in the figures, the step platform 103 has the same or substantially similar structure as discussed in the inventor's other embodiments in this disclosure. The step mounting tube has a top, a bottom, two opposing sides, and two opposing ends. The step mounting tube 132 defines a plurality of spaced apart top-bottom holes 134 therethrough at the respective top and bottom of the step mounting tube 132, and a plurality of spaced apart side-side holes 135 therethrough at the respective two opposing sides of the step mounting tube 132. The step mounting tube 132 has a proximal end 136 defining an opening for preferably coupling with the swing arm single extender 123 or other hitch member. In a further embodiment, both ends of the step mounting tube 132 are open ended.

The coupler tubes 133 each has a top, a bottom, two opposing sides, and two opposing ends. The two opposing open ended coupler tubes 133 of the step 103 are essentially either a single coupler tube defining opposing open ends for coupling with another attachment member, or, as shown in FIG. 56, two separate coupler tubes 133 with each coupler tube 133 defining an open end 137 for coupling with another attachment member. A distal portion 138 of each coupler tube defines at least one coupler hole therethrough. The distal portion 138 of each of the two sides of each coupler tube 133 defines a plurality of aligned spaced apart coupler holes 139 therethrough. In the embodiment shown in FIG. 56, two coupler tubes 133 are perpendicular to the step mounting tube 132. The step mounting tube 132 and the coupler tubes 133 are preferably permanently affixed beneath the step 103 by welding or other fixation means. The open ends 137 of the coupler tubes 133 allow for selective configurations when coupled with other attachment members.

The at least one of the attachment members essentially comprise an attachment locking member and an attachment mounting tube. In one embodiment, the attachment member is a hand pole 104 that serves similar functions and structural arrangement as described in the other embodiments. The hand pole 104 comprises an upstanding pole member 140 having a handle 143, an elbow brace 141, and a mounting tube 142 having an insertion member for coupling to a corresponding mounting tube 132 or other hitch mount. Here, the handle has a cushioned exterior for user comfort. As shown in FIG. 55, the hand pole mounting tube 142 extends from and abuts an end of the elbow brace 141 and is preferably, permanently affixed to the elbow brace. The hand pole mounting tube 142 is perpendicular to the upstanding pole member 140. The hand pole mounting tube preferably defines a ⁵⁄₁₆ inch hole therethrough for receiving one of the hitch pins. The upstanding pole member 140 defines a hole 144 therethrough opposite the handle 143 end of the upstanding pole member 140. The upstanding pole member 140 is further removably insertable into an end of the elbow brace 141, with the elbow brace 141 defining a hole 145 therethrough for selectively receiving another of the hitch pins 146 through the elbow brace hole 145 and the upstanding pole member hole 144. The hand pole may be coupled to one of three locations on the step member: at either end 138 of the coupler tube 133 or at the distal 152 open end of the step mounting tube 132. The hand pole may be further arranged in a parallel orientation or a perpendicular orientation, depending on the selective installation of the hand pole with the step. The hitch pins referenced in this swing step embodiment may alternatively be any sturdy stop member or removably fastening member to prevent joined components from uncoupling.

In one embodiment, a hitch mount assembly comprising:
a. a swing assembly comprising a swivel mount, a swing arm, a pivoting bolt, and a swing fastener, with the swivel mount defining a plurality of extender holes therethrough and defining a plurality of swivel holes therethrough and defining a swivel bore therethrough, with the swing arm defining a plurality of swing arm holes, with the swing arm removably coupling to the swivel mount by inserting the pivoting bolt through the swivel bore and a first of the plurality of the swing arm holes, with a lateral orientation of the swing arm being selectively adjustable up to approximately 180 degrees in either direction about the swivel bore and the pivoting bolt, and with the selected lateral orientation of the swing arm being fastened to the swivel mount by removably fastening the swing fastener through one of the selected plurality of the swivel holes and a second of the plurality of the swing arm holes forming one of a plurality of positions;
b. a step member comprising a step mounting tube defining at least one step mounting hole, at least one coupler tube, and a step locking member, with the step mounting tube being removably coupled to the swing arm by inserting the step locking member through a third of the plurality of the swing arm holes and the step mounting hole, with a lateral orientation of the step member coupled to the swing arm being adjustable up to approximately 180 degrees in either direction about the swivel mount, and with the at least one coupler tube defining at least one coupler hole therethrough; and c. at least one of a plurality of attachment members comprising an attachment locking member and an attachment mounting tube, with the attachment mounting tube having an insertion member for selectively coupling to the at least one coupler tube and secured with the attachment locking member through the respective coupler hole.

In another embodiment, the hitch mount assembly comprising: a swing assembly comprising a swivel mount, a swing arm, a pivoting bolt, and a swing fastener, with the swivel mount defining a plurality of extender holes therethrough and defining a plurality of swivel holes therethrough and defining a swivel bore therethrough, with the swing arm defining a plurality of swing arm holes, with the swing arm removably coupling to the swivel mount by inserting the pivoting bolt through the swivel bore and a first of the plurality of the swing arm holes, with a lateral orientation of the swing arm being selectively adjustable up to approximately 180 degrees in either direction about the swivel bore and the pivoting bolt, and with the selected lateral orientation of the swing arm being fastened to the swivel mount by removably fastening the swing fastener through one of the selected plurality of swivel holes and a second of the plurality of the swing arm holes forming one of a plurality of positions; and at least one step member comprising a step mounting tube, at least one coupler tube defining opposing open ends, and a step locking member, with the step mounting tube coupling with the swing arm with the step locking member, and with the one or both opposing open ends of the at least one coupler tube capable of independently supporting and coupling with one or two of a selection of a plurality of attachment members with an attachment locking member.

In yet another embodiment, hitch mount assembly for removably mounting to a frame of a trailer, a watercraft trailer, a vehicle, or any mountable structure without using an existing hitch receiver, the hitch mount assembly comprising:

a. at least one mounting bracket comprising at least one base tube defining opposing open ends allowing for up to two independent couplings of a plurality of attachment members to or through each of the opposing open ends of the at least one base tube, with the at least one base tube being adapted for use with the frame in a selective orientation parallel, vertical, or perpendicular to the frame; a first mounting plate and a second mounting plate, with the at least one base tube being affixed to the first mounting plate, and with the first mounting plate and the second mounting plate each defining a plurality of mounting plate bores therethrough; a plurality of mounting plate fasteners, with at least two of the plurality of mounting plate fasteners being drawn through at least two of the plurality of mounting plate bores to sandwich the first mounting plate and the second mounting plate to the frame; and at least one hitch pin;

b. at least one swing assembly comprising a swivel mount, a swing arm, and at least one step member, the swivel mount comprising an extender mounting tube, an upper swivel plate, a lower swivel plate, a pivoting bolt, and a swing fastener, with the extender mounting tube defining a plurality of extender holes therethrough, with extender mounting tube removably coupled with one of the open ends of the at least one base tube with the at least one hitch pin, with the upper swivel plate and the lower swivel plate each comprising a flange and each defining a swivel bore therethrough and each defining a plurality of swivel holes therethrough, and with the extender mounting tube being affixed and sandwiched between the flanges of the upper swivel plate and the lower swivel plate; the swing arm defining at least one open end and defining a first swing arm hole, a second swing arm hole, and a third swing arm hole, with the swing arm removably insertable between the upper swivel plate and the lower swivel plate and fastened with the pivoting bolt being insertable through each of the swivel bores of the upper swivel plate and the lower swivel plate and through the first swing arm hole, with a lateral orientation of the swing arm being selectively adjustable up to approximately a 0 degree angle, 45 degree angle, a 90 degree angle, a 135 degree angle, and a 180 degree angle in relation to the swivel bore and the pivoting bolt, with the selected lateral orientation of the swing arm being fastened to the upper swivel plate and the lower swivel plate by removably fastening the swing fastener through one of the selected plurality of the swivel holes and the second swing arm hole to form one of a plurality of lockable positions; and the at least one step member comprising a step mounting tube defining a plurality of step mounting holes, a step locking member, and two coupler tubes each defining an open end and each having a distal portion defining a plurality of coupler holes, with the two coupler tubes each being capable of independently supporting and coupling to one of the plurality of the attachment members, and with the step mounting tube removably coupled to the at least one open end of the swing arm by inserting the step locking member through the third swing arm hole; and c. at least one hand pole comprising an upstanding pole member, an elbow brace, and a hand pole mounting tube, with the hand pole mounting tube comprising an insertion member and defining an insertion member hole therethrough, with the hand pole mounting tube for removably coupling with one of the open ends of the two coupler tubes and secured with one of the at least one hitch pin insertable through the insertion member hole and one of the plurality of the coupler holes, with the elbow brace defining an open end and defining an elbow brace hole, with the upstanding pole member defining a pole member hole therethrough, with the upstanding pole member being removably inserted into the open end of the elbow brace and secured with another one of the at least one hitch pins, wherein the hand pole may be selectively arranged in an upstanding configuration or in a parallel configuration relative to the at least one step member.

To use the swing step mount kit, the user may assemble (or disassemble) the components in any order and in any desired configuration, and may include one or more of the attachment members or accessories. In one method, the user may slidably insert the proximal end 120 of the extender mounting tube 106 into an open end 147 of the base tube 148. The length of the extender mounting tube 106 may be slidably adjusted based on user preference. The user inserts a hitch pin 149 through one of the aligned plurality of extender holes 119 of the extender 106 and the aligned hole 147 in the base tube 148. The position of the extender 106 may be adjusted closer to or farther away from the base tube 148 and frame. The proximal portion 126 of the swing arm 107 mounting tube shaft 122 is slidably inserted into the spacing or gap between the upper swivel plate 110 and the lower swivel plate 111. The user inserts the pivoting bolt 108 through the upper swivel plate 110 central bore 114, through the swing arm first hole 125, and through the lower swivel plate 111 central bore 118 for coupling the swing arm 107 with the swivel mount 105. The swing arm 107 can now pivot or travel about the pivoting bolt 108 and central bores up to 180 degrees to select one of a plurality of lockable positions. The preferred lockable position is secured by inserting the locking pin 109 through one of the upper swivel plate 110 plurality of holes 113, through the swing arm 107 second hole 150, and through one of the corresponding lower swivel plate 111 plurality of holes 117.

The step member 103 may be assembled by insertably coupling the proximal portion 136 of the step mounting tube 132 into the open end 128 of the swing arm 107 single extender 123. The position of the step mounting tube 132 is slidably adjustable within the single extender 123. The selected position of the step mounting tube 132 is then secured by inserting one of the hitch pins 131 through either the top-bottom hole 129 or the side-side hole 130 in the single extender 123, through one of the top-bottom holes 134 or side-side holes 135 of the step mounting tube 132, then through the opposite top-bottom hole 129 or the side-side hole 130 in the single extender 123. The hand pole 104 may be assembled in a parallel or perpendicular orientation. The insertion member of the hand pole 102 mounting tube 142 is insertable into and coupled with one of the step coupler tubes 133 at a selected position, then fastened with a hitch pin 146 through the hand pole mounting tube hole 144 and through one of the coupler tube holes 134, 135. The upstanding pole member 140 is inserted into the open end of the elbow brace 141 and fastened with a hitch pin 146 through the elbow brace holes 145 and through the upstanding pole member holes 144.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

I claim:

1. A hitch mount assembly comprising:
   a. a swing assembly comprising a swivel mount, a swing arm, a pivoting bolt, and a swing fastener, with the swivel mount defining a plurality of extender holes therethrough and defining a plurality of swivel holes therethrough and defining a swivel bore therethrough, with the swing arm defining a plurality of swing arm holes, with the swing arm removably coupling to the swivel mount by inserting the pivoting bolt through the swivel bore and a first of the plurality of the swing arm holes, with a lateral orientation of the swing arm being selectively adjustable up to approximately 180 degrees in either direction about the swivel bore and the pivoting bolt, and with the selected lateral orientation of the swing arm being fastened to the swivel mount by removably fastening the swing fastener through one of the selected plurality of the swivel holes and a second of the plurality of the swing arm holes forming one of a plurality of positions;
   b. a step member comprising a step mounting tube defining at least one step mounting hole, the step member further comprising at least one coupler tube, and a step locking member, with the step mounting tube being removably coupled to the swing arm by inserting the step locking member through a third of the plurality of the swing arm holes and the step mounting hole, with a lateral orientation of the step member coupled to the swing arm being adjustable up to approximately 180 degrees in either direction about the swivel mount, and with the at least one coupler tube defining at least one coupler hole therethrough; and
   c. at least one of a plurality of attachment members comprising an attachment locking member and an attachment mounting tube, with the attachment mounting tube having an insertion member for selectively coupling to the at least one coupler tube and secured with the attachment locking member through the respective at least one coupler hole,
   d. wherein the swivel mount further comprising an extender mounting tube, an upper swivel plate, and a lower swivel plate, with the extender mounting tube having a proximal portion defining the plurality of extender holes therethrough and a distal portion, with the upper swivel plate and the lower swivel plate each further comprising a flange extending therefrom and each further defining the plurality of swivel holes therethrough and each defining the swivel bore, with the distal portion being sandwiched and affixed between the flanges of the upper swivel plate and the lower swivel plate to separate the upper swivel plate from the lower swivel plate, with the plurality of the swivel holes of the upper swivel plate being aligned with and corresponding to the plurality of the swivel holes of the lower swivel plate; and
   e. wherein the swing arm further comprising a proximal portion being removably insertable coupled between the upper swivel plate and the lower swivel plate, with the proximal portion of the swing arm defining the first of the plurality of the swing arm holes and defining the second of the plurality of the swing arm holes, with the pivoting bolt being insertable through the respective swivel bores of the upper swivel plate and the lower swivel plate and through the first of the plurality of swing arm holes, and with one of the plurality of positions of the swing arm lateral orientation being fastened by inserting the swing fastener through the one of the plurality of the swivel holes and through the second of the plurality of the swing arm holes.

2. The hitch mount assembly of claim 1, with each of the plurality of swivel holes and the plurality of positions of the swing arm when fastened to the swivel mount corresponding to approximately a 0 degree angle, 45 degree angle, a 90 degree angle, a 135 degree angle, and a 180 degree angle in relation to the swing arm being coupled with the swivel bore and the pivoting bolt.

3. The hitch mount assembly of claim 1, the at least one coupler tube of the step member further comprising a first coupler tube and a second coupler tube, the first couple tube and the second coupler tube each further defining an open end, with the first coupler tube and the second coupler tube each being affixed to the step member for selective, independent, and removable coupling of one of the plurality of attachment members.

4. The hitch mount assembly of claim 3, the at least one of the plurality of the attachment members being at least one hand pole, wherein the at least one hand pole being selectively and removably insertable into and coupled with one of the open ends of the first coupler tube or the second coupler tube by removably inserting the attachment locking member through the at least one coupler hole of either the first coupler tube or the second coupler tube.

5. The hitch mount assembly of claim 1, the swing assembly further comprising an extender mounting tube having a distal portion being affixed to the swivel mount and having a proximal portion being removably coupling with an open end of a distal portion of a mounting base tube or with another one of the at least one of the plurality of the attachment members, with the mounting base tube further comprising a proximal portion for removably mounting the mounting base tube to a trailer, a vehicle, a watercraft trailer, a boat, or other mountable structure.

6. A hitch mount assembly comprising: a swing assembly comprising a swivel mount, a swing arm, a pivoting bolt, and a swing fastener, with the swivel mount defining a plurality of extender holes therethrough and defining a plurality of swivel holes therethrough and defining a swivel bore therethrough, with the swing arm defining a plurality of swing arm holes, with the swing arm removably coupling to the swivel mount by inserting the pivoting bolt through the swivel bore and a first of the plurality of the swing arm holes, with a lateral orientation of the swing arm being selectively adjustable up to approximately 180 degrees in either direction about the swivel bore and the pivoting bolt, and with the selected lateral orientation of the swing arm being fastened to the swivel mount by removably fastening the swing fastener through one of the selected plurality of swivel holes and a second of the plurality of the swing arm holes forming one of a plurality of positions; and at least one step member comprising a step mounting tube, at least one coupler tube defining opposing open ends, and a step locking member, with the step mounting tube coupling with the swing arm with the step locking member, and with the one or both opposing open ends of the at least one coupler tube capable of independently supporting and coupling with one or two of a selection of a plurality of attachment members with an attachment locking member; the hitch mount assembly further comprising a hitch mounting member comprising a proximal portion for removably mounting to a frame of a vehicle, a boat, a trailer, a watercraft trailer, or other mountable structure, and comprising a distal portion for coupling with the swing assembly.

7. The hitch mount assembly of claim 6, the swivel mount further comprising an extender having a proximal portion and a distal portion, an upper swivel plate having a flange extending therefrom and defining an upper set of the plurality of the swivel holes therethrough, and a lower swivel plate having a flange extending therefrom and defining a lower set of the plurality of the swivel holes therethrough, with the distal portion of the extender being affixed and sandwiched between the flange of the upper swivel plate and the flange of the lower swivel plate to separate the upper swivel plate from the lower swivel plate, and with the upper set of the plurality of the swivel holes being aligned with and corresponding to the lower set of the plurality of the swivel holes; and the step mounting tube having a proximal portion defining a plurality of step mounting holes therethrough, with a position of the step mounting tube being inwardly or outwardly adjustable in relation to the swing arm by selectively inserting the step locking member through the third swing arm hole and through one of the plurality of the step mounting holes.

8. The hitch mount assembly of claim 6, with each of the plurality of swivel holes and the plurality of positions of the swing arm when fastened to the swivel mount corresponding to approximately a 0 degree angle, 45 degree angle, a 90 degree angle, a 135 degree angle, and a 180 degree angle in relation to the swing arm being coupled with the swivel bore and the pivoting bolt.

9. The hitch mount assembly of claim 6, the at least one coupler tube further comprising a first coupler tube and a second coupler tube each defining the open end, with the first coupler tube and the second coupler tube each being affixed to the step member for selective, independent, and removable coupling with one of the plurality of the attachment members.

10. The hitch mount assembly of claim 9, the one of the plurality of the attachment members being a hand pole having a hand pole hole, with the hand pole being selectively and removably coupled with one of the open ends of either the first coupler tube or the second coupler tube, and with the attachment locking member being removably insertable through the coupler hole and the hand pole hole.

11. A hitch mount assembly for removably mounting to a frame of a trailer, a watercraft trailer, a vehicle, or any mountable structure without using an existing hitch receiver, the hitch mount assembly comprising:
  a. at least one mounting bracket comprising at least one base tube defining opposing open ends allowing for up to two independent couplings of a plurality of attachment members to or through each of the opposing open ends of the at least one base tube, with the at least one base tube being adapted for use with the frame in a selective orientation parallel, vertical, or perpendicular to the frame; a first mounting plate and a second mounting plate, with the at least one base tube being affixed to the first mounting plate, and with the first mounting plate and the second mounting plate each defining a plurality of mounting plate bores therethrough; a plurality of mounting plate fasteners, with at least two of the plurality of mounting plate fasteners being drawn through at least two of the plurality of mounting plate bores to sandwich the first mounting plate and the second mounting plate to the frame; and at least one hitch pin;
  b. at least one swing assembly comprising a swivel mount, a swing arm, and at least one step member, the swivel mount comprising an extender mounting tube, an upper swivel plate, a lower swivel plate, a pivoting bolt, and a swing fastener, with the extender mounting tube defining a plurality of extender holes therethrough, with extender mounting tube removably coupled with one of the open ends of the at least one base tube with the at least one hitch pin, with the upper swivel plate and the lower swivel plate each comprising a flange and each defining a swivel bore therethrough and each defining a plurality of swivel holes therethrough, and with the extender mounting tube being affixed and sandwiched between the flanges of the upper swivel plate and the lower swivel plate; the swing arm defining at least one open end and defining a first swing arm hole, a second swing arm hole, and a third swing arm hole, with the swing arm removably insertable between the upper swivel plate and the lower swivel plate and fastened with the pivoting bolt being insertable through each of the swivel bores of the upper swivel plate and the lower swivel plate and through the first swing arm hole, with a lateral orientation of the swing arm being selectively adjustable up to approximately a 0 degree angle, 45 degree angle, a 90 degree angle, a 135 degree angle, and a 180 degree angle in relation to the swivel bore and the pivoting bolt, with the selected lateral orientation of the swing arm being fastened to the upper swivel plate and the lower swivel plate by removably fastening the swing fastener through one of the selected plurality of the swivel holes and the second swing arm hole to form one of a plurality of lockable positions; and the at least one step member comprising a step mounting tube defining a plurality of step mounting holes, a step locking member, and two coupler tubes each defining an open end and each having a distal portion defining a plurality of coupler holes, with the two coupler tubes each being capable of independently supporting and coupling to one of the plurality of the attachment members, and with the step mounting tube removably coupled to the at least one open end of the swing arm by inserting the step locking member through the third swing arm hole; and c. at least one hand pole comprising an upstanding pole member, an elbow brace, and a hand pole mounting tube, with the hand pole mounting tube comprising an insertion member and defining an insertion member hole therethrough, with the hand pole mounting tube for removably coupling with one of the open ends of the two coupler tubes and secured with one of the at least one hitch pin insertable through the insertion member hole and one of the plurality of the coupler holes, with the elbow brace defining an open end and defining an elbow brace hole, with the upstanding pole member defining a pole member hole therethrough, with the upstanding pole member being removably inserted into the open end of the elbow brace and secured with another one of the at least one hitch pins, wherein the hand pole may be selectively arranged in an upstanding configuration or in a parallel configuration relative to the at least one step member.

12. The hitch mount assembly of claim 11, the swing arm further comprising a proximal portion having a mounting tube shaft and a distal portion having a single extender tube, with the mounting tube shaft defining the first swing arm hole therethrough and the second swing arm hole therethrough, with the single extender tube defining the third swing arm hole therethrough and defining the at least one open end of the swing arm, wherein the step mounting tube being removably coupled with the at least one open end of the single extender tube and fastened with the step locking member.

13. The hitch mount assembly of claim 11, the hitch mount assembly further comprising a plurality of attachment members, with the plurality of attachment members being selectively coupled with any unoccupied the first coupler tube, the second coupler tube, the at least one base tube, any other of the plurality of attachment members, or any other hitch mount assembly component.

14. The hitch mount assembly of claim 13, the plurality of attachment members further comprising: a riser having a bottom mounting tube having a bottom, and two lateral sides, with the bottom mounting tube defining a hole at each lateral side and at the bottom of the bottom mounting tube and defining at least one open end for coupling; a middle mounting tube having a top, a bottom, and two lateral sides, with the middle mounting tube having at least a portion of a lateral side affixed to the top of the bottom mounting tube, with the middle mounting tube defining a single hole at each lateral side and at the top of the middle mounting tube and defining at least one open end for coupling; a support member upstanding from the middle mounting tube; and an upper mounting tube having a top and two lateral sides, with the upper mounting tube being parallel to the middle mounting tube and to the bottom mounting tube, with the upper mounting tube defining a hole at each lateral side and at the top of the upper mounting tube and defining opposing open ends each for coupling; and at least one of a plurality of extenders for extending the coupled length of the at least one step, a second step, or the riser, with each of the plurality of extenders defining at least a hole; wherein each of the plurality of hitch pins being removably drawn through one of the at least one hole of the plurality of extenders, any of the holes defined in the riser, and any of the plurality of holes defined in the at least one base tube during selective coupling of the plurality of extenders, the riser, the swing assembly, and the last least one base tube.

* * * * *